(12) United States Patent
Sunaga et al.

(10) Patent No.: US 9,128,238 B2
(45) Date of Patent: Sep. 8, 2015

(54) OPTICAL MATERIAL AND MOLDED PRODUCT THEREOF

(75) Inventors: Tadahiro Sunaga, Yamato (JP); Takashi Oda, Ichihara (JP); Hirofumi Io, Yokohama (JP); Keisuke Kawashima, Ichihara (JP); Yasuhiro Koike, Yokohama (JP)

(73) Assignees: MITSUI CHEMICALS, INC., Tokyo (JP); YASUHIRO KOIKE, Kanagawa (JP)

( * ) Notice: Subject to any disclaimer, the term of this patent is extended or adjusted under 35 U.S.C. 154(b) by 262 days.

(21) Appl. No.: 13/639,124

(22) PCT Filed: Apr. 4, 2011

(86) PCT No.: PCT/JP2011/002011
§ 371 (c)(1),
(2), (4) Date: Oct. 3, 2012

(87) PCT Pub. No.: WO2011/125323
PCT Pub. Date: Oct. 13, 2011

(65) Prior Publication Data
US 2013/0030136 A1    Jan. 31, 2013

(30) Foreign Application Priority Data
Apr. 6, 2010   (JP) .................... 2010-088086

(51) Int. Cl.
C08F 32/00   (2006.01)
C08F 32/08   (2006.01)
G02B 1/04    (2006.01)

(52) U.S. Cl.
CPC .......... *G02B 1/04* (2013.01); *C08G 2261/3324* (2013.01); *C08G 2261/3325* (2013.01); *C08G 2261/418* (2013.01); *C08G 2261/724* (2013.01)

(58) Field of Classification Search
USPC ........................................................ 526/308
See application file for complete search history.

(56) References Cited

U.S. PATENT DOCUMENTS

| | | | |
|---|---|---|---|
| 7,288,296 B2 | 10/2007 | Elman et al. | |
| 2004/0047056 A1 | 3/2004 | Sekiguchi et al. | |
| 2004/0057141 A1 | 3/2004 | Sekiguchi et al. | |
| 2006/0106174 A1* | 5/2006 | Ohkita et al. ............... | 525/342 |
| 2009/0215974 A1 | 8/2009 | Sunaga et al. | |

FOREIGN PATENT DOCUMENTS

| | | |
|---|---|---|
| CN | 101253427 A | 8/2008 |
| JP | 6-206985 A | 7/1994 |
| JP | 11-12348 A | 1/1999 |
| JP | 2001-221915 A | 8/2001 |
| JP | 2003-14901 A | 1/2003 |
| JP | 2005-68374 A | 3/2005 |
| JP | 2006-511628 A | 4/2006 |
| JP | 2007-177046 A | 7/2007 |
| JP | 2007177046 A * | 7/2007 |
| JP | 2009-169086 A | 7/2009 |
| JP | 2009178941 A * | 8/2009 |
| JP | 2009-203461 A | 9/2009 |
| JP | 2009-204860 A | 9/2009 |
| WO | WO 03/095505 A1 | 11/2003 |
| WO | WO 2008/010317 A1 | 1/2008 |

OTHER PUBLICATIONS

Translation of JP2007177046, Jul. 12, 2007.*
Translation of JP2009178941, Aug. 13, 2009.*
Office Action issued on Apr. 30, 2014 from the Chinese Patent Office, in corresponding Chinese Patent Application 201180017507.2 (6 pages).
International Search Report (PCT/ISA/210) issued on Jul. 5, 2011, by the Japanese Patent Office as the International Searching Authority for International Application No. PCT/JP2011/002011.
Hisanori Ohkita et al., "Preparation of a Zero-Birefringence Polymer Doped with a Birefringent Crystal and Analysis of Its characteristics", Macromolecules vol. 37, No. 22, 2004, pp. 8342-8348.
Akihiro Tagaya et al., "Zero-Birefringence Optical Polymers", Macromolecules, vol. 39, No. 8, 2006, pp. 3019-3023.
Tadashi Inoue et al., "Dynamic Birefringence of Amorphous Polyolefins II. Measurements on Polymers Containing Five-Membered Ring in Main Chain", Polymer Journal, vol. 27, No. 9, 1995, pp. 943-950.

* cited by examiner

*Primary Examiner* — Hui Chin
(74) *Attorney, Agent, or Firm* — Buchanan, Ingersoll & Rooney PC

(57) ABSTRACT

Disclosed is an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the ratio $\Delta OB/\Delta F$ is from 0.001 to 0.250 in which $\Delta OB$ represents the amount of a change in the absolute value of the orientation birefringence calculated from the phase difference (nm) at a wavelength of 633 nm/film thickness (μm) in a stretched film obtained from the optical material, and $\Delta F$ represents the amount of a change in the absolute value of the orientation coefficient determined from the dichroic ratio of parallel light intensity $I_\parallel$ to perpendicular light intensity $I_\perp$, each relative to the orientation direction according to Raman spectroscopy.

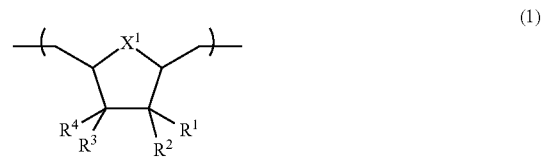

(1)

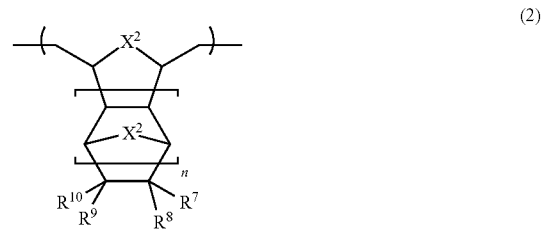

(2)

6 Claims, 7 Drawing Sheets

OPTICAL MATERIAL AND MOLDED PRODUCT THEREOF

TECHNICAL FIELD

The present invention relates to an optical material in which the orientation birefringence and photoelastic constant are very low, and a molded product.

BACKGROUND ART

In recent years, in application to an optical material of a micro lens for a digital camera module, a pick-up lens, an imaging lens, an optical element (such as a micro lens array, an optical waveguide, an optical switching, a Fresnel zone plate, a binary optical element and a blaze diffractive optical element) and the like, and in application to an electronic device material of an anti-reflective filter, a recording medium, a display material, an organic EL or liquid crystal plastic member and the like, a cyclic olefin polymer having excellent optical properties has been studied for development of wide application in these fields.

A polymer material containing a cyclic olefin polymer is an aggregate having a long molecular chain and a polymer molecular chain itself has anisotropy that is an inherent physical property, so that it is melt-flowed by the pressure or temperature at the time of melt molding and is cured in the form of a molded product on a mold or a roll in a state that flowing of a resin is not fully reduced in many cases. In this case, there has been well known that a chain having a long molecular chain exhibits the orientation of the molecule under molding conditions.

The orientation of the molecule is attributable to the anisotropy that is an inherent physical property of the molecular chain itself, and optically produces the anisotropy of the refractive index. When the birefringence is produced as the effect of anisotropy of the refractive index on a molding material and a birefringence material is present in the optical path, for example, image quality of the product, readout of the signal or the like is adversely affected. In development of an optical material and an electronic device material consisting of an optical resin, reduction of the birefringence is an important issue.

Herein, in the appropriate technical field, as the birefringence exhibited by an optical polymer, there are the orientation birefringence in which its main cause is derived from the main chain of a polymer and the stress birefringence caused by the stress. Furthermore, each sign of the orientation birefringence and stress birefringence is derived from the chemical structure of a polymer, and is a property inherent in each polymer.

In an attempt to reduce the orientation birefringence or stress birefringence, a method of cancelling the birefringence has been attempted with the addition of an inorganic fine particle or an organic compound having birefringence properties of an opposite sign to a polymer. When an organic compound is added, for a film with the addition of 6.5 wt % 2-octadecyl naphthalene exhibiting positive birefringence properties to polymethyl methacrylate exhibiting negative birefringence properties, the orientation birefringence becomes almost zero regardless of the stretch ratio (for example, Patent Document 1). Furthermore, for a stretched film consisting of a copolymer of methyl methacrylate and benzyl methacrylate with the addition of a strontium carbonate fine particle having a particle diameter of about 20 nm as the inorganic fine particle in an amount of 0.3 wt %, the orientation birefringence also becomes almost zero regardless of the stretch ratio (for example, Non-patent Document 1). These methods are excellent, but there is a practical problem such that it is necessary to add an additive material continuously and uniformly when adapted to opacification of a film due to aggregation of an additive material, size control of fine particles or the process.

Meanwhile, there has been exemplified a method in which, in a non-additive material without the addition of an organic compound, an inorganic fine particle or the like to a polymer, any one of the orientation birefringence or stress birefringence is reduced, or both of them are reduced by copolymerizing two or more kinds of methacrylates or acrylate monomers having birefringence properties with a different sign of birefringence, and changing the kind and copolymerization composition ratio thereof (for example, Patent Document 2 and Non-patent Document 2). These methods are excellent since an additive material is not used and there is no need to mix an additive material continuously during process without causing opacification of a film due to aggregation.

In this example, for example, in the case of a copolymer of methyl methacrylate and pentafluorobenzyl methacrylate of a certain composition, both of the orientation birefringence and stress birefringence are reduced to a level that there is no practical problem. However, generally, to obtain a film by subjecting a methacrylate polymer to melt molding, the polymer is heated up to a temperature that can perform melt molding and a resin stays. In this case, there is a problem such that the gel component derived from monomers or oligomers caused by depolymerization is mixed into a film and film performance is thus deteriorated. Also, the glass transition temperature of the methacrylate polymer is low, that is, about 100 degrees centigrade, so that heat resistance becomes a problem depending on the purposes when the polymer is used for a product. There are some polymers imparted with heat resistance by increasing the glass transition temperature, but in this case, it is necessary to set the melting temperature to a high level during molding for increased glass transition temperature, and mixing of a gel-like material into a film is possibly more remarkable due to the aforementioned depolymerization.

On the other hand, a cyclic olefin polymer is a polymer which is amorphous and transparent, and has a relatively high glass transition temperature by a rigid cyclic structure in the main chain, and it is widely used for an optical film, an optical lens or the like using such excellent properties. Also, in an attempt to reduce the birefringence, the photoelastic constant is exemplified as a measure to exhibit the stress birefringence, for example, for a hydrogenated product of ring-opening polymerization of a norbornene or tetracyclododecene monomer (Non-patent Document 3). In this case, for a hydrogenated product of norbornene ring-opening polymerization containing an alkyl group, a phenyl group or the like in which a substituent has a relatively low polarity, the photoelastic constant is relatively high, that is, about 10 to $30 \times 10^{-12}$ $Pa^{-1}$.

With respect to the orientation birefringence of a cyclic olefin polymer, there is exemplified the phase difference of a stretched film of an amorphous cyclic olefin copolymer which is obtained by addition polymerization of a cyclic olefin having a norbornene basic structure, particularly preferably a cyclic olefin having a hydrocarbon structure derived from norbornene or tetracyclododecene or derived from them, and a non-cyclic olefin having a terminal double bond, for example, α-olefin, particularly preferably ethylene or propylene, among these, particularly preferably norbornene and ethylene, norbornene and propylene, tetracyclododecene and ethylene, and tetracyclododecene and propylene (Patent Document 3). In this evaluation, for a film having a thickness of 40 to 60 μm which is stretched by 1.5 times to 4 times, the phase difference is from 5 to 16 nm, and 1 to 3×10$^{-4}$ in terms of a converted value of the orientation birefringence. By an attempt to reduce the birefringence, relatively low birefringence is exhibited. However, from the fact that the copolymer in Patent Document 3 is a copolymer of a cyclic olefin and a molecular chain of an α-olefin chain in the main chain without a molecular design to cancel the birefringence by the anisotropy of the molecular chain among a plurality of cyclic olefin species, toughness is poor. For example, when a highly rigid substrate such as glass is used as a base in the production of a cast film, in a process of drying a film, the film is broken due to shrinkage stress of the film during cooling after heating. Or, even though a self-support film having a resin material as a substrate is produced, it is easily broken due to external stress and thus it is not easy to obtain a film having a large area.

RELATED DOCUMENT

Patent Document

Patent Document 1: Japanese Laid-open Patent Publication No. 2005-68374
Patent Document 2: Japanese Laid-open Patent Publication No. 2009-204860
Patent Document 3: Japanese Laid-open Patent Publication No. 2001-221915

Non-Patent Document

Non-patent Document 1: Macromolecules 2004, 37, 8342.
Non-patent Document 2: Macromolecules 2006, 39, 3019.
Non-patent Document 3: Polymer Journal 1995, 27, 943.

DISCLOSURE OF THE INVENTION

Even though an optical resin is highly transparent and excellent in toughness, the polymer chain is stretched in the stress direction and is oriented by performing molding under stress of shear or tensile such as melt injection molding or extrusion molding, thus causing the birefringence. In the related art, when an optical resin is used for an optical lens or a device such as a liquid crystal display using polarized light, generation of birefringence due to orientation or stress needs to be suppressed as much as possible. Accordingly, suppression of orientation of the polymer chain has been studied by optimizing conditions of temperature, pressure and the like.

However, even though the polymer chain itself is oriented, if an optical material contains a polymer which does not cause the birefringence, such an optical material can be widely applicable to a liquid crystal display device or an optical lens which is highly transparent and excellent in toughness without the limitations of temperature and pressure conditions at the time of molding.

An object of the present invention is to provide an optical material capable of obtaining a molded product which is highly transparent and excellent in toughness without the limitations of temperature and pressure conditions at the time of molding by the use of a predetermined cyclic olefin copolymer in which the birefringence is suppressed even though the polymer chain itself is oriented.

The present invention is specified by matters described in below:

[1] An optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the ratio ΔOB/ΔF is from 0.001 to 0.250 in which ΔOB represents the amount of a change in the absolute value of the orientation birefringence calculated from the phase difference (nm) at a wavelength of 633 nm/film thickness (μm) in a stretched film obtained from the optical material, and ΔF represents the amount of a change in the absolute value of the orientation coefficient F=(D−1)/(D+2) that is a function of the dichroic ratio D=$I_∥$/$I_⊥$ of parallel light intensity $I_∥$ to perpendicular light intensity $I_⊥$, each relative to the orientation direction at 1,500 to 1,400 cm$^{-1}$ according to Raman spectroscopy in a molded product obtained from the optical material,

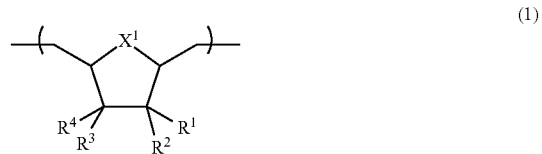

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

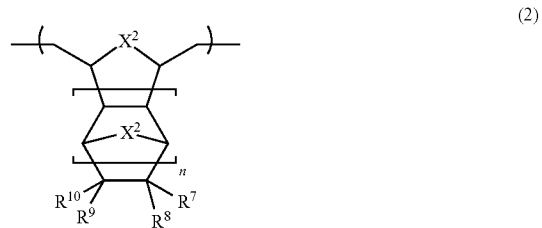

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 0 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3.

[2] An optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the ratio ΔOB/ΔF is from 0.001 to 0.250 in which ΔOB represents the amount of a change in the absolute value of the orientation birefringence calculated from the phase difference (nm) at a wavelength of 633 nm/film thickness (μm) in a stretched film obtained from the optical material, and ΔF represents the amount of a change in the absolute value of the orientation coefficient F=(D−1)/(D+2) that is a function of the dichroic ratio D=$I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy in a molded product obtained from the optical material,

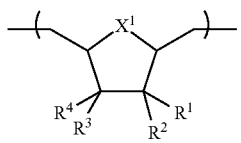

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

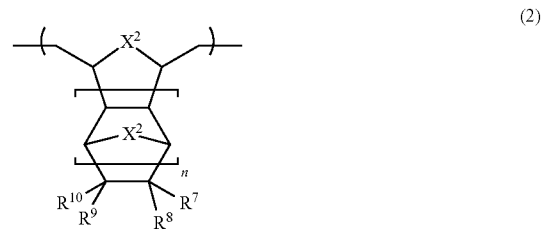

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 20 carbon atoms, fluorine-containing aryloxycarbonyl having 7 to 20 carbon atoms, fluorine-containing alkoxycarbonylalkyl having 3 to 20 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3,

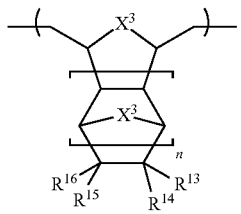

(3)

wherein, in the formula (3), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^{13}$ to $R^{16}$ may be bonded to each other to form a ring structure; $X^3$ is selected from —O—, —S—, —$NR^{17}$—, —$PR^{18}$— and —$CR^{17}R^{18}$— ($R^{17}$ and $R^{18}$ each independently represent hydrogen or alkyl having 1 to 20 carbon atoms), and may be identical with or different from each other; and n represents 0 or 1.

[3] The optical material as set forth in [1] including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 $cm^{-1}$ according to Raman spectroscopy in a molded product obtained from the optical material is equal to or more than 0.001, and the absolute value of the orientation birefringence calculated from the phase difference (nm) at a wavelength of 633 nm/film thickness (μm) in a stretched film obtained from the optical material is equal to or less than $5\times10^{-4}$.

[4] The optical material as set forth in [2] including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 $cm^{-1}$ according to Raman spectroscopy in a molded product obtained from the optical material is equal to or more than 0.001, and the absolute value of the orientation birefringence calculated from the phase difference (nm) at a wavelength of 633 nm/film thickness (μm) in a stretched film obtained from the optical material is equal to or less than $5\times10^{-4}$.

[5] The optical material as set forth in [1] including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the photoelastic constant obtained from the following Equation (12) is equal to or less than $7\times10^{-12}$ $Pa^{-1}$ when a tensile force of maximum 2N is applied at a rate of 0.1 mm/min to measure the phase difference at a wavelength of 633 nm in a film obtained from the optical material.

Equation: Photoelastic constant $(Pa^{-1})=\Delta Re(nm)/\Delta P$ (N)×film width (mm) (12)

(ΔRe: amount of a change in the phase difference, ΔP: amount of a change in the tensile force in the range in which the phase difference linearly increases with the application of the stress)

[6] The optical material as set forth in [2] including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the photoelastic constant obtained from the following Equation (12) is equal to or less than $7\times10^{-12}$ $Pa^{-1}$ when a tensile force of maximum 2N is applied at a rate of 0.1 mm/min to measure the phase difference at a wavelength of 633 nm in a film obtained from the optical material.

Equation: Photoelastic constant $(Pa^{-1})=\Delta Re(nm)/\Delta P$ (N)×film width (mm) (12)

(ΔRe: amount of a change in the phase difference, ΔP: amount of a change in the tensile force in the range in which the phase difference linearly increases with the application of the stress)

[7] An optical film obtained by stretching a film consisting of an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 $cm^{-1}$ according to Raman spectroscopy is equal to or more than 0.001, and the absolute value of the orientation birefringence calculated from the phase difference (nm) at a wavelength of 633 nm/film thickness (μm) in a stretched film obtained from the optical material is equal to or less than $5\times10^{-4}$,

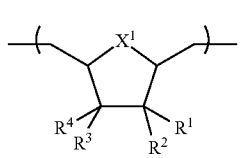

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

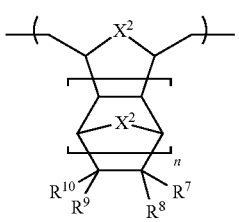

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3.

[8] An optical lens obtained by molding an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99 in which the absolute value of the photoelastic constant obtained from the following Equation (12) is equal to or less than $7 \times 10^{-12}$ $Pa^{-1}$ when a tensile force of maximum 2N is applied at a rate of 0.1 mm/min to measure the phase difference at a wavelength of 633 nm in the obtained film, Equation: Photoelastic constant $(Pa^{-1})$=$\Delta Re(nm)/\Delta P$ $(N) \times$film width (mm) (12)

($\Delta$Re: amount of a change in the phase difference, $\Delta$P: amount of a change in the tensile force in the range in which the phase difference linearly increases with the application of the stress)

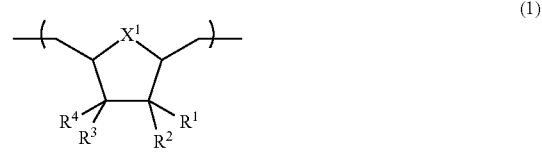

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

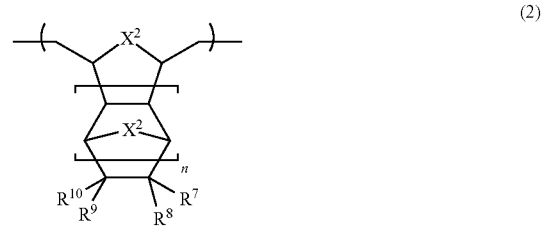

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 20 carbon atoms, fluorine-containing aryloxycarbonyl having 7 to 20 carbon atoms, fluorine-containing alkoxycarbonylalkyl having 3 to 20 carbon atoms, fluorine-containing aryloxycarbonylalkyl having 7 to 20 carbon atoms, cyano, cyano-containing alkyl having 2 to 20 carbon carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 20 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3.

[9] An optical film obtained by stretching a film consisting of an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 $cm^{-1}$ according to Raman spectroscopy is equal to or more than 0.001, and the absolute value of the orientation birefringence is equal to or less than $5\times10^{-4}$,

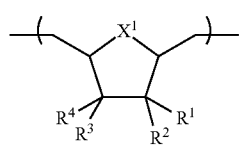

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 20 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

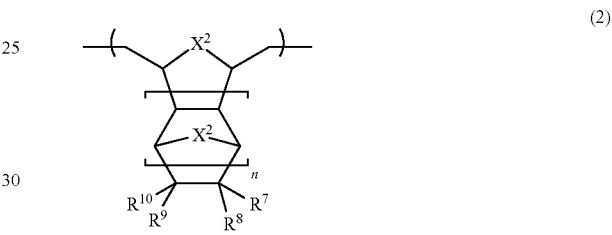

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3,

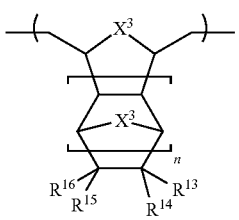

(3)

wherein, in the formula (3), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^{13}$ to $R^{16}$ may be bonded to each other to form a ring structure; $X^3$ is selected from —O—, —S—, —$NR^{17}$—, —$PR^{18}$— and —$CR^{17}R^{18}$— ($R^{17}$ and $R^{18}$ each independently represent hydrogen or alkyl having 1 to 20 carbon atoms), and may be identical with or different from each other; and n represents 0 or 1.

[10] An optical lens obtained by molding an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [α] represented by the general formula (3) and having a molar ratio [C]/([A]+[B]) of from 1/99 to 40/60 in which the absolute value of the photoelastic constant obtained from the following Equation (12) is equal to or less than $7 \times 10^{-12}$ $Pa^{-1}$ when a tensile force of maximum 2N is applied at a rate of 0.1 mm/min to measure the phase difference at a wavelength of 633 nm in the obtained film, Equation: Photoelastic constant ($Pa^{-1}$)=ΔRe(nm)/ΔP (N)×film width (mm) (12)

(ΔRe: amount of a change in the phase difference, ΔP: amount of a change in the tensile force in the range in which the phase difference linearly increases with the application of the stress)

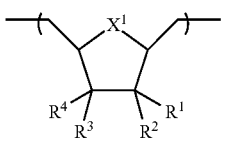

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms),

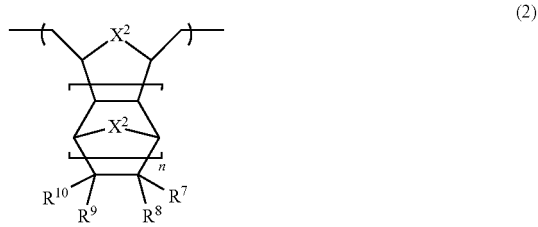

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3,

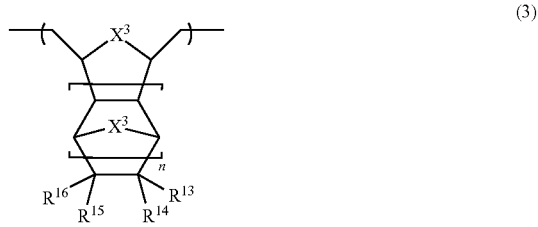

(3)

wherein, in the formula (3), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^{13}$ to $R^{16}$ may be bonded to each other to form a ring structure; $X^3$ is selected from —O—, —S—, —$NR^{17}$—, —$PR^{18}$— and —$CR^{17}R^{18}$— ($R^{17}$ and $R^{18}$ each independently represent hydrogen or alkyl having 1 to 20 carbon atoms), and may be identical with or different from each other; and n represents 0 or 1.

Incidentally, in the present invention, an optical material refers to a cyclic olefin copolymer or a resin composition containing the polymer.

The optical material of the present invention contains a predetermined cyclic olefin copolymer in which the birefringence is suppressed even though the polymer chain itself is oriented, and can provide a molded product which is highly transparent and excellent in toughness without the limitations of temperature and pressure conditions at the time of molding. An optical film produced according to a method such as uniaxial stretching or biaxial stretching from the optical material of the present invention is industrially valuable as a film having low birefringence. Furthermore, an optical lens molded from the optical material of the present invention by injection molding is industrially valuable since the photoelastic constant of the polymer is extremely small and the stress birefringence with respect to stress distortion remained in the molded product by injection molding or the like is also extremely low.

DESCRIPTION OF EMBODIMENTS

Figure 1:
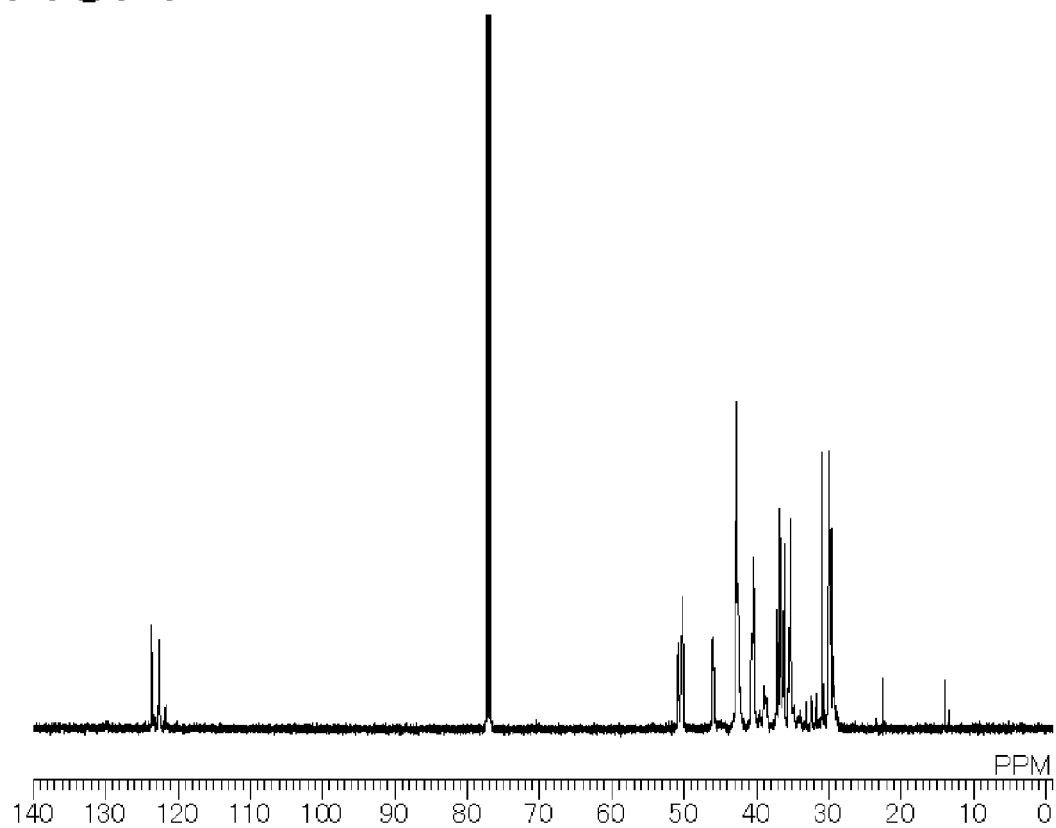
FIG. 1 illustrates a $^{13}$C-NMR spectrum of a cyclic olefin copolymer in Example 1.

The optical material of the present invention is an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the ratio $\Delta OB/\Delta F$ is from 0.001 to 0.250 in which $\Delta OB$ represents the amount of a change in the absolute value of the orientation birefringence, and $\Delta F$ represents the amount of a change in the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy.

Furthermore, the optical material of the present invention is an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the ratio $\Delta OB/\Delta F$ is from 0.001 to 0.250 in which $\Delta OB$ represents the amount of a change in the absolute value of the orientation birefringence, and $\Delta F$ represents the amount of a change in the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy.

Such an optical material exhibits very low birefringence. That is, the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy is equal to or more than 0.001, and the absolute value of the orientation birefringence is equal to or less than $5 \times 10^{-4}$.

Thus, the optical material of the present invention contains a predetermined cyclic olefin copolymer in which the birefringence is suppressed even though the polymer chain itself is oriented, and can provide a molded product which is highly transparent and excellent in toughness without the limitations of temperature and pressure conditions at the time of molding.

A polymer material containing a cyclic olefin polymer is an aggregate having a long molecular chain and is in a bound state, in which a plurality of repeating structural units forming a polymer molecular chain has a volumetric specific direction. The refractive index $n_\parallel$ derived from the polarized component parallel to the orientation direction and the refractive index $n_\perp$ derived from the polarized component perpendicular to the orientation direction are different. When external stress such as stretching, compression or the like is applied to a polymer molding material, the polymer molecular chain is oriented regardless of being reversible or irreversible. Accordingly, the anisotropy occurs between the refractive index $n_\parallel$ and the refractive index $n_\perp$, and the phase difference is generated corresponding to the direction of the electric field vector of the light transmitted through the material. This phenomenon is referred to as the birefringence ($\Delta n$), and in the case of a polymer, the birefringence ($\Delta n$) is expressed as a difference between the refractive index $n_\parallel$ derived from the polarized component parallel to the main chain axis (orientation axis) and the refractive index $n_\perp$ derived from the perpendicular polarized component ($\Delta n = n_\parallel - n_\perp$). Also, the birefringence generated by orientation of the polymer is the orientation birefringence or stress birefringence.

Meanwhile, the repeating structural unit of the cyclic olefin polymer chain is a structure that is not three-dimensionally isotropic because of the presence of a ring structure in the main chain, the anisotropy is present in the density distribution of the electron cloud of the molecular chain and the mobility of the molecular chain, and the anisotropy of the polarizability occurs in respective repeating structural units. When the anisotropy of the polarizability is considered in a molecular model so as to increase a radius in the direction increasing the polarizability, and the repeating structural unit is treated as an ellipsoid of the polarizability, the direction of the major axis of the polarizability ellipsoid is aligned by orientation of the polymer chain, and the birefringence occurs due to the optical anisotropy. Furthermore, it is considered that a size or a sign of the orientation birefringence or stress birefringence is determined depending on whether the major axis of the ellipsoid is aligned in the orthogonal direction or in the parallel direction with respect to the main chain.

In the present invention, the lengths in the major axis direction of the polarizability ellipsoids of the repeating structural unit [A] represented by the general formula (1) and the repeating structural unit [B] represented by the general formula (2) and the directions are different. The orthogonal direction of the polarizability ellipsoid of the repeating structural unit [B] is longer than that of the repeating structural unit [A] with respect to the main chain. When both structural units are copolymerized at a certain ratio, the optical anisotropy of the repeating structural unit [A] is cancelled by the optical anisotropy of the repeating structural unit [B] so that the polarizability ellipsoid is close to spherical (to be isotropic). Furthermore, an optically transparent optical material can be obtained without a physical mixture of a polymer having a polarizability ellipsoid with a different length and direction, and without causing a spinodal phase separation by copolymerization either. When this optical material is made into a film, an optical film having very low orientation birefringence can be obtained. Also, when the orientation birefringence is very low, the photoelastic constant of the polymer becomes very small as well, and the stress birefringence also becomes very low with respect to stress distortion remained in the molded product by injection molding or the like.

Meanwhile, the effect of cancelling the optical anisotropy of the repeating structural unit [A] by the optical anisotropy of the repeating structural unit [B] is different depending on the binding chain of the repeating structural units [A] and [B] of the cyclic olefin copolymer as well. That is, a copolymerization reaction is affected by each of chain lengths of at least two repeating structural unit [A] and repeating structural unit [B], random copolymerizability of the repeating structural units [A] and [B], or tacticity such as isotactic, syndiotactic or the like of respective chains in some cases. These depend on influence of electron density of the double bond that is a reaction site of ring-opening metathesis polymerization in respective monomers or bulkiness of the substituent, or reaction specificity of a ring-opening metathesis polymerization catalyst. After hydrogenation, random copolymerizability or tacticity such as isotactic, syndiotactic or the like of respective chains is maintained as well. Furthermore, the cyclic olefin copolymer containing a repeating structural unit [C] is also considered the same.

In the present invention, the molar ratio of [A] to [B] of the cyclic olefin copolymer containing at least a repeating structural unit [A] represented by the general formula (1) and a repeating structural unit [B] represented by the general formula (2), that is, [A]/[B], is in the range of 95/5 to 1/99, preferably in the range of 80/20 to 1/99, further preferably in the range of 75/25 to 5/95 and more preferably in the range of 70/30 to 10/90.

Furthermore, in the present invention, the molar ratio of [C] to ([A]+[B]) of the cyclic olefin copolymer containing at least a repeating structural unit [A] represented by the general formula (1) and a repeating structural unit [B] represented by the general formula (2) and having a molar ratio [A]/[B] in the range of 95/5 to 1/99, preferably in the range of 80/20 to 1/99, further preferably in the range of 75/25 to 5/95, more preferably in the range of 70/30 to 10/90, and particularly preferably in the range of 30/70 to 10/90, and containing a repeating structural unit [C] represented by the general formula (3), that is, [C]/([A]+[B]), is in the range of 1/99 to 40/60, preferably in the range of 3/97 to 30/70, further preferably in the range of 5/95 to 20/80 and particularly preferably in the range of 5/95 to 15/85.

When the ratios are out of these ranges, there is not obtained an optical material in which the effect of cancellation of the optical anisotropy is very small and the orientation birefringence or stress birefringence is very low.

In the present invention, the repeating structural unit [A] represented by the general formula (1) is represented by the following formula,

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$— ($R^5$ and $R^6$ each independently represent hydrogen or alkyl having 1 to 20 carbon atoms).

More specifically, examples of $R^1$ to $R^4$ in the general formula (1) include fluorine; fluorine-containing alkyl having 1 to 10 carbon atoms such as alkyl obtained by substituting a part or all of the hydrogen atoms with fluorine such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl or the like; fluorine-containing alkoxy having 1 to 10 carbon atoms such as alkoxy obtained by substituting a part or all of the hydrogen atoms with fluorine such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentyloxy, perfluorocyclopentyloxy or the like; fluorine-containing alkoxyalkyl having 2 to 10 carbon atoms such as alkoxyalkyl obtained by substituting a part or all of the hydrogen atoms with fluorine such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentyloxymethyl, perfluorocyclopentyloxymethyl or the like; fluorine-containing aryl having 6 to 20 carbon atoms such as aryl obtained by substituting a part or all of the hydrogen atoms with fluorine such as perfluorophenyl, trifluorophenyl or the like; fluorine-containing alkoxycarbonyl having 2 to 10 carbon atoms such as alkoxycarbonyl obtained by substituting a part or all of the hydrogen atoms with fluorine such as fluoromethoxycarbonyl, difluoromethoxycarbonyl, trifluoromethoxycarbonyl, trifluoroethoxycarbonyl, pentafluoroethoxycarbonyl, heptafluoropropoxycarbonyl, hexafluoroisopropoxycarbonyl, heptafluoroisopropoxycarbonyl, hexafluoro-2-methylisopropoxycarbonyl, perfluoro-2-methylisopropoxycarbonyl, n-perfluorobutoxycarbonyl, n-perfluoropentyloxycarbonyl, perfluorocyclopentyloxycarbonyl or the like; fluorine-containing aryloxycarbonyl having 7 to 20 carbon atoms such as aryloxycarbonyl obtained by substituting a part or all of the hydrogen atoms with fluorine such as perfluorophenyloxycarbonyl, trifluorophenyloxycarbonyl or the like; fluorine-containing alkoxycarbonylalkyl having 3 to 10 carbon atoms such as alkoxycarbonylalkyl obtained by substituting a part or all of the hydrogen atoms with fluorine such as fluoromethoxycarbonylmethyl, difluoromethoxycarbonylmethyl, trifluoromethoxycarbonylmethyl, trifluoroethoxycarbonylmethyl, pentafluoroethoxycarbonylmethyl, heptafluoropropoxycarbonylmethyl, hexafluoroisopropoxycarbonylmethyl, heptafluoroisopropoxycarbonylmethyl, hexafluoro-2-methylisopropoxycarbonylmethyl, perfluoro-2-methylisopropoxycarbonylmethyl, n-perfluorobutoxycarbonylmethyl, n-perfluoropentyloxycarbonylmethyl, perfluorocyclopentyloxymethyl or the like; and fluorine-containing aryloxycarbonylalkyl having 7 to 20 carbon atoms such as aryloxycarbonylmethyl obtained by substituting a part or all of the hydrogen atoms with fluorine such as perfluorophenyloxycarbonylmethyl, trifluorophenyloxycarbonylmethyl or the like.

Further examples include cyano; cyano-containing alkyl having 2 to 10 carbon atoms such as cyanomethyl, cyanoethyl, 1-cyanopropyl, 1-cyanobutyl, 1-cyanohexyl or the like; cyano-containing alkoxy having 2 to 10 carbon atoms such as alkoxy obtained by substituting a part of the hydrogen atoms with cyano such as cyanoethoxy, 1-cyanopropoxy, 1-cyanobutoxy, 1-cyanopentyloxy or the like; cyano-containing alkoxyalkyl having 3 to 10 carbon atoms such as alkoxyalkyl obtained by substituting a part of the hydrogen atoms with cyano such as cyanoethoxymethyl, 1-cyanopropoxymethyl, 1-cyanobutoxymethyl, 1-cyanopentyloxymethyl or the like; cyano-containing aryl having 7 to 20 carbon atoms such as aryl obtained by substituting a part of the hydrogen atoms with cyano such as 4-cyanophenyl, 3,5-dicyanophenyl or the like; cyano-containing alkoxycarbonyl having 3 to 10 carbon atoms such as alkoxycarbonyl obtained by substituting a part of the hydrogen atoms with cyano such as cyanoethoxycarbonyl, 1-cyanopropoxycarbonyl, 1-cyanobutoxycarbonyl, 1-cyanopentyloxycarbonyl or the like; cyano-containing aryloxycarbonyl having 8 to 20 carbon atoms such as aryloxycarbonyl obtained by substituting a part of the hydrogen atoms with cyano such as 4-cyanophenyloxycarbonyl, 3,5-dicyanophenyloxycarbonyl or the like; cyano-containing alkoxycarbonylalkyl having 4 to 10 carbon atoms such as alkoxycarbonylalkyl obtained by substituting a part of the hydrogen atoms with cyano such as cyanoethoxycarbonylmethyl, 1-cyanopropoxycarbonylmethyl, 1-cyanobutoxycarbonylmethyl, 1-cyanopentyloxycarbonylmethyl or the like; and cyano-containing aryloxycarbonylalkyl having 8 to 20 carbon atoms such as aryloxycarbonylalkyl obtained by substituting a part of the hydrogen atoms with cyano such as 4-cyanophenyloxycarbonylmethyl, 3,5-dicyanophenyloxycarbonylmethyl or the like.

Furthermore, $R^1$ to $R^4$ may be bonded to each other to form a ring structure. For example, $R^1$ to $R^4$ may form a ring such as perfluorocycloalkyl, perfluorocycloether interrupted with oxygen or the like.

When $R^1$ to $R^4$ are groups containing no fluorine or groups containing no cyano, examples of $R^1$ to $R^4$ include hydrogen; alkyl having 1 to 10 carbon atoms such as methyl, ethyl, propyl, isopropyl, 2-methylisopropyl, n-butyl, n-pentyl, cyclopentyl or the like; aryl having 6 to 20 carbon atoms such as phenyl, naphthyl or the like; alkoxy having 1 to 10 carbon atoms such as methoxy, ethoxy, tert-butoxy or the like; alkoxyalkyl having 2 to 10 carbon atoms such as methoxymethyl, ethoxymethyl, tert-butoxymethyl or the like; alkoxycarbonyl having 2 to 10 carbon atoms such as methoxycarbonyl, ethoxycarbonyl, tert-butoxycarbonyl or the like; aryloxycarbonyl having 7 to 20 carbon atoms such as phenyloxycarbonyl, methylphenyloxycarbonyl or the like; alkoxycarbonylalkyl having 3 to 10 carbon atoms such as methoxycarbonylmethyl, ethoxycarbonylmethyl, tert-butoxycarbonylmethyl or the like; and aryloxycarbonylalkyl having 8 to 20 carbon atoms such as phenyloxycarbonylmethyl, methylphenyloxycarbonylmethyl or the like.

In the present invention, the repeating structural unit represented by the general formula (1) constituting the cyclic olefin copolymer may be only one kind or may be composed of two or more kinds of structural units in which at least one of $R^1$ to $R^4$ in the general formula (1) is different from the others.

Furthermore, in the present invention, specific examples of the structure of the cyclic olefin polymer containing a repeating structural unit represented by the general formula (1), for example, poly(1-fluoro-2-trifluoromethyl-3,5-cyclopentylene ethylene), poly(1-fluoro-1-trifluoromethyl-3,5-cyclopentylene ethylene), poly(1-methyl-1-fluoro-2-trifluoromethyl-3,5-cyclopentylene ethylene), poly(1,1-difluoro-2-trifluoromethyl-3,5-cyclopentylene ethylene), poly(1,2-difluoro-2-trifluoromethyl-3,5-cyclopentylene ethylene), poly(1-perfluoroethyl-3,5-cyclopentylene ethylene), poly(1,1-bis(trifluoromethyl)-3,5-cyclopentylene ethylene), poly(1,1,2-trifluoro-2-trifluoromethyl-3,5-cyclopentylene ethylene), poly[1,2-bis(trifluoromethyl)-3,5-cyclopentylene ethylene], poly(1-perfluoropropyl-3,5-cyclopentylene ethylene), poly(1-methyl-2-perfluoropropyl-3,5-cyclopentylene ethylene), poly(1-butyl-2-perfluoropropyl-3,5-cyclopentylene ethylene), poly(1-perfluoroisopropyl-3,5-cyclopentylene ethylene), poly(1-methyl-2-perfluoroisopropyl-3,5-cyclopentylene ethylene), poly(1,2-difluoro-1,2-bis(trifluoromethyl)-3,5-cyclopentylene ethylene), poly(1,1,2,2,3,3,3a,6a-octafluorocyclopentyl-4,6-cyclopentylene ethylene), poly(1,1,2,2,3,3,4,4,3a,7a-decafluorocyclohexyl-5,7-cyclopentylene ethylene), poly(1-perfluorobutyl-3,5-cyclopentylene ethylene), poly(1-perfluoro-iso-butyl-3,5-cyclopentylene ethylene), poly(1-perfluoro-tert-butyl-3,5-cyclopentylene ethylene), poly(1-methyl-2-perfluoro-iso-butyl-3,5-cyclopentylene ethylene), poly(1-butyl-2-perfluoro-iso-butyl-3,5-cyclopentylene ethylene), poly(1,2- difluoro-1-trifluoromethyl-2-perfluoroethyl-3,5-cyclopentylene ethylene), poly[1-(1-trifluoromethyl-2,2,3,3,4,4,5,5-octafluoro-cyclopentyl)-3,5-cyclopentylene ethylene)], poly[(1,1,2-trifluoro-2-perfluorobutyl)-3,5-cyclopentylene ethylene], poly(1,2-difluoro-1-trifluoromethyl-2-perfluorobutyl-3,5-cyclopentylene ethylene), poly[1-fluoro-1-perfluoroethyl-2,2-bis(trifluoromethyl)-3,5-cyclopentylene ethylene], poly[1,2-difluoro-1-perfluoropropanoyl-2-trifluoromethyl)-3,5-cyclopentylene ethylene], poly(1-perfluorohexyl-3,5-cyclopentylene ethylene), poly(1-methyl-2-perfluorohexyl-3,5-cyclopentylene ethylene), poly(1-butyl-2-perfluorohexyl-3,5-cyclopentylene ethylene), poly(1-hexyl-2-perfluorohexyl-3,5-cyclopentylene ethylene), poly(1-octyl-2-perfluorohexyl-3,5-cyclopentylene ethylene), poly(1-perfluoroheptyl-3,5-cyclopentylene ethylene), poly(1-perfluorooctyl-3,5-cyclopentylene ethylene), poly(1-perfluorodecanyl-3,5-cyclopentylene ethylene), poly(1,1,2-trifluoro-perfluoropentyl-3,5-cyclopentylene ethylene), poly(1,2-difluoro-1-trifluoromethyl-2-perfluorobutyl-3,5-cyclopenty lene ethylene), poly(1,1,2-trifluoro-2-perfluorohexyl-3,5-cyclopentylene ethylene), poly(1,2-difluoro-1-trifluoromethyl-2-perfluoropentyl-3,5-cyclopentylene ethylene), poly[1,2-bis(perfluorobutyl)-3,5-cyclopentylene ethylene], poly[1,2-bis(perfluorohexyl)-3,5-cyclopentylene ethylene], poly(1-methoxyl-2-trifluoromethyl-3,5-cyclopentylene ethylene), poly(1-tert-butoxymethyl-2-trifluoromethyl-3,5-cyclopentylene ethylene), poly(1-phenyloxycarbonyl-2-trifluoromethyl-3,5-cyclopentylene ethylene), poly(1-phenyloxycarbonylmethyl-2-trifluoromethyl-3,5-cyclopentylene ethylene), poly(1,1,3,3,3a,6a-hexafluorofuranyl-3,5-cyclopentylene ethylene) and the like.

In addition, poly(1-fluoro-2-trifluoromethoxy-3,5-cyclopentylene ethylene), poly(1-fluoro-1-trifluoromethoxy-3,5-cyclopentylene ethylene), poly(1-methyl-1-fluoro-2-trifluoromethoxy-3,5-cyclopentylene ethylene), poly(1,1-difluoro-2-trifluoromethoxy-3,5-cyclopentylene ethylene), poly(1,2-difluoro-2-trifluoromethoxy-3,5-cyclopentylene ethylene), poly(1-perfluoroethoxy-3,5-cyclopentylene ethylene), poly(1,1-bis(trifluoromethoxy)-3,5-cyclopentylene ethylene), poly(1,1,2-trifluoro-2-trifluoromethoxy-3,5-cyclopentylene ethylene), poly(1,2-bis(trifluoromethoxy)-3,5-cyclopentylene ethylene), poly(1-perfluoropropoxy-3,5-cyclopentylene ethylene), poly(1-methyl-2-perfluoropropoxy-3,5-cyclopentylene ethylene), poly(1-butyl-2-perfluoropropoxy-3,5-cyclopentylene ethylene), poly(1-perfluoro-iso-propoxy-3,5-cyclopentylene ethylene), poly(1-methyl-2-perfluoro-iso-propoxy-3,5-cyclopentylene ethylene), poly(1,2-difluoro-1,2-bis(trifluoromethoxy)-3,5-cyclopentylene ethylene), poly(1-perfluorobutoxy-3,5-cyclopentylene ethylene), poly(1-perfluoro-iso-butoxy-3,5-cyclopentylene ethylene), poly(1-perfluoro-tert-butoxy-3,5-cyclopentylene ethylene), poly(1-methyl-2-perfluoro-iso-butoxy-3,5-cyclopentylene ethylene), poly(1-butyl-2-perfluoro-iso-butoxy-3,5-cyclopentylene ethylene), poly(1,2-difluoro-1-trifluoromethoxy-2-perfluoroethoxy-3,5-cyclopen tylene ethylene), poly(1,1,2-trifluoro-2-perfluorobutoxy-3,5-cyclopentylene ethylene), poly(1,2-difluoro-1-trifluoromethoxy-2-perfluorobutoxy-3,5-cyclopen tylene ethylene), poly(1-fluoro-1-perfluoroethoxy-2,2-bis (trifluoromethoxy)-3,5-cyclopentylene ethylene), poly(1,2-difluoro-1-perfluoropropoxy-2-trifluoromethoxy)-3,5-cyclopentylene ethylene), poly(1,1,2-trifluoro-2-perfluoropentyloxy-3,5-cyclopentylene ethylene), poly(1,2-difluoro-1-trifluoromethoxy-2-perfluorobutoxy-3,5-cyclopen tylene ethylene), poly(1,2-difluoro-1-trifluoromethoxy-2-perfluoropentyl-3,5-cyclopen tylene ethylene), poly(1,2-bis(perfluorobutoxy)-3,5-cyclopentylene ethylene), poly(1-methoxyl-2-trifluoromethoxy-3,5-cyclopentylene ethylene), poly(1-tert-butoxymethyl-2-trifluoromethoxy-3,5-cyclopentylene ethylene), poly(1-phenyloxycarbonyl-2-trifluoromethoxy-3,5-cyclopentylene ethylene), poly(1-phenyloxycarbonylmethyl-2-trifluoromethoxy-3,5-cyclopentylene ethylene), poly(1-(2',2',2'-trifluoroethoxy)-3,5-cyclopentylene ethylene), poly(1-(2',2',3',3',3'-pentafluoropropoxy)-3,5-cyclopentylene ethylene), poly(1-methyl-2-(2',2',3',3',3'-pentafluoropropoxy)-3,5-cyclopentylene ethylene), poly(1-butyl-2-(2',2',3',3',3'-pentafluoropropoxy)-3,5-cyclopentylene ethylene), poly(1-(1',1',1'-trifluoro-iso-propoxy)-3,5-cyclopentylene ethylene), poly(1-methyl-(1',1',1'-trifluoro-iso-propoxy)-3,5-cyclopentylene ethylene), poly(1-(2',2',3',3',4',4',4'-heptafluorobutoxy)-3,5-cyclopentylene ethylene), poly(1-(1',1',1'-trifluoro-iso-butoxy)-3,5-cyclopentylene ethylene), poly(1-(1,1',1'-trifluoro-iso-butoxy)-3,5-cyclopentylene ethylene), poly(1-methyl-2-(1',1',1'-trifluoro-iso-butoxy)-3,5-cyclopentylene ethylene), poly(1-butyl-2-(1',1',1'-trifluoro-iso-butoxy)-3,5-cyclopentylene ethylene), poly(1,2-difluoro-1-trifluoromethoxy-2-(2',2',2'-trifluoroethoxy)-3,5-cyclopentylene ethylene), poly(1,1,2-trifluoro-2-(2',2',3',3',4',4',4'-heptafluorobutoxy)-3,5-cyclopentylene ethylene), poly(1,2-difluoro-1-trifluoromethoxy-2-(2',2',3',3',4',4',4'-heptafluorobutoxy)-3,5-cyclopentylene ethylene), poly(1-fluoro-1-(2',2',2'-trifluoroethoxy)-2,2-bis (trifluoromethoxy)-3,5-cyclopentylene ethylene), poly(1,2-difluoro-1-(2',2',3',3',3'-pentafluoropropoxy)-2-trifluoro methoxy)-3,5-cyclopentylene ethylene), poly(1,2-difluoro-1-trifluoromethoxy-2-perfluoropentyl-3,5-cyclopen tylene ethylene), poly(1,2-bis(perfluorobutoxy)-3,5-cyclopentylene ethylene), poly(1,1,2-trifluoro-2-(1',1',1'-trifluoro-iso-propoxy)-3,5-cyclopentylene ethylene), poly(1,2-difluoro-1-trifluoromethoxy-2-(2',2',3',3',4',4',4'-heptafluorobutoxy)-3,5-cyclopentylene ethylene), poly(1,2-bis(2',2',3',3',4',4',4'-heptafluorobutoxy)-3,5-cyclopentylene ethylene), poly(1,2-bis(perfluorohexyloxy)-3,5-cyclopentylene ethylene) and the like.

In addition, poly(1-trifluoromethoxycarbonyl-3,5-cyclopentylene ethylene), poly(1-methyl-2-trifluoromethoxycarbonyl-3,5-cyclopentylene ethylene), poly(1-methoxyl-2-trifluoromethoxycarbonyl-3,5-cyclopentylene ethylene), poly(1-tert-butoxymethyl-2-trifluoromethoxycarbonyl-3,5-cyclopentyl ene ethylene), poly(1-phenyloxycarbonyl-2-trifluoromethoxycarbonyl-3,5-cyclopentyl ene ethylene), poly(1-phenyloxycarbonylmethyl-2-trifluoromethoxycarbonyl-3,5-cyclo pentylene ethylene), poly(1-(hexafluoro-2'-methylisopropoxycarbonyl)-3,5-cyclopentylene ethylene), poly(1-(perfluoro-2'-methylisopropoxycarbonyl)-3,5-cyclopentylene ethylene), poly(1-perfluorophenyloxycarbonyl-3,5-cyclopentylene ethylene), poly(1-methyl-1-perfluorophenyloxycarbonyl-3,5-cyclopentylene ethylene), poly(1-methoxyl-2-perfluorophenyloxycarbonyl-3,5-cyclopentylene ethylene), poly(1-tert-butoxymethyl-2-perfluorophenyloxycarbonyl-3,5-cyclopentylene ethylene), poly(1-phenyloxycarbonyl-2-perfluorophenyloxycarbonyl-3,5-cyclopentylene ethylene), poly(1-phenyloxycarbonylmethyl-2-perfluorophenyloxycarbonyl-3,5-cyclopentylene ethylene), poly(1-trifluoromethoxycarbonylmethyl-3,5-cyclopentylene ethylene), poly(1-methyl-2-trifluoromethoxycarbonylmethyl-3,5-cyclopentylene ethylene), poly(1-methoxyl-2-trifluoromethoxycarbonylmethyl-3,5-cyclopentylene ethylene), poly(1-tert-butoxymethyl-2-trifluoromethoxycarbonylmethyl-3,5-cyclo pentylene ethylene), poly(1-phenyloxycarbonyl-2-trifluoromethoxycarbonylmethyl-3,5-cyclo pentylene ethylene), poly(1-phenyloxycarbonylmethyl-2-trifluoromethoxycarbonylmethyl-3,5-cyclopentylene ethylene), poly(1-(hexafluoro-2'-methylisopropoxycarbonylmethyl)-3,5-cyclopentylene ethylene), poly(1-(perfluoro-2'-methylisopropoxycarbonylmethyl)-3,5-cyclopentylene ethylene), poly(1-perfluorophenyloxycarbonylmethyl-3,5-cyclopentylene ethylene), poly(1-methyl-1-perfluorophenyloxycarbonylmethyl-3,5-cyclopentylene ethylene), poly(1-methoxyl-2-perfluorophenyloxycarbonylmethyl-3,5-cyclopentylene ethylene), poly(1-tert-butoxymethyl-2-perfluorophenyloxycarbonylmethyl-3,5-cyclopentylene ethylene), poly(1-phenyloxycarbonyl-2-perfluorophenyloxycarbonylmethyl-3,5-cyclopentylene ethylene), poly(1-phenyloxycarbonylmethyl-2-perfluorophenyloxycarbonylmethyl-3,5-cyclopentylene ethylene) and the like.

Furthermore, poly(1-cyano-3,5-cyclopentylene ethylene), poly(1-cyano-1-methyl-3,5-cyclopentylene ethylene), poly(1-cyano-2-methyl-3,5-cyclopentylene ethylene), poly(1-cyano-2-phenyl-3,5-cyclopentylene ethylene), poly(1-cyano-2-naphthyl-3,5-cyclopentylene ethylene), poly(1-cyano-2-methoxyl-3,5-cyclopentylene ethylene), poly(1-cyano-2-methoxymethyl-3,5-cyclopentylene ethylene), poly(1-cyano-2-methoxycarbonyl-3,5-cyclopentylene ethylene), poly(1-cyano-2-phenyloxycarbonyl-3,5-cyclopentylene ethylene), poly(1-cyano-2-phenyloxycarbonylmethyl-3,5-cyclopentylene ethylene), poly(1-cyanomethyl-3,5-cyclopentylene ethylene), poly(1-cyanomethyl-2-methyl-3,5-cyclopentylene ethylene), poly(1-cyanomethyl-2-phenyl-3,5-cyclopentylene ethylene), poly(1-cyanomethyl-2-methoxyl-3,5-cyclopentylene ethylene), poly(1-cyanomethyl-2-methoxymethyl-3,5-cyclopentylene ethylene), poly(1-cyanomethyl-2-methoxycarbonyl-3,5-cyclopentylene ethylene), poly(1-cyanomethyl-2-phenyloxycarbonyl-3,5-cyclopentylene ethylene), poly(1-cyanomethyl-2-phenyloxycarbonylmethyl-3,5-cyclopentylene ethylene), poly(1-cyanoethyl-3,5-cyclopentylene ethylene), poly(1-cyanoethyl-2-methyl-3,5-cyclopenlylene ethylene), poly(1-cyanoethyl-2-phenyl-3,5-cyclopentylene ethylene), poly(1-cyanoethyl-2-methoxyl-3,5-cyclopentylene ethylene), poly(1-cyanoethyl-2-methoxymethyl-3,5-cyclopentylene ethylene), poly(1-cyanoethyl-2-methoxycarbonyl-3,5-cyclopentylene ethylene), poly(1-cyanoethyl-2-phenyloxycarbonyl-3,5-cyclopentylene ethylene), poly(1-cyanoethyl-2-phenyloxycarbonylmethyl-3,5-cyclopentylene ethylene), poly(1-cyanopropyl-3,5-cyclopentylene ethylene), poly(1-cyanobutyl-3,5-cyclopentylene ethylene), poly(1-cyanohexyl-3,5-cyclopentylene ethylene) and the like.

In addition, poly(1-cyanoethoxy-3,5-cyclopentylene ethylene), poly(1-cyanoethoxy-1-methyl-3,5-cyclopentylene ethylene), poly(1-cyanoethoxy-2-methyl-3,5-cyclopentylene ethylene), poly(1-cyanoethoxy-2-phenyl-3,5-cyclopentylene ethylene), poly(1-cyanoethoxy-2-naphthyl-3,5-cyclopentylene ethylene), poly(1-cyanoethoxy-2-methoxyl-3,5-cyclopentylene ethylene), poly(1-cyanoethoxy-2-methoxymethyl-3,5-cyclopentylene ethylene), poly(1-cyanoethoxy-2-methoxycarbonyl-3,5-cyclopentylene ethylene), poly(1-cyanoethoxy-2-phenyloxycarbonyl-3,5-cyclopentylene ethylene), poly(1-cyanoethoxy-2-phenyloxycarbonylmethyl-3,5-cyclopentylene ethylene), poly(1-cyanoethoxymethyl-3,5-cyclopentylene ethylene), poly(1-cyanoethoxymethyl-1-methyl-3,5-cyclopentylene ethylene), poly(1-cyanoethoxymethyl-2-methyl-3,5-cyclopentylene ethylene), poly(1-cyanoethoxymethyl-2-phenyl-3,5-cyclopentylene ethylene), poly(1-cyanoethoxymethyl-2-methoxyl-3,5-cyclopentylene ethylene), poly(1-cyanoethoxymethyl-2-methoxymethyl-3,5-cyclopentylene ethylene), poly(1-cyanoethoxymethyl-2-methoxycarbonyl-3,5-cyclopentylene ethylene), poly(1-cyanoethoxymethyl-2-phenyloxycarbonyl-3,5-cyclopentylene ethylene), poly(1-cyanoethoxymethyl-2-phenyloxycarbonylmethyl-3,5-cyclopentylene ethylene), poly(1-(4'-cyanophenyl)-3,5-cyclopentylene ethylene), poly(1-(4'-cyanophenyl)-1-methyl-3,5-cyclopentylene ethylene), poly(1-(4'-cyanophenyl)-2-methyl-3,5-cyclopentylene ethylene), poly(1-(4'-cyanophenyl)-2-phenyl-3,5-cyclopentylene ethylene), poly(1-(4'-cyanophenyl)-2-naphthyl-3,5-cyclopentylene ethylene), poly(1-(4'-cyanophenyl)-2-methoxyl-3,5-cyclopentylene ethylene), poly(1-(4'-cyanophenyl)-2-methoxymethyl-3,5-cyclopentylene ethylene), poly(1-(4'-cyanophenyl)-2-methoxycarbonyl-3,5-cyclopentylene ethylene), poly(1-(4'-cyanophenyl)-2-phenyloxycarbonyl-3,5-cyclopentylene ethylene), poly(1-(4'-cyanophenyl)-2-phenyloxycarbonylmethyl-3,5-cyclopentylene ethylene), poly(1-cyanoethoxycarbonyl-3,5-cyclopentylene ethylene), poly(1-cyanoethoxycarbonyl-1-methyl-3,5-cyclopentylene ethylene), poly(1-cyanoethoxycarbonyl-2-methyl-3,5-cyclopentylene ethylene), poly(1-cyanoethoxycarbonyl-2-phenyl-3,5-cyclopentylene ethylene), poly(1-cyanoethoxycarbonyl-2-naphthyl-3,5-cyclopentylene ethylene), poly(1-cyanoethoxycarbonyl-2-methoxyl-3,5-cyclopentylene ethylene), poly(1-cyanoethoxycarbonyl-2-methoxymethyl-3,5-cyclopentylene ethylene), poly(1-cyanoethoxycarbonyl-2-methoxycarbonyl-3,5-cyclopentylene ethylene), poly(1-cyanoethoxycarbonyl-2-phenyloxycarbonyl-3,5-cyclopentylene ethylene), poly(1-cyanoethoxycarbonyl-2-phenyloxycarbonylmethyl-3,5-cyclopentylene ethylene), poly(1-(4'-cyanophenylcarbonyl)-3,5-cyclopentylene ethylene), poly(1-(4'-cyanophenylcarbonyl)-1-methyl-3,5-cyclopentylene ethylene), poly(1-(4'-cyanophenylcarbonyl)-2-methyl-3,5-cyclopentylene ethylene), poly(1-(4'-cyanophenylcarbonyl)-2-phenyl-3,5-cyclopentylene ethylene), poly(1-(4'-cyanophenylcarbonyl)-2-naphthyl-3,5-cyclopentylene ethylene), poly(1-(4'-cyanophenylcarbonyl)-2-methoxyl-3,5-cyclopentylene ethylene), poly(1-(4'-cyanophenylcarbonyl)-2-methoxymethyl-3,5-cyclopentylene ethylene), poly(1-(4'-cyanophenylcarbonyl)-2-methoxycarbonyl-3,5-cyclopentylene ethylene), poly(1-(4'-cyanophenylcarbonyl)-2-phenyloxycarbonyl-3,5-cyclopentylene ethylene), poly(1-(4'-cyanophenylcarbonyl)-2-phenyloxycarbonylmethyl-3,5-cyclopentylene ethylene), poly(1-cyanoethoxycarbonylmethyl-3,5-cyclopentylene ethylene), poly(1-cyanoethoxycarbonylmethyl-1-methyl-3,5-cyclopentylene ethylene), poly(1-cyanoethoxycarbonylmethyl-2-methyl-3,5-cyclopentylene ethylene), poly(1-cyanoethoxycarbonylmethyl-2-phenyl-3,5-cyclopentylene ethylene), poly(1-(cyanoethoxycarbonyl-2-methoxyl-3,5-cyclopentylene ethylene), poly(1-cyanoethoxycarbonyl-2-methoxymethyl-3,5-cyclopentylene ethylene), poly(1-cyanoethoxycarbonylmethyl-2-methoxycarbonyl-3,5-cyclopentylene ethylene), poly(1-cyanoethoxycarbonylmethyl-2-phenyloxycarbonyl-3,5-cyclopentylene ethylene), poly(1-cyanoethoxycarbonylmethyl-2-phenyloxycarbonylmethyl-3,5-cyclopentylene ethylene), poly(1-(4'-cyanophenylcarbonylmethyl)-3,5-cyclopentylene ethylene), poly(1-(4'-cyanophenylcarbonylmethyl)-1-methyl-3,5-cyclopentylene ethylene), poly(1-(4'-cyanophenylcarbonylmethyl)-2-methyl-3,5-cyclopentylene ethylene), poly(1-(4'-cyanophenylcarbonylmethyl)-2-phenyl-3,5-cyclopentylene ethylene), poly(1-(4'-cyanophenylcarbonylmethyl)-2-naphthyl-3,5-cyclopentylene ethylene), poly(1-(4'-cyanophenylcarbonylmethyl)-2-methoxyl-3,5-cyclopentylene ethylene), poly(1-(4'-cyanophenylcarbonylmethyl)-2-methoxymethyl-3,5-cyclopentylene ethylene), poly(1-(4'-cyanophenylcarbonylmethyl)-2-methoxycarbonyl-3,5-cyclopentylene ethylene), poly(1-(4'-cyanophenylcarbonylmethyl)-2- phenyloxycarbonyl-3,5-cyclopentylene ethylene), poly(1-(4'-cyanophenylcarbonylmethyl)-2-phenyloxycarbonylmethyl-3,5-cyclopentylene ethylene) and the like.

In addition, poly(1,2-dicyano-3,5-cyclopentylene ethylene), poly(1-cyano-2-cyanomethyl-3,5-cyclopentylene ethylene), poly(1-cyano-2-cyanoethyl-3,5-cyclopentylene ethylene), poly(1,2-dicyanomethyl-3,5-cyclopentylene ethylene), poly(1-cyanomethyl-2-cyanoethyl-3,5-cyclopentylene ethylene), poly(1,2-dicyanoethyl-3,5-cyclopentylene ethylene), poly(1-cyanoethyl-2-cyanomethyl-3,5-cyclopentylene ethylene), poly(1,2-dicyanopropyl-3,5-cyclopentylene ethylene), poly(1-cyano-2-fluoro-3,5-cyclopentylene ethylene), poly(1-cyano-2-trifluoromethyl-3,5-cyclopentylene ethylene), poly(1-cyano-2,2-bis(trifluoromethyl)-3,5-cyclopentylene ethylene), poly(1-cyanomethyl-2-fluoro-3,5-cyclopentylene ethylene), poly(1-cyanomethyl-2-trifluoromethyl-3,5-cyclopentylene ethylene), poly(1-cyanomethyl-2,2-bis(trifluoromethyl)-3,5-cyclopentylene ethylene), poly(1-cyanoethyl-2-fluoro-3,5-cyclopentylene ethylene), poly(1-cyanoethyl-2-trifluoromethyl-3,5-cyclopentylene ethylene), poly(1-cyanoethyl-2,2-bis(trifluoromethyl)-3,5-cyclopentylene ethylene) and the like.

Furthermore, examples of $X^1$ in the general formula (1) include —O—, —S—, —$NR^5$—, —$PR^5$— and —$CR^5R^6$— ($R^5$ and $R^6$ each independently represent hydrogen or alkyl having 1 to 20 carbon atoms) instead of —$CH_2$— of cyclopentylene.

In the present invention, the repeating structural unit [B] represented by the general formula (2) constituting the cyclic olefin copolymer along with the repeating structural unit [A] represented by the general formula (1) is represented by the following formula,

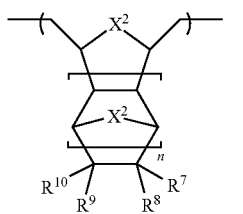

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 20 carbon atoms, cyano-containing aryloxycarbonyl having 8 to 20 carbon atoms, cyano-containing alkoxycarbonylalkyl having 4 to 0 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3.

More specifically, examples of $R^7$ to $R^{10}$ in the general formula (2) include fluorine; fluorine-containing alkyl having 1 to 10 carbon atoms such as alkyl obtained by substituting a part or all of the hydrogen atoms with fluorine such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl or the like; fluorine-containing alkoxy having 1 to 10 carbon atoms such as alkoxy obtained by substituting a part or all of the hydrogen atoms with fluorine such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentyloxy, perfluorocyclopentyloxy or the like; fluorine-containing alkoxyalkyl having 2 to 10 carbon atoms such as alkoxyalkyl obtained by substituting a part or all of the hydrogen atoms with fluorine such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentyloxymethyl, perfluorocyclopentyloxymethyl or the like; fluorine-containing aryl having 6 to 20 carbon atoms such as aryl obtained by substituting a part or all of the hydrogen atoms with fluorine such as perfluorophenyl, trifluorophenyl or the like; fluorine-containing alkoxycarbonyl having 2 to 10 carbon atoms such as alkoxycarbonyl obtained by substituting a part or all of the hydrogen atoms with fluorine such as fluoromethoxycarbonyl, difluoromethoxycarbonyl, trifluoromethoxycarbonyl, trifluoroethoxycarbonyl, pentafluoroethoxycarbonyl, heptafluoropropoxycarbonyl, hexafluoroisopropoxycarbonyl, heptafluoroisopropoxycarbonyl, hexafluoro-2-methylisopropoxycarbonyl, perfluoro-2-methylisopropoxycarbonyl, n-perfluorobutoxycarbonyl, n-perfluoropentyloxycarbonyl, perfluorocyclopentyloxycarbonyl or the like; fluorine-containing aryloxycarbonyl having 7 to 20 carbon atoms such as aryloxycarbonyl obtained by substituting a part or all of the hydrogen atoms with fluorine such as perfluorophenyloxycarbonyl, trifluorophenyloxycarbonyl or the like; fluorine-containing alkoxycarbonylalkyl having 3 to 10 carbon atoms such as alkoxycarbonylalkyl obtained by substituting a part or all of the hydrogen atoms with fluorine such as fluoromethoxycarbonylmethyl, difluoromethoxycarbonylmethyl, trifluoromethoxycarbonylmethyl, trifluoroethoxycarbonylmethyl, pentafluoroethoxycarbonylmethyl, heptafluoropropoxycarbonylmethyl, hexafluoroisopropoxycarbonylmethyl, heptafluoroisopropoxycarbonylmethyl, hexafluoro-2-methylisopropoxycarbonylmethyl, perfluoro-2-methylisopropoxycarbonylmethyl, n-perfluorobutoxycarbonylmethyl, n-perfluoropentyloxycarbonylmethyl, perfluorocyclopentyloxycarbonylmethyl or the like; and fluorine-containing aryloxycarbonylalkyl having 7 to 20 carbon atoms such as aryloxycarbonylmethyl obtained by substituting a part or all of the hydrogen atoms with fluorine such as perfluorophenyloxycarbonylmethyl, trifluorophenyloxycarbonylmethyl or the like.

Further examples include cyano; cyano-containing alkyl having 2 to 10 carbon atoms such as cyanomethyl, cyanoethyl, 1-cyanopropyl, 1-cyanobutyl, 1-cyanohexyl or the like; cyano-containing alkoxy having 2 to 10 carbon atoms such as alkoxy obtained by substituting a part of the hydrogen atoms with cyano such as cyanoethoxy, 1-cyanopropoxy, 1-cyanobutoxy, 1-cyanopentyloxy or the like; cyano-containing alkoxyalkyl having 3 to 10 carbon atoms such as alkoxyalkyl obtained by substituting a part of the hydrogen atoms with cyano such as cyanoethoxymethyl, 1-cyanopropoxymethyl, 1-cyanobutoxymethyl, 1-cyanopentyloxymethyl or the like; cyano-containing aryl having 7 to 20 carbon atoms such as aryl obtained by substituting a part of the hydrogen atoms with cyano such as 4-cyanophenyl, 3,5-dicyanophenyl or the like; cyano-containing alkoxycarbonyl having 3 to 10 carbon atoms such as alkoxycarbonyl obtained by substituting a part of the hydrogen atoms with cyano such as cyanoethoxycarbonyl, 1-cyanopropoxycarbonyl, 1-cyanobutoxycarbonyl, 1-cyanopentyloxycarbonyl or the like; cyano-containing aryloxycarbonyl having 8 to 20 carbon atoms such as aryloxycarbonyl obtained by substituting a part of the hydrogen atoms with cyano such as 4-cyanophenyloxycarbonyl, 3,5-dicyanophenyloxycarbonyl or the like; cyano-containing alkoxycarbonylalkyl having 4 to 10 carbon atoms such as alkoxycarbonylalkyl obtained by substituting a part of the hydrogen atoms with cyano such as cyanoethoxycarbonylmethyl, 1-cyanopropoxycarbonylmethyl, 1-cyanobutoxycarbonylmethyl, 1-cyanopentyloxycarbonylmethyl or the like; and cyano-containing aryloxycarbonylalkyl having 8 to 20 carbon atoms such as aryloxycarbonylalkyl obtained by substituting a part of the hydrogen atoms with cyano such as 4-cyanophenyloxycarbonylmethyl, 3,5-dicyanophenyloxycarbonylmethyl or the like.

Furthermore, $R^7$ to $R^{10}$ may be bonded to each other to form a ring structure. For example, $R^7$ to $R^{10}$ may form a ring such as perfluorocycloalkyl, perfluorocycloether interrupted with oxygen or the like.

When $R^7$ to $R^{10}$ are groups containing no fluorine or groups containing no cyano, examples of $R^7$ to $R^{10}$ include hydrogen; alkyl having 1 to 10 carbon atoms such as methyl, ethyl, propyl, isopropyl, 2-methylisopropyl, n-butyl, n-pentyl, cyclopentyl or the like; aryl having 6 to 20 carbon atoms such as phenyl, naphthyl or the like; alkoxy having 1 to 10 carbon atoms such as methoxy, ethoxy, tert-butoxy or the like; alkoxyalkyl having 2 to 10 carbon atoms such as methoxymethyl, ethoxymethyl, tert-butoxymethyl or the like; alkoxycarbonyl having 2 to 10 carbon atoms such as methoxycarbonyl, ethoxycarbonyl, tert-butoxycarbonyl or the like; aryloxycarbonyl having 7 to 20 carbon atoms such as phenyloxycarbonyl, methylphenyloxycarbonyl or the like; alkoxycarbonylalkyl having 3 to 10 carbon atoms such as methoxycarbonylmethyl, ethoxycarbonylmethyl, tert-butoxycarbonylmethyl or the like; and aryloxycarbonylalkyl having 8 to 20 carbon atoms such as phenyloxycarbonylmethyl, methylphenyloxycarbonylmethyl or the like.

In the present invention, the repeating structural unit represented by the general formula (2) constituting the cyclic olefin copolymer may be only one kind or may be composed of two or more kinds of structural units in which at least one of $R^7$ to $R^{10}$ in the general formula (2) is different from the others.

Furthermore, in the present invention, specific examples of the structure of the cyclic olefin polymer containing a repeating structural unit represented by the general formula (2) constituting the cyclic olefin copolymer, for example, containing fluorine, n is 1, such as poly(3-fluoro-4-trifluoromethyl-7,9-tricyclo[4.3.0.1$^{2,5}$] decanylene ethylene), poly(3-fluoro-3-trifluoromethyl-7,9-tricyclo[4.3.0.1$^{2,5}$] decanylene ethylene), poly(3-methyl-3-fluoro-4-trifluoromethyl-7,9-tricyclo[4.3.0.1$^{2,5}$]decanylene ethylene), poly(3,3-difluoro-4-trifluoromethyl-7,9-tricyclo[4.3.0.1$^{2,5}$]decanylene ethylene), poly(3,4-difluoro-3-trifluoromethyl-7,9-tricyclo[4.3.0.1$^{2,5}$] decanylene ethylene), poly(3-perfluoroethyl-7,9-tricyclo[4.3.0.1$^{2,5}$]decanylene ethylene), poly(3,3-bis(trifluoromethyl)-7,9-tricyclo[4.3.0.1$^{2,5}$]decanylene ethylene), poly(3,3,4-trifluoro-4-trifluoromethyl-7,9-tricyclo[4.3.0.1$^{2,5}$] decanylene ethylene), poly(3,4-bistrifluoromethyl-7,9-tricyclo[4.3.0.1$^{2,5}$]decanylene ethylene), poly(3-perfluoropropyl-7,9-tricyclo[4.3.0.1$^{2,5}$]decanylene ethylene), poly(3-methyl-4-perfluoropropyl-7,9-tricyclo[4.3.0.1$^{2,5}$]decanylene ethylene), poly(3-butyl-4-perfluoropropyl-7,9-tricyclo[4.3.0.1$^{2,5}$]decanylene ethylene), poly(3-perfluoroisopropyl-7,9-tricyclo[4.3.0.1$^{2,5}$]decanylene ethylene), poly(3-methyl-4-perfluoroisopropyl-7,9-tricyclo[4.3.0.1$^{2,5}$]decanylene ethylene), poly(3,4-difluoro-3,4-bis(trifluoromethyl)-7,9-tricyclo[4.3.0.1$^{2,5}$]decanylene ethylene), poly(2,3,3,4,4,5,5,6-octafluoro-9,11-tetracyclo[5.5.1.0$^{2,6}$.0$^{8,12}$]tridecanylene ethylene), poly(2,3,3,4,4,5,5,6,6,7-decafluoro-10,12-tetracyclo[6.5.1.0$^{2,7}$.0$^{9,13}$] tetradecanylene ethylene), poly(3-perfluorobutyl-7,9-tricyclo[4.3.0.1$^{2,5}$]decanylene ethylene), poly(3-perfluoro-iso-butyl-7,9-tricyclo[4.3.0.1$^{2,5}$]decanylene ethylene), poly(3-perfluoro-tert-butyl-7,9-tricyclo[4.3.0.1$^{2,5}$]decanylene ethylene), poly(3-methyl-4-perfluoro-tert-butyl-7,9-tricyclo[4.3.0.1$^{2,5}$]decanyl ene ethylene), poly(3-butyl-4-perfluoro-tert-butyl-7,9-tricyclo[4.3.0.1$^{2,5}$]decanylene ethylene), poly(3,4-dimethyl-3-perfluoro-tert-butyl-7,9-tricyclo[4.3.0.1$^{2,5}$] decanylene ethylene), poly(3,3,4-trifluoro-4-perfluorobutyl-7,9-tricyclo[4.3.0.1$^{2,5}$]decanylene ethylene), poly(3,4-difluoro-3-trifluoromethyl-4-perfluorobutyl-7,9-tricyclo[4.3.0.1$^{2,5}$]decanylene ethylene), poly(3-fluoro-3-perfluoroethyl-4,4-bis(trifluoromethyl)-7,9-tricyclo[4.3.0.1$^{2,5}$]decanylene ethylene), poly(3,4-difluoro-3-perfluoropropanyl-4-trifluoromethyl-7,9-tricyclo[4.3.0.1$^{2,5}$] decanylene ethylene), poly(3-perfluorohexyl-7,9-tricyclo[4.3.0.1$^{2,5}$]decanylene ethylene), poly(3-methyl-4-perfluorohexyl-7,9-tricyclo[4.3.0.1$^{2,5}$]decanylene ethylene), poly(3-butyl-4-perfluorohexyl-7,9-tricyclo[4.3.0.1$^{2,5}$]decanylene ethylene), poly(3-hexyl-4-perfluorohexyl-7,9-tricyclo[4.3.0.1$^{2,5}$]decanylene ethylene), poly(3-octyl-4-perfluorohexyl-7,9-tricyclo[4.3.0.1$^{2,5}$]decanylene ethylene), poly(3-perfluoroheptyl-7,9-tricyclo[4.3.0.1$^{2,5}$]decanylene ethylene), poly(3-perfluorodecanyl-7,9-tricyclo[4.3.0.1$^{2,5}$] decanylene ethylene), poly(3,3,4-trifluoro-4-perfluoropentyl-7,9-tricyclo[4.3.0.1$^{2,5}$]decanylene ethylene), poly(3,4-difluoro-3-trifluoromethyl-4-perfluorobutyl-7,9-tricyclo[4.3.0.1$^{2,5}$]decanylene ethylene), poly(3,3,4-trifluoro-4-perfluorohexyl-7,9-tricyclo[4.3.0.1$^{2,5}$]decanylene ethylene), poly(3,4-difluoro-3-trifluoromethyl-4-perfluoropentyl-7,9-tricyclo[4.3.0.1$^{2,5}$]decanylene ethylene), poly(3,4-bis(perfluorobutyl)-7,9-tricyclo[4.3.0.1$^{2,5}$]decanylene ethylene), poly(3,4-bis (perfluorohexyl)-7,9-tricyclo[4.3.0.1$^{2,5}$]decanylene ethylene), poly(3-methoxyl-4-trifluoromethyl-7,9-tricyclo[4.3.0.1$^{2,5}$]decanylene ethylene), poly(3-tert-butoxymethyl-4-trifluoromethyl-7,9-tricyclo[4.3.0.1$^{2,5}$]decanylene ethylene), poly(3-phenyloxycarbonyl-4-trifluoromethyl-7,9-tricyclo[4.3.0.1$^{2,5}$]decanylene ethylene), poly(3-phenyloxycarbonylmethyl-4-trifluoromethyl-7,9-tricyclo[4.3.0.1$^{2,5}$] decanylene ethylene) and the like.

In addition, poly(3-fluoro-4-trifluoromethoxy-7,9-tricyclo[4.3.0.1$^{2,5}$]decanylene ethylene), poly(3-methyl-3-fluoro-4-trifluoromethoxy-7,9-tricyclo[4.3.0.1$^{2,5}$]decanylene ethylene), poly(3,3-difluoro-4-trifluoromethoxy-7,9-tricyclo[4.3.0.1$^{2,5}$]decanyl ene ethylene), poly(3,4-difluoro-4-trifluoromethoxy-7,9-tricyclo[4.3.0.1$^{2,5}$]decanyl ene ethylene), poly(3-perfluoroethoxy-7,9-tricyclo[4.3.0.1$^{2,5}$]decanylene ethylene), poly(3,3,4-trifluoro-4-trifluoromethoxy-7,9-tricyclo[4.3.0.1$^{2,5}$]decanylene ethylene), poly(3,4-bis(trifluoromethoxy)-7,9-tricyclo[4.3.0.1$^{2,5}$]decanylene ethylene), poly(3-perfluoropropoxy-7,9-tricyclo[4.3.0.1$^{2,5}$]decanylene ethylene), poly(3-methyl-4-perfluoropropoxy-7,9-tricyclo[4.3.0.1$^{2,5}$]decanylene ethylene), poly(3-butyl-4-perfluoropropoxy-7,9-tricyclo[4.3.0.1$^{2,5}$]decanylene ethylene), poly(3-perfluoro-iso-propoxy-7,9-tricyclo[4.3.0.1$^{2,5}$]decanylene ethylene), poly(3-methyl-4-perfluoro-iso-propoxy-7,9-tricyclo[4.3.0.1$^{2,5}$]decanylene ethylene), poly(3,4-difluoro-3,4-bis(trifluoromethoxy)-7,9-tricyclo[4.3.0.1$^{2,5}$]decanylene ethylene), poly(3-perfluorobutoxy-7,9-tricyclo[4.3.0.1$^{2,5}$]decanylene ethylene), poly(3-perfluoro-iso-butoxy-7,9-tricyclo[4.3.0.1$^{2,5}$]decanylene ethylene), poly(3-perfluoro-tert-butoxy-7,9-tricyclo[4.3.0.1$^{2,5}$]decanylene ethylene), poly(3-methyl-4-perfluoro-iso-butoxy-7,9-tricyclo[4.3.0.1$^{2,5}$]decanyl ene ethylene), poly(3-butyl-4-perfluoro-iso-butoxy-7,9-tricyclo[4.3.0.1$^{2,5}$]decanylene ethylene), poly(3,4-difluoro-3-trifluoromethoxy-4-perfluoroethoxy-7,9-tricyclo[4.3.0.1$^{2,5}$]decanylene ethylene), poly(3,3,4-trifluoro-4-perfluorobutoxy-7,9-tricyclo[4.3.0.1$^{2,5}$]decanylene ethylene), poly(3,4-difluoro-3-trifluoromethoxy-4-perfluorobutoxy-7,9-tricyclo[4.3.0.1$^{2,5}$]decanylene ethylene), poly(3-fluoro-3-perfluoroethoxy-4,4-bis (trifluoromethoxy)-7,9-tricyclo[4.3.0.1$^{2,5}$]decanylene ethylene), poly(3,4-difluoro-3-perfluoropropoxy-4-trifluoromethoxy)-7,9-tricyclo[4.3.0.1$^{2,5}$]decanylene ethylene), poly(3,3,4-trifluoro-4-perfluoropentyloxy-7,9-tricyclo[4.3.0.1$^{2,5}$]decanylene ethylene), poly(3,4-difluoro-3-trifluoromethoxy-4-perfluorobutoxy-7,9-tricyclo[4.3.0.1$^{2,5}$]decanylene ethylene), poly(3,4-difluoro-3-trifluoromethoxy-4-perfluoropentyl-7,9-tricyclo[4.3.0.1$^{2,5}$]decanylene ethylene), poly(3,4-bis(perfluorobutoxy)-7,9-tricyclo[4.3.0.1$^{2,5}$]decanylene ethylene), poly(3-methoxyl-4-trifluoromethoxy-7,9-tricyclo[4.3.0.1$^{2,5}$]decanylene ethylene), poly(3-tert-butoxymethyl-4-trifluoromethoxy-7,9-tricyclo[4.3.0.1$^{2,5}$]decanylene ethylene), poly(3-phenyloxycarbonyl-4-trifluoromethoxy-7,9-tricyclo[4.3.0.1$^{2,5}$]decanylene ethylene), poly(3-phenyloxycarbonylmethyl-4-trifluoromethoxy-7,9-tricyclo[4.3.0.1$^{2,5}$]decanylene ethylene), poly(3-(2',2',2'-trifluoroethoxy)-7,9-tricyclo[4.3.0.1$^{2,5}$]decanylene ethylene), poly(3-(2',2',3',3',3'-pentafluoropropoxy)-7,9-tricyclo[4.3.0.1$^{2,5}$]decanylene ethylene), poly(3-methyl-4-(2',2',3',3',3'-pentafluoropropoxy)-7,9-tricyclo[4.3.0.1$^{2,5}$]decanylene ethylene), poly(3-butyl-4-(2',2',3',3',3'-pentafluoropropoxy)-7,9-tricyclo[4.3.0.1$^{2,5}$]decanylene ethylene), poly(3-(1',1',1'-trifluoro-iso-propoxy)-7,9-tricyclo[4.3.0.1$^{2,5}$]decanylene ethylene), poly(3-methyl-(1',1',1'-trifluoro-iso-propoxy)-7,9-tricyclo[4.3.0.1$^{2,5}$]decanylene ethylene), poly(3-(2',2',3',3',4',4',4'-heptafluorobutoxy)-7,9-tricyclo[4.3.0.1$^{2,5}$]decanylene ethylene), poly(3-(1',1',1'-trifluoro-iso-butoxy)-7,9-tricyclo[4.3.0.1$^{2,5}$]decanylene ethylene), poly(3-(1',1',1'-trifluoro-iso-butoxy)-7,9-tricyclo[4.3.0.1$^{2,5}$]decanylene ethylene), poly(3-methyl-4-(1',1',1'-trifluoro-iso-butoxy)-7,9-tricyclo[4.3.0.1$^{2,5}$]decanylene ethylene), poly(3-butyl-4-(1',1',1'-trifluoro-iso-butoxy)-7,9-tricyclo[4.3.0.1$^{2,5}$]decanylene ethylene), poly(3,4-difluoro-3-trifluoromethoxy-4-(2',2',2'-trifluoroethoxy)-7,9-tricyclo[4.3.0.1$^{2,5}$]decanylene ethylene), poly(3,3,4-trifluoro-4-(2',2',3',3',4',4',4'-heptafluorobutoxy)-7,9-tricyclo[4.3.0.1$^{2,5}$]decanylene ethylene), poly(3,4-difluoro-3-trifluoromethoxy-4-(2',2',3',3',4',4',4'-heptafluorobutoxy)-7,9-tricyclo[4.3.0.1$^{2,5}$]decanylene ethylene), poly(3-fluoro-3-(2',2',2'-trifluoroethoxy)-4,4-bis(trifluoromethoxy)-7,9-tricyclo[4.3.0.1$^{2,5}$]decanylene ethylene), poly(3,4-difluoro-3-(2',2',3',3',3'-pentafluoropropoxy)-4-trifluoro methoxy)-7,9-tricyclo[4.3.0.1$^{2,5}$]decanylene ethylene), poly(3,3,4-trifluoro-4-(1',1',1'-trifluoro-iso-propoxy)-7,9-tricyclo[4.3.0.1$^{2,5}$]decanylene ethylene), poly(3,4-difluoro-3-trifluoromethoxy-4-(2',2',3',3',4',4',4'-heptafluorobutoxy)-7,9-tricyclo[4.3.0.1$^{2,5}$]decanylene ethylene), poly(3,4-bis (2',2',3',3',4',4',4'-heptafluorobutoxy)-7,9-tricyclo[4.3.0.1$^{2,5}$]decanylene ethylene), poly(3,4-bis (perfluorohexyloxy)-7,9-tricyclo[4.3.0.1$^{2,5}$]decanylene ethylene) and the like.

In addition, poly(3-trifluoromethoxycarbonyl-7,9-tricyclo[4.3.0.1$^{2,5}$]decanylene ethylene), poly(3-methyl-4-trifluoromethoxycarbonyl-7,9-tricyclo[4.3.0.1$^{2,5}$]decanylene ethylene), poly(3-methoxyl-4-trifluoromethoxycarbonyl-7,9-tricyclo[4.3.0.1$^{2,5}$]decanylene ethylene), poly(3-tert-butoxymethyl-4-trifluoromethoxycarbonyl-7,9-tricyclo[4.3.0.1$^{2,5}$]decanylene ethylene), poly(3-phenyloxycarbonyl-4-trifluoromethoxycarbonyl-7,9-tricyclo[4.3.0.1$^{2,5}$]decanylene ethylene), poly(3-phenyloxycarbonylmethyl-4-trifluoromethoxycarbonyl-7,9-tricyclo[4.3.0.1$^{2,5}$]decanylene ethylene), poly(3-(hexafluoro-2'-methylisopropoxycarbonyl)-7,9-tricyclo[4.3.0.1$^{2,5}$]decanylene ethylene), poly(3-(perfluoro-2'-methylisopropoxycarbonyl)-7,9-tricyclo[4.3.0.1$^{2,5}$]decanylene ethylene), poly(3-perfluorophenyloxycarbonyl-7,9-tricyclo[4.3.0.1$^{2,5}$]decanylene ethylene), poly(3-methyl-3-perfluorophenyloxycarbonyl-7,9-tricyclo[4.3.0.1$^{2,5}$]decanylene ethylene), poly(3-methoxyl-4-perfluorophenyloxycarbonyl-7,9-tricyclo[4.3.0.1$^{2,5}$]decanylene ethylene), poly(3-tert-butoxymethyl-4-perfluorophenyloxycarbonyl-7,9-tricyclo[4.3.0.1$^{2,5}$]decanylene ethylene), poly(3-phenyloxycarbonyl-4-perfluorophenyloxycarbonyl-7,9-tricyclo[4.3.0.1$^{2,5}$]decanylene ethylene), poly(3-phenyloxycarbonylmethyl-4-perfluorophenyloxycarbonyl-7,9-tricyclo[4.3.0.1$^{2,5}$]decanylene ethylene), poly(3-trifluoromethoxycarbonylmethyl-7,9-tricyclo[4.3.0.1$^{2,5}$]decanylene ethylene), poly(3-methyl-4-trifluoromethoxycarbonylmethyl-7,9-tricyclo[4.3.0.1$^{2,5}$]decanylene ethylene), poly(3-methoxyl-4-trifluoromethoxycarbonylmethyl-7,9-tricyclo[4.3.0.1$^{2,5}$]decanylene ethylene), poly(3-tert-butoxymethyl-4-trifluoromethoxycarbonylmethyl-7,9-tricyclo[4.3.0.1$^{2,5}$]decanylene ethylene), poly(3-phenyloxycarbonyl-4-trifluoromethoxycarbonylmethyl-7,9-tricyclo[4.3.0.1$^{2,5}$]decanylene ethylene), poly(3-phenyloxycarbonylmethyl-4-trifluoromethoxycarbonylmethyl-7,9-tricyclo[4.3.0.1$^{2,5}$]decanylene ethylene), poly(3-(hexafluoro-2'-methylisopropoxycarbonylmethyl)-7,9-tricyclo[4.3.0.1$^{2,5}$]decanylene ethylene), poly(3-(perfluoro-2'-methylisopropoxycarbonylmethyl)-7,9-tricyclo[4.3.0.1$^{2,5}$]decanylene ethylene), poly(3-perfluorophenyloxycarbonylmethyl-7,9-tricyclo[4.3.0.1$^{2,5}$]decanylene ethylene), poly(3-methyl-3-perfluorophenyloxycarbonylmethyl-7,9-tricyclo[4.3.0.1$^{2,5}$]decanylene ethylene), poly(3-methoxyl-4-perfluorophenyloxycarbonylmethyl-7,9-tricyclo[4.3.0.1$^{2,5}$]decanylene ethylene), poly(3-tert-butoxymethyl-4-perfluorophenyloxycarbonylmethyl-7,9-tricyclo[4.3.0.1$^{2,5}$]decanylene ethylene), poly(3-phenyloxycarbonyl-4-perfluorophenyloxycarbonylmethyl-7,9-tricyclo[4.3.0.1$^{2,5}$]decanylene ethylene), poly(3-phenyloxycarbonylmethyl-4- perfluorophenyloxycarbonylmethyl-7,9-tricyclo[4.3.0.1$^{2,5}$] decanylene ethylene) and the like.

Furthermore, containing fluorine, n is 2, such as poly(4-fluoro-5-trifluoromethyl-10,12-pentacyclo[6.5.1.0$^{2,7}$.0$^{9,13}$.1$^{3,6}$]pentadecanylene ethylene), poly(4-methyl-5-fluoro-5-trifluoromethyl-10,12-pentacyclo[6.5.1.0$^{2,7}$.0$^{9,13}$.1$^{3,6}$]pentadecanylene ethylene), poly(4,4-difluoro-5-trifluoromethyl-10,12-pentacyclo[6.5.1.0$^{2,7}$.0$^{9,13}$.1$^{3,6}$]pentadecanylene ethylene), poly(4-perfluoroethyl-10,12-pentacyclo[6.5.1.0$^{2,7}$.0$^{9,13}$.1$^{3,6}$]pentadecanylene ethylene), poly(4,4-bis(trifluoromethyl)-10,12-pentacyclo[6.5.1.0$^{2,7}$.0$^{9,13}$.1$^{3,6}$]pentadecanylene ethylene), poly(4,4,5-trifluoro-5-trifluoromethyl-10,12-pentacyclo[6.5.1.0$^{2,7}$.0$^{9,13}$.1$^{3,6}$]pentadecanylene ethylene), poly(4,5-bis(trifluoromethyl)-10,12-pentacyclo[6.5.1.0$^{2,7}$.0$^{9,13}$.1$^{3,6}$]pentadecanylene ethylene), poly(4-perfluoropropyl-10,12-pentacyclo[6.5.1.0$^{2,7}$.0$^{9,13}$.1$^{3,6}$]pentadecanylene ethylene), poly(4-methyl-5-perfluoropropyl-10,12-pentacyclo[6.5.1.0$^{2,7}$.0$^{9,13}$.1$^{3,6}$]pentadecanylene ethylene), poly(4-methyl-5-perfluoropropyl-10,12-pentacyclo[6.5.1.0$^{2,7}$.0$^{9,13}$.1$^{3,6}$]pentacanylene ethylene), poly(4-butyl-5-perfluoropropyl-10,12-pentacyclo[6.5.1.0$^{2,7}$.0$^{9,13}$.1$^{3,6}$]pentadecanylene ethylene), poly(4-perfluoroisopropyl-10,12-pentacyclo[6.5.1.0$^{2,7}$.0$^{9,13}$.1$^{3,6}$]pentadecanylene ethylene), poly(4-methyl-5-perfluoroisopropyl-10,12-pentacyclo[6.5.1.0$^{2,7}$.0$^{9,13}$.1$^{3,6}$]pentadecanylene ethylene), poly(4,5-difluoro-4,5-bis(trifluoromethyl)-10,12-pentacyclo[6.5.1.0$^{2,7}$.0$^{9,13}$.1$^{3,6}$]pentadecanylene ethylene), poly(3,4,4,5,5,6,6,7-octafluoro-12,14-hexacyclo[7.7.0.1$^{2,8}$.1$^{10,16}$.0$^{3,7}$.0$^{11,15}$]octadecanylene ethylene), poly(3,4,4,5,5,6,6,7,7,8-decafluoro-13,15-hexacyclo[8.7.0.1$^{2,9}$.1$^{11,17}$.0$^{3,8}$.0$^{12,16}$]nonadecanylene ethylene), poly(4-perfluorobutyl-10,12-pentacyclo[6.5.1.0$^{2,7}$.0$^{9,13}$.1$^{3,6}$]pentadecanylene ethylene), poly(4-perfluoro-iso-butyl-10,12-pentacyclo[6.5.1.0$^{2,7}$.0$^{9,13}$.1$^{3,6}$]pentadecanylene ethylene), poly(4-methyl-5-perfluoro-tert-butyl-10,12-pentacyclo[6.5.1.0$^{2,7}$.0$^{9,13}$.1$^{3,6}$]pentadecanylene ethylene), poly(4-butyl-5-perfluoro-tert-butyl-10,12-pentacyclo[6.5.1.0$^{2,7}$.0$^{9,13}$.1$^{3,6}$]pentadecanylene ethylene), poly(4,5-dimethyl-4-perfluoro-tert-butyl-10,12-pentacyclo[6.5.1.0$^{2,7}$.0$^{9,13}$.1$^{3,6}$]pentadecanylene ethylene), poly(4,4,5-trifluoro-5-perfluorobutyl-10,12-pentacyclo[6.5.1.0$^{2,7}$.0$^{9,13}$.1$^{3,6}$]pentadecanylene ethylene), poly(4,5-difluoro-4-trifluoromethyl-5-perfluorobutyl-10,12-pentacyclo[6.5.1.0$^{2,7}$.0$^{9,13}$.1$^{3,6}$]pentadecanylene ethylene), poly(4-fluoro-4-perfluoroethyl-5,5-bis(trifluoromethyl)-10,12-pentacyclo[6.5.1.0$^{2,7}$.0$^{9,13}$.1$^{3,6}$]pentadecanylene ethylene), poly(4,5-difluoro-4-perfluoropropanoyl-5-trifluoromethyl-10,12-pentacyclo[6.5.1.0$^{2,7}$.0$^{9,13}$.1$^{3,6}$]pentadecanylene ethylene), poly(4-perfluorohexyl-10,12-pentacyclo[6.5.1.0$^{2,7}$.0$^{9,13}$.1$^{3,6}$]pentadecanylene ethylene), poly(4-methyl-5-perfluorohexyl-10,12-pentacyclo[6.5.1.0$^{2,7}$.0$^{9,13}$.1$^{3,6}$]pentadecanylene ethylene), poly(4-butyl-5-perfluorohexyl-10,12-pentacyclo[6.5.1.0$^{2,7}$.0$^{9,13}$.1$^{3,6}$]pentadecanylene ethylene), poly(4-hexyl-5-perfluorohexyl-10,12-pentacyclo[6.5.1.0$^{2,7}$.0$^{9,13}$.1$^{3,6}$]pentadecanylene ethylene), poly(4-octyl-5-perfluorohexyl-10,12-pentacyclo[6.5.1.0$^{2,7}$.0$^{9,13}$.1$^{3,6}$]pentadecanylene ethylene), poly(4-perfluoroheptyl-10,12-pentacyclo[6.5.1.0$^{2,7}$.0$^{9,13}$.1$^{3,6}$]pentadecanylene ethylene), poly(4-perfluorooctyl-10,12-pentacyclo[6.5.1.0$^{2,7}$.0$^{9,13}$.1$^{3,6}$]pentadecanylene ethylene), poly(4-perfluorodecanyl-10,12-pentacyclo[6.5.1.0$^{2,7}$.0$^{9,13}$.1$^{3,6}$]pentadecanylene ethylene), poly(4,4,5-trifluoro-5-perfluoropentyl-10,12-pentacyclo[6.5.1.0$^{2,7}$.0$^{9,13}$.1$^{3,6}$]pentadecanylene ethylene), poly(4,5-difluoro-4-trifluoromethyl-5-perfluorobutyl-10,12-pentacyclo[6.5.1.0$^{2,7}$.0$^{9,13}$.1$^{3,6}$]pentadecanylene ethylene), poly(4,4,5-trifluoro-5-perfluorohexyl-10,12-pentacyclo[6.5.1.0$^{2,7}$.0$^{9,13}$.1$^{3,6}$]pentadecanylene ethylene), poly(4,5-difluoro-4-trifluoromethyl-5-perfluoropentyl-10,12-pentacyclo[6.5.1.0$^{2,7}$.0$^{9,13}$.1$^{3,6}$]pentadecanylene ethylene), poly(4,4,5-tris(trifluoromethyl)-5-perfluoro-tert-butyl-10,12-pentacyclo[6.5.1.0$^{2,7}$.0$^{9,13}$.1$^{3,6}$]pentadecanylene ethylene), poly(4,5-bis(perfluorohexyl)-10,12-pentacyclo[6.5.1.0$^{2,7}$.0$^{9,13}$.1$^{3,6}$]pentadecanylene ethylene), poly(4-methoxyl-5-trifluoromethyl-10,12-pentacyclo[6.5.1.0$^{2,7}$.0$^{9,13}$.1$^{3,6}$]pentadecanylene ethylene), poly(4-phenyloxycarbonyl-5-trifluoromethyl-10,12-pentacyclo[6.5.1.0$^{2,7}$.0$^{9,13}$.1$^{3,6}$]pentadecanylene ethylene), poly(4-phenyloxycarbonylmethyl-5-trifluoromethyl-10,12-pentacyclo[6.5.1.0$^{2,7}$.0$^{9,13}$.1$^{3,6}$]pentadecanylene ethylene) and the like.

In addition, poly(4,4,5-trifluoro-5-trifluoromethoxy-10,12-pentacyclo[6.5.1.0$^{2,7}$.0$^{9,13}$.1$^{3,6}$]pentadecanylene ethylene), poly(4,5-bis(trifluoromethoxy)-10,12-pentacyclo[6.5.1.0$^{2,7}$.0$^{9,13}$.1$^{3,6}$]pentadecanylene ethylene), poly(4-perfluoropropoxy-10,12-pentacyclo[6.5.1.0$^{2,7}$.0$^{9,13}$.1$^{3,6}$]pentadecanylene ethylene), poly(4-methyl-5-perfluoropropoxy-10,12-pentacyclo[6.5.1.0$^{2,7}$.0$^{9,13}$.1$^{3,6}$]pentadecanylene ethylene), poly(4-butyl-5-perfluoropropoxy-10,12-pentacyclo[6.5.1.0$^{2,7}$.0$^{9,13}$.1$^{3,6}$]pentadecanylene ethylene), poly(4-perfluoro-iso-propoxy-10,12-pentacyclo[6.5.1.0$^{2,7}$.0$^{9,13}$.1$^{3,6}$]pentadecanylene ethylene), poly(4-methyl-5-perfluoro-iso-propoxy-10,12-pentacyclo[6.5.1.0$^{2,7}$.0$^{9,13}$.1$^{3,6}$]pentadecanylene ethylene), poly(4,5-difluoro-4,5-is(trifluoromethoxy)-10,12-pentacyclo[6.5.1.0$^{2,7}$.0$^{9,13}$.1$^{3,6}$]pentadecanylene ethylene), poly(4-perfluorobutoxy-10,12-pentacyclo[6.5.1.0$^{2,7}$.0$^{9,13}$.1$^{3,6}$]pentadecanylene ethylene), poly(4-perfluoro-iso-butoxy-10,12-pentacyclo[6.5.1.0$^{2,7}$.0$^{9,13}$.1$^{3,6}$]pentadecanylene ethylene), poly(4-perfluoro-tert-butoxy-10,12-pentacyclo[6.5.1.0$^{2,7}$.0$^{9,13}$.1$^{3,6}$]pentadecanylene ethylene), poly(4-methyl-5-perfluoro-iso-butoxy-10,12-pentacyclo[6.5.1.0$^{2,7}$.0$^{9,13}$.1$^{3,6}$]pentadecanylene ethylene), poly(4-butyl-5-perfluoro-iso-butoxy-10,12-pentacyclo[6.5.1.0$^{2,7}$.0$^{9,13}$.1$^{3,6}$]pentadecanylene ethylene), poly(4,5-difluoro-4-trifluoromethoxy-5-perfluoroethoxy-10,12-pentacyclo[6.5.1.0$^{2,7}$.0$^{9,13}$.1$^{3,6}$]pentadecanylene ethylene), poly(4,4,5-trifluoro-5-perfluorobutoxy-10,12-pentacyclo[6.5.1.0$^{2,7}$.0$^{9,13}$.1$^{3,6}$]pentadecanylene ethylene), poly(4,5-difluoro-4-trifluoromethoxy-5-perfluorobutoxy-10,12-pentacyclo[6.5.1.0$^{2,7}$.0$^{9,13}$.1$^{3,6}$]pentadecanylene ethylene), poly(4-fluoro-4-perfluoroethoxy-5,5-bis(trifluoromethoxy)-10,12-pentacyclo[6.5.1.0$^{2,7}$.0$^{9,13}$.1$^{3,6}$]pentadecanylene ethylene), poly(4,5-difluoro-4-perfluoropropoxy-5-trifluoromethoxy)-10,12-pentacyclo[6.5.1.0$^{2,7}$.0$^{9,13}$.1$^{3,6}$]pentadecanylene ethylene), poly(4,4,5-trifluoro-5-perfluoropentyloxy-10,12-pentacyclo[6.5.1.0$^{2,7}$.0$^{9,13}$.1$^{3,6}$]pentadecanylene ethylene), poly(4,5-difluoro-4-trifluoromethoxy-5-perfluorobutoxy-10,12-pentacyclo[6.5.1.0$^{2,7}$.0$^{9,13}$.1$^{3,6}$]pentadecanylene ethylene), poly(4,5-bis(perfluorobutoxy)-10,12-pentacyclo[6.5.1.0$^{2,7}$.0$^{9,13}$.1$^{3,6}$]pentadecanylene ethylene), poly(4-methoxyl-5-trifluoromethoxy-10,12-pentacyclo[6.5.1.0$^{2,7}$.0$^{9,13}$.1$^{3,6}$]pentadecanylene ethylene), poly(4-tert-butoxymethyl-5-trifluoromethoxy-10,12-pentacyclo[6.5.1.0$^{2,7}$.0$^{9,13}$.1$^{3,6}$]pentadecanylene ethylene), poly(4-phenyloxycarbonyl-5-trifluoromethoxy-10,12-pentacyclo[6.5.1.0$^{2,7}$.0$^{9,13}$.1$^{3,6}$]pentadecanylene ethylene), poly(4-phenyloxycarbonylmethyl-5-trifluoromethoxy-10,12-pentacyclo[6.5.1.0$^{2,7}$.0$^{9,13}$.1$^{3,6}$]pentadecanylene ethylene), poly(4-(2',2',2'-trifluoroethoxy)-10,12-pentacyclo[6.5.1.0$^{2,7}$.0$^{9,13}$.1$^{3,6}$]pentadecanylene ethylene), poly(4-(2',2',3',3',3'-pentafluoropropoxy)-10,12-pentacyclo[6.5.1.0$^{2,7}$.0$^{9,13}$.1$^{3,6}$]pentadecanylene ethylene), poly(4-methyl-5-(2',2',3',3',3'-pentafluoropropoxy)-10,12-pentacyclo[6.5.1.0$^{2,7}$.0$^{9,13}$.1$^{3,6}$]pentadecanylene ethylene), poly(4-butyl-5-(2',2',3',3',3'-pentafluoropro poxy)-10,12-pentacyclo[6.5.1.0$^{2,7}$.0$^{9,13}$.1$^{3,6}$]pentadecanylene ethylene), poly(4-(1',1',1'-trifluoro-iso-propoxy)-10,12-pentacyclo[6.5.1.0$^{2,7}$.0$^{9,13}$.1$^{3,6}$]pentadecanylene ethylene), poly(4-methyl-(1',1',1'-trifluoro-iso-propoxy)-10,12-pentacyclo[6.5.1.0$^{2,7}$.0$^{9,13}$.1$^{3,6}$]pentadecanylene ethylene), poly(4-(2',2',3',3',4',4',4'-heptafluorobutoxy)-10,12-pentacyclo[6.5.1.0$^{2,7}$.0$^{9,13}$.1$^{3,6}$]pentadecanylene ethylene), poly(4-(1',1',1'-trifluoro-iso-butoxy)-10,12-pentacyclo[6.5.1.0$^{2,7}$.0$^{9,13}$.1$^{3,6}$]pentadecanylene ethylene), poly(4-(1',1',1'-trifluoro-iso-butoxy)-10,12-pentacyclo[6.5.1.0$^{2,7}$.0$^{9,13}$.1$^{3,6}$]pentadecanylene ethylene), poly(4-methyl-5-(1',1',1'-trifluoro-iso-butoxy)-10,12-pentacyclo[6.5.1.0$^{2,7}$.0$^{9,13}$.1$^{3,6}$]pentadecanylene ethylene), poly(4-butyl-5-(1',1',1'-trifluoro-iso-butoxy)-10,12-pentacyclo[6.5.1.0$^{2,7}$.0$^{9,13}$.1$^{3,6}$]pentadecanylene ethylene), poly(4,5-difluoro-4-trifluoromethoxy-5-(2',2',2'-trifluoroethoxy)-10,12-pentacyclo[6.5.1.0$^{2,7}$.0$^{9,13}$.1$^{3,6}$]pentadecanylene ethylene), poly(4,4,5-trifluoro-5-(2',2',3',3',4',4',4'-heptafluorobutoxy)-10,12-pentacyclo[6.5.1.0$^{2,7}$.0$^{9,13}$.1$^{3,6}$]pentadecanylene ethylene), poly(4,5-difluoro-4-trifluoromethoxy-4-(2',2',3',3',4',4',4'-heptafluorobutoxy)-10,12-pentacyclo[6.5.1.0$^{2,7}$.0$^{9,13}$.1$^{3,6}$]pentadecanylene ethylene), poly(4-fluoro-4-(2',2',2'-trifluoroethoxy)-5,5-bis(trifluoromethoxy)-10,12-pentacyclo[6.5.1.0$^{2,7}$.0$^{9,13}$.1$^{3,6}$]pentadecanylene ethylene), poly(4,5-difluoro-4-(2',2',3',3',3'-pentafluoropropoxy)-5-trifluoromethoxy)-10,12-pentacyclo[6.5.1.0$^{2,7}$.0$^{9,13}$.1$^{3,6}$]pentadecanylene ethylene), poly(4,4,5-trifluoro-5-(1',1',1'-trifluoro-iso-propoxy)-10,12-pentacyclo[6.5.1.0$^{2,7}$.0$^{9,13}$.1$^{3,6}$]pentadecanylene ethylene), poly(4,5-difluoro-4-trifluoromethoxy-5-(2',2',3',3',4',4',4'-heptafluorobutoxy)-10,12-pentacyclo[6.5.1.0$^{2,7}$.0$^{9,13}$.1$^{3,6}$]pentadecanylene ethylene), poly(4,5-bis(2',2',3',3',4',4'-heptafluorobutoxy)-10,12-pentacyclo[6.5.1.0$^{2,7}$.0$^{9,13}$.1$^{3,6}$]pentadecanylene ethylene), poly(4,5-bis(perfluorohexyloxy)-10,12-pentacyclo[6.5.1.0$^{2,7}$.0$^{9,13}$.1$^{3,6}$]pentadecanylene ethylene), poly(4-fluoro-5-trifluoromethoxy-10,12-pentacyclo[6.5.1.0$^{2,7}$.0$^{9,13}$.1$^{3,6}$]pentadecanylene ethylene), poly(4-methyl-4-fluoro-5-trifluoromethoxy-10,12-pentacyclo[6.5.1.0$^{2,7}$.0$^{9,13}$.1$^{3,6}$]pentadecanylene ethylene), poly(4,4-difluoro-5-trifluoromethoxy-10,12-pentacyclo[6.5.1.0$^{2,7}$.0$^{9,13}$.1$^{3,6}$]pentadecanylene ethylene), poly(4,5-difluoro-5-trifluoromethoxy-10,12-pentacyclo[6.5.1.0$^{2,7}$.0$^{9,13}$.1$^{3,6}$]pentadecanylene ethylene) and the like.

In addition, poly(4-trifluoromethoxycarbonyl-10,12-pentacyclo[6.5.1.0$^{2,7}$.0$^{9,13}$.1$^{3,6}$]pentadecanylene ethylene), poly(4-methyl-4-trifluoromethoxycarbonyl-10,12-pentacyclo[6.5.1.0$^{2,7}$.0$^{9,13}$.1$^{3,6}$]pentadecanylene ethylene), poly(4-methoxyl-5-trifluoromethoxycarbonyl-10,12-pentacyclo[6.5.1.0$^{2,7}$.0$^{9,13}$.1$^{3,6}$]pentadecanylene ethylene), poly(4-tert-butoxymethyl-5-trifluoromethoxycarbonyl-10,12-pentacyclo[6.5.1.0$^{2,7}$.0$^{9,13}$.1$^{3,6}$]pentadecanylene ethylene), poly(4-phenyloxycarbonyl-5-trifluoromethoxycarbonyl-10,12-pentacyclo[6.5.1.0$^{2,7}$.0$^{9,13}$.1$^{3,6}$]pentadecanylene ethylene), poly(4-phenyloxycarbonylmethyl-5-trifluoromethoxycarbonyl-10,12-pentacyclo[6.5.1.0$^{2,7}$.0$^{9,13}$.1$^{3,6}$]pentadecanylene ethylene), poly(4-(hexafluoro-2'-methylisopropoxycarbonyl)-10,12-pentacyclo[6.5.1.0$^{2,7}$.0$^{9,13}$.1$^{3,6}$]pentadecanylene ethylene), poly(4-(perfluoro-2'-methylisopropoxycarbonyl)-10,12-pentacyclo[6.5.1.0$^{2,7}$.0$^{9,13}$.1$^{3,6}$]pentadecanylene ethylene), poly(4-perfluorophenyloxycarbonyl-10,12-pentacyclo[6.5.1.0$^{2,7}$.0$^{9,13}$.1$^{3,6}$]pentadecanylene ethylene), poly(4-methyl-5-perfluorophenyloxycarbonyl-10,12-pentacyclo[6.5.1.0$^{2,7}$.0$^{9,13}$.1$^{3,6}$]pentadecanylene ethylene), poly(4-methoxyl-5-perfluorophenyloxycarbonyl-10,12-pentacyclo[6.5.1.0$^{2,7}$.0$^{9,13}$.1$^{3,6}$]pentadecanylene ethylene), poly(4-tert-butoxymethyl-5-perfluorophenyloxycarbonyl-10,12-pentacyclo[6.5.1.0$^{2,7}$.0$^{9,13}$.1$^{3,6}$]pentadecanylene ethylene), poly(4-ethyl-5-perfluorophenyloxycarbonyl-10,12-pentacyclo[6.5.1.0$^{2,7}$.0$^{9,13}$.1$^{3,6}$]pentadecanylene ethylene), poly(4-phenyloxycarbonyl-5-perfluorophenyloxycarbonyl-10,12-pentacyclo[6.5.1.0$^{2,7}$.0$^{9,13}$.1$^{3,6}$]pentadecanylene ethylene), poly(4-phenyloxycarbonylmethyl-5-perfluorophenyloxycarbonyl-10,12-pentacyclo[6.5.1.0$^{2,7}$.0$^{9,13}$.1$^{3,6}$]pentadecanylene ethylene), poly(4-trifluoromethoxycarbonylmethyl-10,12-pentacyclo[6.5.1.0$^{2,7}$.0$^{9,13}$.1$^{3,6}$]pentadecanylene ethylene), poly(4-methyl-5-trifluoromethoxycarbonylmethyl-10,12-pentacyclo[6.5.1.0$^{2,7}$.0$^{9,13}$.1$^{3,6}$]pentadecanylene ethylene), poly(4-methoxyl-5-trifluoromethoxycarbonylmethyl-10,12-pentacyclo[6.5.1.0$^{2,7}$.0$^{9,13}$.1$^{3,6}$]pentadecanylene ethylene), poly(4-tert-butoxymethyl-5-trifluoromethoxycarbonylmethyl-10,12-pentacyclo[6.5.1.0$^{2,7}$.0$^{9,13}$.1$^{3,6}$]pentadecanylene ethylene), poly(4-phenyloxycarbonyl-5-trifluoromethoxycarbonylmethyl-10,12-pentacyclo[6.5.1.0$^{2,7}$.0$^{9,13}$.1$^{3,6}$]pentadecanylene ethylene), poly(4-phenyloxycarbonylmethyl-5-trifluoromethoxycarbonylmethyl-10,12-pentacyclo[6.5.1.0$^{2,7}$.0$^{9,13}$.1$^{3,6}$]pentadecanylene ethylene), poly(4-(hexafluoro-2'-methylisopropoxycarbonylmethyl)-10,12-pentacyclo[6.5.1.0$^{2,7}$.0$^{9,13}$.1$^{3,6}$]pentadecanylene ethylene), poly(4-(perfluoro-2'-methylisopropoxycarbonylmethyl)-10,12-pentacyclo[6.5.1.0$^{2,7}$.0$^{9,13}$.1$^{3,6}$]pentadecanylene ethylene), poly(4-perfluorophenyloxycarbonylmethyl-10,12-pentacyclo[6.5.1.0$^{2,7}$.0$^{9,13}$.1$^{3,6}$]pentadecanylene ethylene), poly(4-methyl-5-perfluorophenyloxycarbonylmethyl-10,12-pentacyclo[6.5.1.0$^{2,7}$.0$^{9,13}$.1$^{3,6}$]pentadecanylene ethylene), poly(4-methoxyl-5-perfluorophenyloxycarbonylmethyl-10,12-pentacyclo[6.5.1.0$^{2,7}$.0$^{9,13}$.1$^{3,6}$]pentadecanylene ethylene), poly(4-tert-butoxymethyl-5-perfluorophenyloxycarbonylmethyl-10,12-pentacyclo[6.5.1.0$^{2,7}$.0$^{9,13}$.1$^{3,6}$]pentadecanylene ethylene), poly(4-phenyloxycarbonyl-5-perfluorophenyloxycarbonylmethyl-10,12-pentacyclo[6.5.1.0$^{2,7}$.0$^{9,13}$.1$^{3,6}$]pentadecanylene ethylene), poly(4-phenyloxycarbonylmethyl-5-perfluorophenyloxycarbonylmethyl-10,12-pentacyclo[6.5.1.0$^{2,7}$.0$^{9,13}$.1$^{3,6}$]pentadecanylene ethylene) and the like.

Furthermore, containing fluorine, n is 3, such as poly(5-fluoro-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-fluoro-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5,5-difluoro-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-perfluoroethyl-13,15-heptacyclo[8.7.0.1$^{2,9}$.1$^{4,7}$.1$^{11,17}$.0$^{3,8}$.0$^{12,16}$]icosanylene ethylene), poly(5,5-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5,6-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene), poly(5-perfluoropropyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoropropyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoropropyl-13,15-heptacyclo[8.7.0.1$^{2,9}$.1$^{4,7}$.1$^{11,17}$.0$^{3,8}$.0$^{12,16}$]icosanylene ethylene), poly(5-butyl-6-perfluoropropyl-13,15-heptacyclo[8.7.0.1$^{2,9}$.1$^{4,7}$.1$^{11,17}$.0$^{3,8}$.0$^{12,16}$]icosanylene ethylene), poly(5-perfluoroisopropyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoroisopropyl-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5,6-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene), poly(4,5,5,6,6,7,7,8-octafluoro-15,17-octacyclo[9.9.1.1$^{3,9}$.1$^{14,18}$.0$^{2,10}$.0$^{4,8}$.0$^{12,20}$.0$^{14,18}$]triicosanylene ethylene), poly(4,5,5,6, 6,7,7,8,8,9-decafluoro-16,18-octacyclo[10.9.1.1$^{3,10}$.1$^{14,20}$.0$^{2,11}$.0$^{4,9}$.0$^{13,21}$.0$^{15,19}$]tetraicosanylene ethylene), poly(5-perfluorobutyl-13,15-heptacyclo[8.7.0.1$^{2,9}$.1$^{4,7}$.1$^{11,17}$.0$^{3,8}$.0$^{12,16}$]icosanylene ethylene), poly(5-perfluoro-iso-butyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoro-tert-butyl-13,15-heptacyclo[8.7.0.1$^{2,9}$.1$^{4,7}$.1$^{11,17}$.0$^{3,8}$.0$^{12,16}$]icosanylene ethylene), poly(5-butyl-6-perfluoro-tert-butyl-13,15-[8.7.0.1$^{2,9}$.1$^{4,7}$.1$^{11,17}$.0$^{3,8}$.0$^{12,16}$]icosanylene ethylene), poly(5,6-dimethyl-5-perfluoro-tert-butyl-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-perfluorobutyl-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethyl-6-perfluorobutyl-13,15-heptacyclo[8.7.0.1$^{2,9}$.1$^{4,7}$.1$^{11,17}$.0$^{3,8}$.0$^{12,16}$]icosanylene ethylene), poly(5-fluoro-5-perfluoroethyl-6,6-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-perfluoropropanoyl-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5-butyl-6-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5-hexyl-6-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5-octyl-6-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5-perfluoroheptyl-13,15-heptacyclo[8.7.0.1$^{2,9}$.1$^{4,7}$.1$^{11,17}$.0$^{3,8}$.0$^{12,16}$]icosanylene ethylene), poly(5-perfluorooctyl-13,15-heptacyclo[8.7.0.1$^{2,9}$.1$^{4,7}$.1$^{11,17}$.0$^{3,8}$.0$^{12,16}$]icosanylene ethylene), poly(5-perfluorodecanyl-13,15-heptacyclo[8.7.0.1$^{2,9}$.1$^{4,7}$.1$^{11,17}$.0$^{3,8}$.0$^{12,16}$]icosanylene ethylene), poly (5,5,6-trifluoro-6-perfluoropentyl-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethyl-6-perfluorobutyl-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-1,2-perfluorohexyl-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethyl-6-perfluoropentyl-13,15-heptacyclo[8.7.0.1$^{2,9}$.1$^{4,7}$.1$^{11,17}$.0$^{3,8}$.0$^{12,16}$]icosanylene ethylene), poly(5,5,6-tris(trifluoromethyl)-6-perfluoro-tert-butyl-13,15-heptacyclo[8.7.0.1$^{2,9}$.1$^{4,7}$.1$^{11,17}$.0$^{3,8}$.0$^{12,16}$]icosanylene ethylene), poly(5,6-bis(perfluorohexyl)-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5,6-bis(trifluoromethoxy)-13,15-heptacyclo[8.7.0.1$^{2,9}$.1$^{4,7}$.1$^{11,17}$.0$^{3,8}$.0$^{12,16}$]icosanylene ethylene), poly(5-perfluoropropoxy-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoropropoxy-13,15-heptacyclo[8.7.0.1$^{2,9}$.1$^{4,7}$.1$^{11,17}$0$^{3,8}$.0$^{12,16}$]icosanylene ethylene), poly(5-butyl-6-perfluoropropoxy-13,15-heptacyclo[8.7.0.1$^{2,9}$.1$^{4,7}$.1$^{11,17}$.0$^{3,8}$.0$^{12,16}$]icosanylene ethylene), poly(5-perfluoro-iso-propoxy-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoro-iso-propoxy-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5,6-bis(trifluoromethoxy)-13,15-heptacyclo[8.7.0.1$^{2,9}$.1$^{4,7}$.1$^{11,17}$.0$^{3,8}$.0$^{12,16}$]icosanylene ethylene), poly(5-perfluorobutoxy-13,15-heptacyclo[8.7.0.1$^{2,9}$.1$^{4,7}$.1$^{11,17}$.0$^{3,8}$.0$^{12,16}$]icosanylene ethylene), poly(5-perfluoro-iso-butoxy-13,15-heptacyclo[8.7.0.1$^{2,9}$.1$^{4,7}$.1$^{11,17}$.0$^{3,8}$.0$^{12,16}$]icosanylene ethylene), poly(5-perfluoro-tert-butoxy-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluoro-iso-butoxy-13,15-heptacyclo[8.7.0.1$^{2,9}$.1$^{4,7}$.1$^{11,17}$.0$^{3,8}$.0$^{12,16}$]icosanylene ethylene), poly(5-butyl-6-perfluoro-iso-butoxy-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-perfluoroethoxy-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-perfluorobutoxy-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-perfluorobutoxy-13,15-heptacyclo[8.7.0.1$^{2,9}$.1$^{4,7}$.1$^{11,17}$.0$^{3,8}$.0$^{12,16}$]icosanylene ethylene), poly(5-fluoro-5-perfluoroethoxy-6,6-bis(trifluoromethoxy)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-perfluoropropoxy-6-trifluoromethoxy)-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-perfluoropentyloxy-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-perfluorobutoxy-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-perfluoropentyl-13,15-heptacyclo[8.7.0.1$^{2,9}$.1$^{4,7}$.1$^{11,17}$.0$^{3,8}$.0$^{12,16}$]icosanylene ethylene), poly(5,6-bis(perfluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5-tert-butoxymethyl-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5-(2',2',2'-trifluoroethoxy)-13,15-heptacyclo[8.7.0.1$^{2,9}$.1$^{4,7}$.1$^{11,17}$.0$^{3,8}$.0$^{12,16}$]icosanylene ethylene), poly(5-(2',2',3',3',3'-pentafluoropropoxy)-13,15-heptacyclo[8.7.0.1$^{2,9}$.1$^{4,7}$.1$^{11,17}$.0$^{3,8}$.0$^{12,16}$]icosanylene ethylene), poly(5-methyl-6-(2',2',3',3',3'-pentafluoropropoxy)-13,15-heptacyclo[8.7.0.1$^{2,9}$.1$^{4,7}$.1$^{11,17}$.0$^{3,8}$.0$^{12,16}$]icosanylene ethylene), poly(5-butyl-6-(2',2',3',3'-pentafluoropropoxy)-13,15-heptacyclo[8.7.0.1$^{2,9}$.1$^{4,7}$.1$^{11,17}$.0$^{3,8}$.0$^{12,16}$]icosanylene ethylene), poly(5-(1,1',1'-trifluoro-iso-propoxy)-13,15-heptacyclo[8.7.0.1$^{2,9}$.1$^{4,7}$.1$^{11,17}$.0$^{3,8}$.0$^{12,16}$]icosanylene ethylene), poly(5-methyl-6-(1',1',1'-trifluoro-iso-propoxy)-13,15-heptacyclo[8.7.0.1$^{2,9}$.1$^{4,7}$.1$^{11,17}$.0$^{3,8}$.0$^{12,16}$]icosanylene ethylene), poly(5-(2',2',3',3',4',4',4'-heptafluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5-(1',1',1'-trifluoro-iso-butoxy)-13,15-heptacyclo[8.7.0.1$^{2,9}$.1$^{4,7}$.1$^{11,17}$.0$^{3,8}$.0$^{12,16}$]icosanylene ethylene), poly(5-(1',1',1'-trifluoro-iso-butoxy)-13,15-heptacyclo[8.7.0.1$^{2,9}$.1$^{4,7}$.1$^{11,17}$.0$^{3,8}$.0$^{12,16}$]icosanylene ethylene), poly(5-methyl-6-(1',1',1'-trifluoro-iso-butoxy)-13,15-heptacyclo[8.7.0.1$^{2,9}$.1$^{4,7}$.1$^{11,17}$.0$^{3,8}$.0$^{12,16}$]icosanylene ethylene), poly(5-butyl-6-(1',1',1'-trifluoro-iso-butoxy)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-(2',2',2'-trifluoroethoxy)-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-(2',2',3',3',4',4',4'-heptafluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-(2',2',3',3',4',4',4'-heptafluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5-fluoro-5-(2',2',2'- trifluoroethoxy)-6,6-bis (trifluoromethoxy)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-(2',2',3',3',3'-pentafluoropropoxy)-6-trifluoro methoxy)-13,15-heptacyclo[8.7.0.1$^{2,9}$.1$^{4,7}$.1$^{11,17}$.0$^{3,8}$.0$^{12,16}$]icosanylene ethylene), poly(5,5,6-trifluoro-6-(1',1',1'-trifluoro-iso-propoxy)-13,15-heptacyclo[8.7.0.1$^{2,9}$.1$^{4,7}$.1$^{11,17}$.0$^{3,8}$.0$^{12,16}$]icosanylene ethylene), poly(5,6-difluoro-5-trifluoromethoxy-6-(2',2',3',3',4',4',4'-heptafluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5,6-bis(2',2',3',3',4',4'-heptafluorobutoxy)-13,15-heptacyclo[8.7.0.1$^{2,9}$.1$^{4,7}$.1$^{11,17}$.0$^{3,8}$.0$^{12,16}$]icosanylene ethylene), poly(5,6-bis(perfluorohexyloxy)-13,15-heptacyclo[8.7.0.1$^{2,9}$.1$^{4,7}$.1$^{11,17}$.0$^{3,8}$.0$^{12,16}$]icosanylene ethylene), poly(5-fluoro-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5-methyl-5-fluoro-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5,5-difluoro-6-trifluoromethoxy-13,15-heptacyclo[8.7.0.1$^{2,9}$.1$^{4,7}$.1$^{11,17}$.0$^{3,8}$.0$^{12,16}$]icosanylene ethylene), poly(5,5-difluoro-6-trifluoromethoxy-13,15-heptacyclo[8.7.0.1$^{2,9}$.1$^{4,7}$.1$^{11,17}$.0$^{3,8}$.0$^{12,16}$]icosanylene ethylene) and the like.

In addition, poly(5-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-methyl-5-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-tert-butoxymethyl-6-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-trifluoromethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(hexafluoro-2'-methylisopropoxycarbonyl)-13,15-heptacyclo[8.7.0.1$^{2,9}$.1$^{4,7}$.1$^{11,17}$.0$^{3,8}$.0$^{12,16}$]icosanylene ethylene), poly(5-(perfluoro-2'-methylisopropoxycarbonyl)-13,15-heptacyclo[8.7.0.1$^{2,9}$.1$^{4,7}$.1$^{11,17}$.0$^{3,8}$.0$^{12,16}$]icosanylene ethylene), poly(5-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-tert-butoxymethyl-6-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-perfluorophenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-tert-butoxymethyl-6-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-trifluoromethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-(hexafluoro-2'-methylisopropoxycarbonylmethyl)-13,15-heptacyclo[8.7.0.1$^{2,9}$.1$^{4,7}$.1$^{11,17}$.0$^{3,8}$.0$^{12,16}$]icosanylene ethylene), poly(5-(perfluoro-2'-methylisopropoxycarbonylmethyl)-13,15-heptacyclo[8.7.0.1$^{2,9}$.1$^{4,7}$.1$^{11,17}$.0$^{3,8}$.0$^{12,16}$]icosanylene ethylene), poly(5-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-methyl-6-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-methoxyl-6-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-tert-butoxymethyl-6-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonyl-6-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-phenyloxycarbonylmethyl-6-perfluorophenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene) and the like.

Furthermore, containing cyano, n is 1, such as poly(3-cyano-7,9-tricyclo[4.3.0.1$^{2,5}$]decanylene ethylene), poly(3-cyano-3-methyl-7,9-tricyclo[4.3.0.1$^{2,5}$]decanylene ethylene), poly(3-cyano-4-methyl-7,9-tricyclo[4.3.0.1$^{2,5}$]decanylene ethylene), poly(3-cyano-4-phenyl-7,9-tricyclo[4.3.0.1$^{2,5}$]decanylene ethylene), poly(3-cyano-4-methoxyl-7,9-tricyclo[4.3.0.1$^{2,5}$]decanylene ethylene), poly(3-cyano-4-methoxymethyl-7,9-tricyclo[4.3.0.1$^{2,5}$]decanylene ethylene), poly(3-cyano-4-methoxycarbonyl-7,9-tricyclo[4.3.0.1$^{2,5}$]decanylene ethylene), poly(3-cyano-4-phenyloxycarbonyl-7,9-tricyclo[4.3.0.1$^{2,5}$]decanylene ethylene), poly(3-cyano-4-phenyloxycarbonylmethyl-7,9-tricyclo[4.3.0.1$^{2,5}$]decan ylene ethylene), poly(3-cyanomethyl-7,9-tricyclo[4.3.0.1$^{2,5}$]decanylene ethylene), poly(3-cyanomethyl-4-methyl-7,9-tricyclo[4.3.0.1$^{2,5}$]decanylene ethylene), poly(3-cyanomethyl-4-phenyl-7,9-tricyclo[4.3.0.1$^{2,5}$]decanylene ethylene), poly(3-cyanomethyl-4-methoxyl-7,9-tricyclo[4.3.0.1$^{2,5}$]decanylene ethylene), poly(3-cyanomethyl-4-methoxymethyl-7,9-tricyclo[4.3.0.1$^{2,5}$]decanylene ethylene), poly(3-cyanomethyl-4-methoxycarbonyl-7,9-tricyclo[4.3.0.1$^{2,5}$]decanyl ene ethylene), poly(3-cyanomethyl-4-phenyloxycarbonyl-7,9-tricyclo[4.3.0.1$^{2,5}$]decanylene ethylene), poly(3-cyanomethyl-4-phenyloxycarbonylmethyl-7,9-tricyclo[4.3.0.1$^{2,5}$]decanylene ethylene), poly(3-cyanoethyl-7,9-tricyclo[4.3.0.1$^{2,5}$]decanylene ethylene), poly(3-cyanoethyl-4-methyl-7,9-tricyclo[4.3.0.1$^{2,5}$]decanylene ethylene), poly(3-cyanoethyl-4-phenyl-7,9-tricyclo[4.3.0.1$^{2,5}$]decanylene ethylene), poly(3-cyanoethyl-4-methoxyl-7,9-tricyclo[4.3.0.1$^{2,5}$]decanylene ethylene), poly(3-cyanoethyl-4-methoxymethyl-7,9-tricyclo[4.3.0.1$^{2,5}$]decanylene ethylene), poly(3-cyanoethyl-4-methoxycarbonyl-7,9-tricyclo[4.3.0.1$^{2,5}$]decanylene ethylene), poly(3-cyanoethyl-4-phenyloxycarbonyl-7,9-tricyclo[4.3.0.1$^{2,5}$]decanylene ethylene), poly(3-cyanoethyl-4-phenyloxycarbonylmethyl-7,9-tricyclo[4.3.0.1$^{2,5}$]decanylene ethylene), poly(3-cyanopropyl-7,9-tricyclo[4.3.0.1$^{2,5}$]decanylene ethylene), poly(3-cyanobutyl-7,9-tricyclo[4.3.0.1$^{2,5}$]decanylene ethylene), poly(3-cyanohexyl-7,9-tricyclo[4.3.0.1$^{2,5}$]decanylene ethylene) and the like.

In addition, poly(3-cyanoethoxy-7,9-tricyclo[4.3.0.1$^{2,5}$]decanylene ethylene), poly(3-cyanoethoxy-3-methyl-7,9-tricyclo[4.3.0.1$^{2,5}$]decanylene ethylene), poly(3-cyanoethoxy-4-methyl-7,9-tricyclo[4.3.0.1$^{2,5}$]decanylene ethylene), poly(3-cyanoethoxy-4-phenyl-7,9-tricyclo[4.3.0.1$^{2,5}$]decanylene ethylene), poly(3-cyanoethoxy-4-methoxyl-7,9-tricyclo[4.3.0.1$^{2,5}$]decanylene ethylene), poly(3-cyanoethoxy-4-methoxymethyl-7,9-tricyclo[4.3.0.1$^{2,5}$]decanylene ethylene), poly(3-cyanoethoxy-4-methoxycarbonyl-7,9-tricyclo

[4.3.0.1$^{2,5}$]decanyl ene ethylene), poly(3-cyanoethoxy-4-phenyloxycarbonyl-7,9-tricyclo[4.3.0.1$^{2,5}$]decanylene ethylene), poly(3-cyanoethoxy-4-phenyloxycarbonylmethyl-7,9-tricyclo[4.3.0.1$^{2,5}$]decanylene ethylene), poly(3-cyanoethoxymethyl-7,9-tricyclo[4.3.0.1$^{2,5}$]decanylene ethylene), poly(3-cyanoethoxymethyl-3-methyl-7,9-tricyclo[4.3.0.1$^{2,5}$]decanylene ethylene), poly(3-cyanoethoxymethyl-4-methyl-7,9-tricyclo[4.3.0.1$^{2,5}$]decanylene ethylene), poly(3-cyanoethoxymethyl-4-phenyl-7,9-tricyclo[4.3.0.1$^{2,5}$]decanylene ethylene), poly(3-cyanoethoxymethyl-4-methoxyl-7,9-tricyclo[4.3.0.1$^{2,5}$]decanylene ethylene), poly(3-cyanoethoxymethyl-4-methoxymethyl-7,9-tricyclo[4.3.0.1$^{2,5}$]decanylene ethylene), poly(3-cyanoethoxymethyl-4-methoxycarbonyl-7,9-tricyclo[4.3.0.1$^{2,5}$]decanylene ethylene), poly(3-cyanoethoxymethyl-4-phenyloxycarbonyl-7,9-tricyclo[4.3.0.1$^{2,5}$]decanylene ethylene), poly(3-cyanoethoxymethyl-4-phenyloxycarbonylmethyl-7,9-tricyclo[4.3.0.1$^{2,5}$]decanylene ethylene), poly(3-(4'-cyanophenyl)-7,9-tricyclo[4.3.0.1$^{2,5}$]decanylene ethylene), poly(3-(4'-cyanophenyl)-3-methyl-7,9-tricyclo[4.3.0.1$^{2,5}$]decanylene ethylene), poly(3-(4'-cyanophenyl)-4-methyl-7,9-tricyclo[4.3.0.1$^{2,5}$]decanylene ethylene), poly(3-(4'-cyanophenyl)-4-phenyl-7,9-tricyclo[4.3.0.1$^{2,5}$]decanylene ethylene), poly(3-(4'-cyanophenyl)-4-methoxyl-7,9-tricyclo[4.3.0.1$^{2,5}$]decanylene ethylene), poly(3-(4'-cyanophenyl)-4-methoxymethyl-7,9-tricyclo[4.3.0.1$^{2,5}$]decanylene ethylene), poly(3-(4'-cyanophenyl)-4-methoxycarbonyl-7,9-tricyclo[4.3.0.1$^{2,5}$]decanylene ethylene), poly(3-(4'-cyanophenyl)-phenyloxycarbonyl-7,9-tricyclo[4.3.0.1$^{2,5}$]decanylene ethylene), poly(3-(4'-cyanophenyl)-4-phenyloxycarbonylmethyl-7,9-tricyclo[4.3.0.1$^{2,5}$]decanylene ethylene), poly(3-cyanoethoxycarbonyl-7,9-tricyclo[4.3.0.1$^{2,5}$]decanylene ethylene), poly(3-cyanoethoxycarbonyl-3-methyl-7,9-tricyclo[4.3.0.1$^{2,5}$]decanylene ethylene), poly(3-cyanoethoxycarbonyl-4-methyl-7,9-tricyclo[4.3.0.1$^{2,5}$]decanylene ethylene), poly(3-cyanoethoxycarbonyl-4-phenyl-7,9-tricyclo[4.3.0.1$^{2,5}$]decanylene ethylene), poly(4-cyanoethoxycarbonyl-4-methoxyl-7,9-tricyclo[4.3.0.1$^{2,5}$]decanylene ethylene), poly(3-cyanoethoxycarbonyl-4-methoxymethyl-7,9-tricyclo[4.3.0.1$^{2,5}$]decanylene ethylene), poly(3-cyanoethoxycarbonyl-4-methoxycarbonyl-7,9-tricyclo[4.3.0.1$^{2,5}$]decanylene ethylene), poly(3-cyanoethoxycarbonyl-4-phenyloxycarbonyl-7,9-tricyclo[4.3.0.1$^{2,5}$]decanylene ethylene), poly(3-cyanoethoxycarbonyl-4-phenyloxycarbonylmethyl-7,9-tricyclo[4.3.0.1$^{2,5}$]decanylene ethylene), poly(3-(4'-cyanophenylcarbonyl)-7,9-tricyclo[4.3.0.1$^{2,5}$]decanylene ethylene), poly(3-(4'-cyanophenylcarbonyl)-3-methyl-7,9-tricyclo[4.3.0.1$^{2,5}$]decanylene ethylene), poly(3-(4'-cyanophenylcarbonyl)-4-methyl-7,9-tricyclo[4.3.0.1$^{2,5}$]decanylene ethylene), poly(3-(4'-cyanophenylcarbonyl)-4-phenyl-7,9-tricyclo[4.3.0.1$^{2,5}$]decanylene ethylene), poly(3-(4'-cyanophenylcarbonyl)-4-methoxyl-7,9-tricyclo[4.3.0.1$^{2,5}$]decanylene ethylene), poly(3-(4'-cyanophenylcarbonyl)-4-methoxymethyl-7,9-tricyclo[4.3.0.1$^{2,5}$]decanylene ethylene), poly(3-(4'-cyanophenylcarbonyl)-4-methoxycarbonyl-7,9-tricyclo[4.3.0.1$^{2,5}$]decanylene ethylene), poly(3-(4'-cyanophenylcarbonyl)-4-phenyloxycarbonyl-7,9-tricyclo[4.3.0.1$^{2,5}$]decanylene ethylene), poly(3-(4'-cyanophenylcarbonyl)-4-phenyloxycarbonylmethyl-7,9-tricyclo[4.3.0.1$^{2,5}$]decanylene ethylene), poly(3-cyanoethoxycarbonylmethyl-7,9-tricyclo[4.3.0.1$^{2,5}$]decanylene ethylene), poly(3-cyanoethoxycarbonylmethyl-3-methyl-7,9-tricyclo[4.3.0.1$^{2,5}$]decanylene ethylene), poly(3-cyanoethoxycarbonylmethyl-4-methyl-7,9-tricyclo[4.3.0.1$^{2,5}$]decanylene ethylene), poly(3-cyanoethoxycarbonylmethyl-4-phenyl-7,9-tricyclo[4.3.0.1$^{2,5}$]decanylene ethylene), poly(3-cyanoethoxycarbonyl-4-methoxyl-7,9-tricyclo[4.3.0.1$^{2,5}$]decanylene ethylene), poly(3-cyanoethoxycarbonyl-4-methoxymethyl-7,9-tricyclo[4.3.0.1$^{2,5}$]decanylene ethylene), poly(3-cyanoethoxycarbonyl-4-methoxycarbonyl-7,9-tricyclo[4.3.0.1$^{2,5}$]decanylene ethylene), poly(3-cyanoethoxycarbonylmethyl-4-phenyloxycarbonyl-7,9-tricyclo[4.3.0.1$^{2,5}$]decanylene ethylene), poly(3-cyanoethoxycarbonylmethyl-4-phenyloxycarbonylmethyl-7,9-tricyclo[4.3.0.1$^{2,5}$]decanylene ethylene), poly(3-(4'-cyanophenylcarbonylmethyl)-7,9-tricyclo[4.3.0.1$^{2,5}$]decanylene ethylene), poly(3-(4'-cyanophenylcarbonylmethyl)-3-methyl-7,9-tricyclo[4.3.0.1$^{2,5}$]decanylene ethylene), poly(3-(4'-cyanophenylcarbonylmethyl)-4-methyl-7,9-tricyclo[4.3.0.1$^{2,5}$]decanylene ethylene), poly(3-(4'-cyanophenylcarbonylmethyl)-4-phenyl-7,9-tricyclo[4.3.0.1$^{2,5}$]decanylene ethylene), poly(3-(4'-cyanophenylcarbonylmethyl)-4-methoxyl-7,9-tricyclo[4.3.0.1$^{2,5}$]decanylene ethylene), poly(3-(4'-cyanophenylcarbonylmethyl)-4-methoxymethyl-7,9-tricyclo[4.3.0.1$^{2,5}$]decanylene ethylene), poly(3-(4'-cyanophenylcarbonylmethyl)-4-methoxycarbonyl-7,9-tricyclo[4.3.0.1$^{2,5}$]decanylene ethylene), poly(3-(4'-cyanophenylcarbonylmethyl)-4-phenyloxycarbonyl-7,9-tricyclo[4.3.0.1$^{2,5}$]decanylene ethylene), poly(3-(4'-cyanophenylcarbonylmethyl)-4-phenyloxycarbonylmethyl-7,9-tricyclo[4.3.0.1$^{2,5}$]decanylene ethylene) and the like.

In addition, poly(3,4)-dicyano-7,9-tricyclo[4.3.0.1$^{2,5}$]decanylene ethylene), poly(3-cyano-4-cyanomethyl-7,9-tricyclo[4.3.0.1$^{2,5}$]decanylene ethylene), poly(3-cyano-4-cyanoethyl-7,9-tricyclo[4.3.0.1$^{2,5}$]decanylene ethylene), poly(3,4-dicyanomethyl-7,9-tricyclo[4.3.0.1$^{2,5}$]decanylene ethylene), poly(3-cyanomethyl-4-cyanoethyl-7,9-tricyclo[4.3.0.1$^{2,5}$]decanylene ethylene), poly(3,4-dicyanoethyl-7,9-tricyclo[4.3.0.1$^{2,5}$]decanylene ethylene), poly(3-cyanoethyl-4-cyanomethyl-7,9-tricyclo[4.3.0.1$^{2,5}$]decanylene ethylene), poly(3,4-dicyanopropyl-7,9-tricyclo[4.3.0.1$^{2,5}$]decanylene ethylene), poly(3-cyano-4-fluoro-7,9-tricyclo[4.3.0.1$^{2,5}$]decanylene ethylene), poly(3-cyano-4-trifluoromethyl-7,9-tricyclo[4.3.0.1$^{2,5}$]decanylene ethylene), poly(3-cyano-4,4-bis(trifluoromethyl)-7,9-tricyclo[4.3.0.1$^{2,5}$]decanylene ethylene), poly(3-cyanomethyl-4-fluoro-7,9-tricyclo[4.3.0.1$^{2,5}$]decanylene ethylene), poly(3-cyanomethyl-4-trifluoromethyl-7,9-tricyclo[4.3.0.1$^{2,5}$]decanyl ene ethylene), poly(3-cyanomethyl-4,4-bis(trifluoromethyl)-7,9-tricyclo[4.3.0.1$^{2,5}$]decanylene ethylene), poly(3-cyanoethyl-4-fluoro-7,9-tricyclo[4.3.0.1$^{2,5}$]decanylene ethylene), poly(3-cyanoethyl-4-trifluoromethyl-7,9-tricyclo[4.3.0.1$^{2,5}$]decanylene ethylene), poly(3-cyanoethyl-4,4-bis(trifluoromethyl)-7,9-tricyclo[4.3.0.1$^{2,5}$]decanylene ethylene) and the like.

Furthermore, containing cyano, n is 2, such as poly(4-cyano-10,12-pentacyclo[6.5.1.0$^{2,7}$.0$^{9,13}$.1$^{3,6}$]pentadecanylene ethylene), poly(4-cyano-4-methyl-10,12-pentacyclo[6.5.1.0$^{2,7}$.0$^{9,13}$.1$^{3,6}$]pentadecanylene ethylene), poly(4-cyano-5-methyl-10,12-pentacyclo[6.5.1.0$^{2,7}$.0$^{9,13}$.1$^{3,6}$]pentadecanylene ethylene), poly(4-cyano-5-phenyl-10,12-pentacyclo[6.5.1.0$^{2,7}$.0$^{9,13}$.1$^{3,6}$]pentadecanylene ethylene), poly(4-cyano-5-methoxyl-10,12-pentacyclo[6.5.1.0$^{2,7}$.0$^{9,13}$.1$^{3,6}$]pentadecanylene ethylene), poly(4-cyano-5-methoxymethyl-10,12-pentacyclo[6.5.1.0$^{2,7}$.0$^{9,13}$.1$^{3,6}$]pentadecanylene ethylene), poly(4-cyano-5-methoxycarbonyl-10,12-pentacyclo[6.5.1.0$^{2,7}$.0$^{9,13}$.1$^{3,6}$]pentadecanylene ethylene), poly(4-cyano-5-phenyloxycarbonyl-10,12-pentacyclo[6.5.1.0$^{2,7}$.0$^{9,13}$.1$^{3,6}$]pentadecanylene ethylene), poly (4-cyano-5-phenyloxycarbonylmethyl-10,12-pentacyclo[6.5.1.0$^{2,7}$.0$^{9,13}$.1$^{3,6}$]pentadecanylene ethylene), poly(4-cyanomethyl-10,12-pentacyclo[6.5.1.0$^{2,7}$.0$^{9,13}$.1$^{3,6}$] pentadecanylene ethylene), poly(4-cyanomethyl-5-methyl-10,12-pentacyclo[6.5.1.0$^{2,7}$.0$^{9,13}$.1$^{3,6}$]pentadecanylene ethylene), poly(4-cyanomethyl-5-phenyl-10,12-pentacyclo[6.5.1.0$^{2,7}$.0$^{9,13}$.1$^{3,6}$]pentadecanylene ethylene), poly(4-cyanomethyl-5-methoxyl-10,12-pentacyclo[6.5.1.0$^{2,7}$.0$^{9,13}$.1$^{3,6}$]pentadecanylene ethylene), poly(4-cyanomethyl-5-methoxymethyl-10,12-pentacyclo[6.5.1.0$^{2,7}$.0$^{9,13}$.1$^{3,6}$]pentadecanylene ethylene), poly(4-cyanomethyl-5-methoxycarbonyl-10,12-pentacyclo[6.5.1.0$^{2,7}$.0$^{9,13}$.1$^{3,6}$] pentadecanylene ethylene), poly(4-cyanomethyl-5-phenyloxycarbonyl-10,12-pentacyclo[6.5.1.0$^{2,7}$.0$^{9,13}$.1$^{3,6}$] pentadecanylene ethylene), poly(4-cyanomethyl-5-phenyloxycarbonylmethyl-10,12-pentacyclo[6.5.1.0$^{2,7}$.0$^{9,13}$.1$^{3,6}$]pentadecanylene ethylene), poly(4-cyanoethyl-10,12-pentacyclo[6.5.1.0$^{2,7}$.0$^{9,13}$.1$^{3,6}$]pentadecanylene ethylene), poly(4-cyanoethyl-10,12-pentacyclo[6.5.1.0$^{2,7}$.0$^{9,13}$.1$^{3,6}$]pentadecanylene ethylene), poly(4-cyanoethyl-5-methyl-10,12-pentacyclo[6.5.1.0$^{2,7}$.0$^{9,13}$.1$^{3,6}$]pentadecanylene ethylene), poly(4-cyanoethyl-5-phenyl-10,12-pentacyclo[6.5.1.0$^{2,7}$.0$^{9,13}$.1$^{3,6}$]pentadecanylene ethylene), poly(4-cyanoethyl-5-methoxyl-10,12-pentacyclo[6.5.1.0$^{2,7}$.0$^{9,13}$.1$^{3,6}$]pentadecanylene ethylene), poly(4-cyanoethyl-5-methoxymethyl-10,12-pentacyclo[6.5.1.0$^{2,7}$.0$^{9,13}$.1$^{3,6}$]pentadecanylene ethylene), poly(4-cyanoethyl-5-methoxycarbonyl-10,12-pentacyclo[6.5.1.0$^{2,7}$.0$^{9,13}$.1$^{3,6}$]pentadecanylene ethylene), poly(4-cyanoethyl-5-phenyloxycarbonyl-10,12-pentacyclo[6.5.1.0$^{2,7}$.0$^{9,13}$.1$^{3,6}$]pentadecanylene ethylene), poly(4-cyanoethyl-5-phenyloxycarbonylmethyl-10,12-pentacyclo[6.5.1.0$^{2,7}$.0$^{9,13}$.1$^{3,6}$]pentadecanylene ethylene), poly(4-cyanopropyl-10,12-pentacyclo[6.5.1.0$^{2,7}$.0$^{9,13}$.1$^{3,6}$]pentadecanylene ethylene), poly(4-cyanobutyl-10,12-pentacyclo[6.5.1.0$^{2,7}$.0$^{9,13}$.1$^{3,6}$]pentadecanylene ethylene), poly(4-cyanohexyl-10,12-pentacyclo[6.5.1.0$^{2,7}$.0$^{9,13}$.1$^{3,6}$]pentadecanylene ethylene) and the like.

In addition, poly(4-cyanoethoxy-10,12-pentacyclo[6.5.1.0$^{2,7}$.0$^{9,13}$.1$^{3,6}$]pentadecanylene ethylene), poly(4-cyanoethoxy-4-methyl-10,12-pentacyclo[6.5.1.0$^{2,7}$.0$^{9,13}$.1$^{3,6}$] pentadecanylene ethylene), poly(4-cyanoethoxy-5-methyl-10,12-pentacyclo[6.5.1.0$^{2,7}$.0$^{9,13}$.1$^{3,6}$]pentadecanylene ethylene), poly(4-cyanoethoxy-5-phenyl-10,12-pentacyclo[6.5.1.0$^{2,7}$.0$^{9,13}$.1$^{3,6}$]pentadecanylene ethylene), poly(4-cyanoethoxy-5-methoxyl-10,12-pentacyclo[6.5.1.0$^{2,7}$.0$^{9,13}$.1$^{3,6}$]pentadecanylene ethylene), poly(4-cyanoethoxy-5-methoxymethyl-10,12-pentacyclo[6.5.1.0$^{2,7}$.0$^{9,13}$.1$^{3,6}$]pentadecanylene ethylene), poly(4-cyanoethoxy-5-methoxycarbonyl-10,12-pentacyclo[6.5.1.0$^{2,7}$.0$^{9,13}$.1$^{3,6}$] pentadecanylene ethylene), poly(4-cyanoethoxy-5-phenyloxycarbonyl-10,12-pentacyclo[6.5.1.0$^{2,7}$.0$^{9,13}$.1$^{3,6}$] pentadecanylene ethylene), poly(4-cyanoethoxy-5-phenyloxycarbonylmethyl-10,12-pentacyclo[6.5.1.0$^{2,7}$.0$^{9,13}$.1$^{3,6}$]pentadecanylene ethylene), poly(4-cyanoethoxymethyl-10,12-pentacyclo[6.5.1.0$^{2,7}$.0$^{9,13}$.1$^{3,6}$]pentadecanylene ethylene), poly(4-cyanoethoxymethyl-4-methyl-10,12-pentacyclo[6.5.1.0$^{2,7}$.0$^{9,13}$.1$^{3,6}$]pentadecanylene ethylene), poly(4-cyanoethoxymethyl-5-methyl-10,12-pentacyclo[6.5.1.0$^{2,7}$.0$^{9,13}$.1$^{3,6}$]pentadecanylene ethylene), poly(4-cyanoethoxymethyl-5-phenyl-10,12-pentacyclo[6.5.1.0$^{2,7}$.0$^{9,13}$.1$^{3,6}$]pentadecanylene ethylene), poly(4-cyanoethoxymethyl-5-methoxyl-10,12-pentacyclo[6.5.1.0$^{2,7}$.0$^{9,13}$.1$^{3,6}$]pentadecanylene ethylene), poly(4-cyanoethoxymethyl-5-methoxymethyl-10,12-pentacyclo[6.5.1.0$^{2,7}$.0$^{9,13}$.1$^{3,6}$]pentadecanylene ethylene), poly(4-cyanoethoxymethyl-5-methoxycarbonyl-10,12-pentacyclo[6.5.1.0$^{2,7}$.0$^{9,13}$.1$^{3,6}$]pentadecanylene ethylene), poly(4-cyanoethoxymethyl-5-phenyloxycarbonyl-10,12-pentacyclo[6.5.1.0$^{2,7}$.0$^{9,13}$.1$^{3,6}$]pentadecanylene ethylene), poly(4-cyanoethoxymethyl-5-phenyloxycarbonylmethyl-10,12-pentacyclo[6.5.1.0$^{2,7}$.0$^{9,13}$.1$^{3,6}$]pentadecanylene ethylene), poly(4-(4'-cyanophenyl)-10,12-pentacyclo[6.5.1.0$^{2,7}$.0$^{9,13}$.1$^{3,6}$]pentadecanylene ethylene), poly(4-(4'-cyanophenyl)-4-methyl-10,12-pentacyclo[6.5.1.0$^{2,7}$.0$^{9,13}$.1$^{3,6}$]pentadecanylene ethylene), poly(4-(4'-cyanophenyl)-5-methyl-10,12-pentacyclo[6.5.1.0$^{2,7}$.0$^{9,13}$.1$^{3,6}$]pentadecanylene ethylene), poly(4-(4'-cyanophenyl)-5-phenyl-10,12-pentacyclo[6.5.1.0$^{2,7}$.0$^{9,13}$.1$^{3,6}$] pentadecanylene ethylene), poly(4-(4'-cyanophenyl)-5-methoxyl-10,12-pentacyclo[6.5.1.0$^{2,7}$.0$^{9,13}$.1$^{3,6}$] pentadecanylene ethylene), poly(4-(4'-cyanophenyl)-5-methoxymethyl-10,12-pentacyclo[6.5.1.0$^{2,7}$.0$^{9,13}$.1$^{3,6}$] pentadecanylene ethylene), poly(4-(4'-cyanophenyl)-5-methoxycarbonyl-10,12-pentacyclo[6.5.1.0$^{2,7}$.0$^{9,13}$.1$^{3,6}$] pentadecanylene ethylene), poly(4-(4'-cyanophenyl)-5-phenyloxycarbonyl-10,12-pentacyclo[6.5.1.0$^{2,7}$.0$^{9,13}$.1$^{3,6}$] pentadecanylene ethylene), poly(4-(4'-cyanophenyl)-5-phenyloxycarbonylmethyl-10,12-pentacyclo[6.5.1.0$^{2,7}$.0$^{9,13}$.1$^{3,6}$]pentadecanylene ethylene), poly(4-cyanoethoxycarbonyl-10,12-pentacyclo[6.5.1.0$^{2,7}$.0$^{9,13}$.1$^{3,6}$]pentadecanylene ethylene), poly(4-cyanoethoxycarbonyl-4-methyl-10,12-pentacyclo[6.5.1.0$^{2,7}$.0$^{9,13}$.1$^{3,6}$]pentadecanylene ethylene), poly(4-cyanoethoxycarbonyl-5-methyl-10,12-pentacyclo[6.5.1.0$^{2,7}$.0$^{9,13}$.1$^{3,6}$]pentadecanylene ethylene), poly(4-cyanoethoxycarbonyl-5-phenyl-10,12-pentacyclo[6.5.1.0$^{2,7}$.0$^{9,13}$.1$^{3,6}$]pentadecanylene ethylene), poly(4-cyanoethoxycarbonyl-5-methoxyl-10,12-pentacyclo[6.5.1.0$^{2,7}$.0$^{9,13}$.1$^{3,6}$]pentadecanylene ethylene), poly(4-cyanoethoxycarbonyl-5-methoxymethyl-10,12-pentacyclo[6.5.1.0$^{2,7}$.0$^{9,13}$.1$^{3,6}$]pentadecanylene ethylene), poly(4-cyanoethoxycarbonyl-5-methoxycarbonyl-10,12-pentacyclo[6.5.1.0$^{2,7}$.0$^{9,13}$.1$^{3,6}$]pentadecanylene ethylene), poly(4-cyanoethoxycarbonyl-5-phenyloxycarbonyl-10,12-pentacyclo[6.5.1.0$^{2,7}$.0$^{9,13}$.1$^{3,6}$]pentadecanylene ethylene), poly(4-cyanoethoxycarbonyl-5-phenyloxycarbonylmethyl-10,12-pentacyclo[6.5.1.0$^{2,7}$.0$^{9,13}$.1$^{3,6}$]pentadecanylene ethylene), poly(4-(4'-cyanophenylcarbonyl)-10,12-pentacyclo[6.5.1.0$^{2,7}$.0$^{9,13}$.1$^{3,6}$]pentadecanylene ethylene), poly(4-(4'-cyanophenylcarbonyl)-4-methyl-10,12-pentacyclo[6.5.1.0$^{2,7}$.0$^{9,13}$.1$^{3,6}$]pentadecanylene ethylene), poly(4-(4'-cyanophenylcarbonyl)-5-methyl-10,12-pentacyclo[6.5.1.0$^{2,7}$.0$^{9,13}$.1$^{3,6}$]pentadecanylene ethylene), poly(4-(4'-cyanophenylcarbonyl)-5-phenyl-10,12-pentacyclo[6.5.1.0$^{2,7}$.0$^{9,13}$.1$^{3,6}$]pentadecanylene ethylene), poly(4-(4'-cyanophenylcarbonyl)-5-methoxyl-10,12-pentacyclo[6.5.1.0$^{2,7}$.0$^{9,13}$.1$^{3,6}$]pentadecanylene ethylene), poly(4-(4'-cyanophenylcarbonyl)-5-methoxymethyl-10,12-pentacyclo[6.5.1.0$^{2,7}$.0$^{9,13}$.1$^{3,6}$]pentadecanylene ethylene), poly(4-(4'-cyanophenylcarbonyl)-5-methoxycarbonyl-10,12-pentacyclo[6.5.1.0$^{2,7}$.0$^{9,13}$.1$^{3,6}$]pentadecanylene ethylene), poly(4-(4'-cyanophenylcarbonyl)-5-phenyloxycarbonyl-10,12-pentacyclo[6.5.1.0$^{2,7}$.0$^{9,13}$.1$^{3,6}$]pentadecanylene ethylene), poly(4-(4'-cyanophenylcarbonyl)-5-phenyloxycarbonylmethyl-10,12-pentacyclo[6.5.1.0$^{2,7}$.0$^{9,13}$.1$^{3,6}$] pentadecanylene ethylene), poly(4-cyanoethoxycarbonylmethyl-10,12-pentacyclo[6.5.1.0$^{2,7}$.0$^{9,13}$.1$^{3,6}$]pentadecanylene ethylene), poly(4-cyanoethoxycarbonylmethyl-4-methyl-10,12-pentacyclo[6.5.1.0$^{2,7}$.0$^{9,13}$.1$^{3,6}$]pentadecanylene ethylene), poly(4-cyanoethoxycarbonylmethyl-5-methyl-10,12-pentacyclo[6.5.1.0$^{2,7}$.0$^{9,13}$.1$^{3,6}$]pentadecanylene ethylene), poly(4-cyanoethoxycarbonylmethyl-5-phenyl-10,12-pentacyclo[6.5.1.0$^{2,7}$.0$^{9,13}$.1$^{3,6}$]pentadecanylene ethylene), poly(4-cyanoethoxycarbonylmethyl-5-methoxyl-10,12-pentacyclo[6.5.1.0$^{2,7}$.0$^{9,13}$.1$^{3,6}$]pentadecanylene ethylene), poly(4-cyanoethoxycarbonyl-5-methoxymethyl-10,12-pentacyclo[6.5.1.0$^{2,7}$.0$^{9,13}$.1$^{3,6}$]pentadecanylene ethylene), poly(4-cyanoethoxycarbonylmethyl-5-methoxycarbonyl-10,12-pentacyclo[6.5.1.0$^{2,7}$.0$^{9,13}$.1$^{3,6}$]pentadecanylene ethylene), poly(4-cyanoethoxycarbonylmethyl-5-phenyloxycarbonyl-10,12-pentacyclo[6.5.1.0$^{2,7}$.0$^{9,13}$.1$^{3,6}$]pentadecanylene ethylene), poly(4-cyanoethoxycarbonylmethyl-5-phenyloxycarbonylmethyl-10,12-pentacyclo[6.5.1.0$^{2,7}$.0$^{9,13}$.1$^{3,6}$]pentadecanylene ethylene), poly(4-(4'-cyanophenylcarbonylmethyl)-10,12-pentacyclo[6.5.1.0$^{2,7}$.0$^{9,13}$.1$^{3,6}$]pentadecanylene ethylene), poly(4-(4'-cyanophenylcarbonylmethyl)-4-methyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-methyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-phenyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-methoxyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-methoxymethyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-methoxycarbonyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-phenyloxycarbonyl-10,12-pentacyclo[6.5.1.0$^{2,7}$.0$^{9,13}$.1$^{3,6}$]pentadecanylene ethylene), poly(4-(4'-cyanophenylcarbonylmethyl)-5-phenyloxycarbonylmethyl-10,12-pentacyclo[6.5.1.0$^{2,7}$.0$^{9,13}$.1$^{3,6}$]pentadecanylene ethylene) and the like.

Furthermore, poly(4,5-dicyano-10,12-pentacyclo[6.5.1.0$^{2,7}$.0$^{9,13}$.1$^{3,6}$]pentadecanylene ethylene), poly(4-cyano-5-cyanomethyl-10,12-pentacyclo[6.5.1.0$^{2,7}$.0$^{9,13}$.1$^{3,6}$]pentadecanylene ethylene), poly(4-cyano-5-cyanoethyl-10,12-pentacyclo[6.5.1.0$^{2,7}$.0$^{9,13}$.1$^{3,6}$]pentadecanylene ethylene), poly(4,5-dicyanomethyl-10,12-pentacyclo[6.5.1.0$^{2,7}$.0$^{9,13}$.1$^{3,6}$]pentadecanylene ethylene), poly(4-cyanomethyl-5-cyanoethyl-10,12-pentacyclo[6.5.1.0$^{2,7}$.0$^{9,13}$.1$^{3,6}$]pentadecanylene ethylene), poly(4,5-dicyanoethyl-10,12-pentacyclo[6.5.1.0$^{2,7}$.0$^{9,13}$.1$^{3,6}$]pentadecanylene ethylene), poly(4-cyanoethyl-5-cyanomethyl-10,12-pentacyclo[6.5.1.0$^{2,7}$.0$^{9,13}$.1$^{3,6}$]pentadecanylene ethylene), poly(4,5-dicyanopropyl-10,12-pentacyclo[6.5.1.0$^{2,7}$.0$^{9,13}$.1$^{3,6}$]pentadecanylene ethylene), poly(4-cyano-5-fluoro-10,12-pentacyclo[6.5.1.0$^{2,7}$.0$^{9,13}$.1$^{3,6}$]pentadecanylene ethylene), poly(4-cyano-5-trifluoromethyl-10,12-pentacyclo[6.5.1.0$^{2,7}$.0$^{9,13}$.1$^{3,6}$]pentadecanylene ethylene), poly(4-cyano-5,5-bis(trifluoromethyl)-10,12-pentacyclo[6.5.1.0$^{2,7}$.0$^{9,13}$.1$^{3,6}$]pentadecanylene ethylene), poly(4-cyanomethyl-5-fluoro-10,12-pentacyclo[6.5.1.0$^{2,7}$.0$^{9,13}$.1$^{3,6}$]pentadecanylene ethylene), poly(4-cyanomethyl-5-trifluoromethyl-10,12-pentacyclo[6.5.1.0$^{2,7}$.0$^{9,13}$.1$^{3,6}$]pentadecanylene ethylene), poly(4-cyanomethyl-5,5-bis(trifluoromethyl)-10,12-pentacyclo[6.5.1.0$^{2,7}$.0$^{9,13}$.1$^{3,6}$]pentadecanylene ethylene), poly(4-cyanoethyl-5-fluoro-10,12-pentacyclo[6.5.1.0$^{2,7}$.0$^{9,13}$.1$^{3,6}$]pentadecanylene ethylene), poly(4-cyanoethyl-5-trifluoromethyl-10,12-pentacyclo[6.5.1.0$^{2,7}$.0$^{9,13}$.1$^{3,6}$]pentadecanylene ethylene), poly(4-cyanoethyl-5,5-bis(trifluoromethyl)-10,12-pentacyclo[6.5.1.0$^{2,7}$.0$^{9,13}$.1$^{3,6}$]pentadecanylene ethylene) and the like.

Furthermore, containing cyano, n is 3, such as poly(5-cyano-13,15-heptacyclo[8.7.0.1$^{2,9}$.1$^{4,7}$.1$^{11,17}$.0$^{3,8}$.0$^{12,16}$]icosanyl ene ethylene), poly(5-cyano-5-methyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanopropyl-13,15-heptacyclo[8.7.0.1$^{2,9}$.1$^{4,7}$.1$^{11,17}$.0$^{3,8}$.0$^{12,16}$]icosanylene ethylene), poly(5-cyanobutyl-13,15-heptacyclo[8.7.0.1$^{2,9}$.1$^{4,7}$.1$^{11,17}$.0$^{3,8}$.0$^{12,16}$]icosanylene ethylene), poly(5-cyanohexyl-13,15-heptacyclo[8.7.0.1$^{2,9}$.1$^{4,7}$.1$^{11,17}$.0$^{3,8}$.0$^{12,16}$]icosanylene ethylene) and the like.

In addition, poly(5-cyanoethoxy-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-5-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxy-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-5-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxymethyl-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-5-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenyl)-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-5-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonyl-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-5-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonyl)-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-5-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-methyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethoxycarbonylmethyl-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-5-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-methyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-phenyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-methoxyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-methoxymethyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-methoxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-phenyloxycarbonyl-13,15-heptacyclo[8.7.0.1$^{2,9}$.1$^{4,7}$.1$^{11,17}$.0$^{3,8}$.0$^{12,16}$]icosanylene ethylene), poly(5-(4'-cyanophenylcarbonylmethyl)-6-phenyloxycarbonylmethyl-13,15-heptacyclo[8.7.0.1$^{2,9}$.1$^{4,7}$.1$^{11,17}$.0$^{3,8}$.0$^{12,16}$]icosanylene ethylene) and the like.

Furthermore, poly(5,5-dicyano-13,15-heptacyclo[8.7.0.1$^{2,9}$.1$^{4,7}$.1$^{11,17}$.0$^{3,8}$.0$^{12,16}$]icosanylene ethylene), poly(5-cyano-6-cyanomethyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-cyanoethyl-13,15-heptacyclo[8.7.0.1$^{2,9}$.1$^{4,7}$.1$^{11,17}$.0$^{3,8}$.0$^{12,16}$]icosanylene ethylene), poly(5,5-dicyanomethyl-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-cyanoethyl-13,15-heptacyclo[8.7.0.1$^{2,9}$.1$^{4,7}$.1$^{11,17}$.0$^{3,8}$.0$^{12,16}$]icosanylene ethylene), poly(5,5-dicyanoethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-cyanomethyl-13,15-heptacyclo[8.7.0.1$^{2,9}$.1$^{4,7}$.1$^{11,17}$.0$^{3,8}$.0$^{12,16}$]icosanylene ethylene), poly(5,5-dicyanopropyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6-fluoro-13,15-heptacyclo[8.7.0.1$^{2,9}$.1$^{4,7}$.1$^{11,17}$.0$^{3,8}$.0$^{12,16}$]icosanylene ethylene), poly(5-cyano-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-cyano-6,6-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-fluoro-13,15-heptacyclo[8.7.0.1$^{2,9}$.1$^{4,7}$.1$^{11,17}$.0$^{3,8}$.0$^{12,16}$]icosanylene ethylene), poly(5-cyanomethyl-6-trifluoromethyl-13,15-heptacyclo[8.7.0.1$^{2,9}$.1$^{4,7}$.1$^{11,17}$.
0$^{3,8}$.0$^{12,16}$]icosanylene ethylene), poly(5-cyanomethyl-6,6-bis(trifluoromethyl)-13,15-heptacyclo[8.7.0.1$^{2,9}$.1$^{4,7}$.
1$^{11,17}$.0$^{3,8}$.0$^{12,16}$]icosanylene ethylene), poly(5-cyanoethyl-6-fluoro-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6-trifluoromethyl-13,15-heptacyclo[8.7.0.1$^{2,9}$.1$^{4,7}$.1$^{11,17}$.0$^{3,8}$.0$^{12,16}$]icosanylene ethylene), poly(5-cyanoethyl-6,6-bis(trifluoromethyl)-13,15-heptacyclo[8.7.0.1$^{2,9}$.1$^{4,7}$.1$^{11,17}$.0$^{3,8}$.0$^{12,16}$]icosanylene ethylene) and the like.

Furthermore, examples of $X^2$ in the general formula (2) include —O—, —S—, —NR$^{11}$—, —PR$^{11}$— and —CR$^{11}$R$^{12}$— (R$^{11}$ and R$^{12}$ each independently represent hydrogen or alkyl having 1 to 20 carbon atoms) instead of —CH$_2$— of decanylene, pentadecanylene and icosanylene.

In the present invention, in the cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, the repeating structural unit [C] represented by the general formula (3) is represented by the following formula,

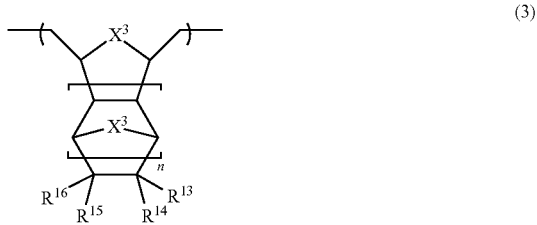

(3)

wherein, in the formula (3), R$^{13}$ to R$^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; R$^{13}$ to R$^{16}$ may be bonded to each other to form a ring structure; X$^3$ is selected from —O—, —S—, —NR$^{17}$—, —PR$^{18}$— and —CR$^{17}$R$^{18}$— (R$^{17}$ and R$^{18}$ each independently represent hydrogen or alkyl having 1 to 20 carbon atoms), and may be identical with or different from each other; and n represents 0 or 1.

More specifically, R$^{13}$ to R$^{16}$ in the general formula (3) include hydrogen; alkyl having 1 to 10 carbon atoms such as methyl, ethyl, propyl, isopropyl, 2-methylisopropyl, n-butyl, n-pentyl, cyclopentyl, hexyl, cyclohexyl, heptyl, octyl or the like; aryl having 6 to 20 carbon atoms such as phenyl, naphthyl, indenyl, biphenyl, anthracenyl, phenanthracenyl, triphenylenyl or the like; alkoxy having 1 to 10 carbon atoms such as methoxy, ethoxy, propoxy, butoxy, tert-butoxy, pentyloxy, cyclopentyloxy, hexyloxy, cyclohexyloxy or the like; alkoxyalkyl having 2 to 10 carbon atoms such as methoxymethyl, ethoxymethyl, propoxymethyl, butoxymethyl, tert-butoxymethyl, pentyloxymethyl, cyclopentyloxymethyl, hexyloxymethyl, cyclohexyloxymethyl, methoxyethyl, ethoxyethyl, propoxyethyl, butoxyethyl, pentyloxyethyl, cyclopentyloxyethyl, hexyloxyethyl, cyclohexyloxyethyl, methoxypropyl, ethoxypropyl, propoxypropyl, butoxypropyl, pentyloxypropyl, cyclopentyloxypropyl, hexyloxypropyl, cyclohexyloxypropyl or the like; alkoxycarbonyl having 2 to 10 carbon atoms such as methoxycarbonyl, ethoxycarbonyl, tert-butoxycarbonyl, pentyloxycarbonyl, cyclopentyloxycarbonyl, hexyloxycarbonyl, cyclohexyloxycarbonyl or the like; alkoxycarbonylalkyl having 3 to 10 carbon atoms such as methoxycarbonylmethyl, ethoxycarbonylmethyl, tert-butoxycarbonylmethyl, pentyloxycarbonylmethyl, cyclopentyloxycarbonylmethyl, hexyloxycarbonylmethyl, cyclohexyloxycarbonylmethyl or the like; and alkoxyalkyloxycarbonyl having 3 to 10 carbon atoms such as methoxymethyloxycarbonyl, ethoxymethyloxycarbonyl, propoxymethyloxycarbonyl, butoxymethyloxycarbonyl, tert-butoxymethyloxycarbonyl, pentyloxymethyloxycarbonyl, cyclopentyloxymethyloxycarbonyl, hexyloxymethyloxycarbonyl, cyclohexyloxymethyloxycarbonyl or the like.

In the present invention, the repeating structural unit represented by the general formula (3) constituting the cyclic olefin copolymer may be only one kind or may be composed of two or more kinds of structural units in which at least one of R$^{13}$ to R$^{16}$ in the general formula (3) is different from the others.

Furthermore, in the present invention, specific examples of the structure of the cyclic olefin polymer containing a repeating structural unit represented by the general formula (3), for example, n is 0, such as poly(1,3-cyclopentylene ethylene), poly(1-methyl-3,5-cyclopentylene ethylene), poly(1,1-dimethyl-3,5-cyclopentylene ethylene), poly(1-ethyl-3,5-cyclopentylene ethylene), poly(1-propyl-3,5-cyclopentylene ethylene), poly(1-isopropyl-3,5-cyclopentylene ethylene), poly(1-(2'-methylisopropyl)-3,5-cyclopentylene ethylene), poly(1-butyl-3,5-cyclopentylene ethylene), poly(1-pentyl-3,5-cyclopentylene ethylene), poly(1-cyclopentyl-3,5-cyclopentylene ethylene), poly(1-hexyl-3,5-cyclopentylene ethylene), poly(1-cyclohexyl-3,5-cyclopentylene ethylene), poly(1-heptyl-3,5-cyclopentylene ethylene), poly(1-phenyl-3,5-cyclopentylene ethylene), poly(1-methyl-1-phenyl-3,5-cyclopentylene ethylene), poly(1-(2'-indenyl)-3,5-cyclopentylene ethylene), poly(1-(2'-naphthyl)-3,5-cyclopentylene ethylene), poly(1-(4'-biphenyl)-3,5-cyclopentylene ethylene), poly(1-(2'-anthracenyl)-3,5-cyclopentylene ethylene), poly(1-methoxyl-3,5-cyclopentylene ethylene), poly(1-methyl-1-methoxyl-3,5-cyclopentylene ethylene), poly(1-ethoxy-3,5-cyclopentylene ethylene), poly(1-propoxy-3,5-cyclopentylene ethylene), poly(1-isopropoxy-3,5-cyclopentylene ethylene), poly(1-(2'-methylisopropoxy)-3,5-cyclopentylene ethylene), poly(1-butoxy-3,5-cyclopentylene ethylene), poly(1-tert-butoxy-3,5-cyclopentylene ethylene), poly(1-pentyloxy-3,5-cyclopentylene ethylene), poly(1-cyclopentyloxy-3,5-cyclopentylene ethylene), poly(1-hexyloxy-3,5-cyclopentylene ethylene), poly(1-cyclohexyloxy-3,5-cyclopentylene ethylene), poly(1-methoxymethyl-3,5-cyclopentylene ethylene), poly(1-methyl-1-methoxymethyl-3,5-cyclopentylene ethylene), poly(1-ethoxymethyl-3,5-cyclopentylene ethylene), poly(1-propoxymethyl-3,5-cyclopentylene ethylene), poly(1-butoxymethyl-3,5-cyclopentylene ethylene), poly(1-tert-butoxymethyl-3,5-cyclopentylene ethylene), poly(1-pentyloxymethyl-3,5-cyclopentylene ethylene), poly(1-cyclopentyloxymethyl-3,5-cyclopentylene ethylene), poly(1-hexyloxymethyl-3,5-cyclopentylene ethylene), poly(1-cyclohexyloxymethyl-3,5-cyclopentylene ethylene), poly(1-methoxyethyl-3,5-cyclopentylene ethylene), poly(1-methyl-1-methoxyethyl-3,5-cyclopentylene ethylene), poly(1-ethoxyethyl-3,5-cyclopentylene ethylene), poly(1-propoxyethyl-3,5-cyclopentylene ethylene), poly(1-butoxyethyl-3,5-cyclopentylene ethylene), poly(1-pentyloxyethyl-3,5-cyclopentylene ethylene), poly(1-hexyloxyethyl-3,5- cyclopentylene ethylene), poly(1-methoxypropyl-3,5-cyclopentylene ethylene), poly(1-ethoxypropyl-3,5-cyclopentylene ethylene), poly(1-propoxypropyl-3,5-cyclopentylene ethylene), poly(1-butoxypropyl-3,5-cyclopentylene ethylene), poly(1-pentyloxypropyl-3,5-cyclopentylene ethylene), poly(1-hexyloxypropyl-3,5-cyclopentylene ethylene) and the like.

In addition, poly(1-methoxycarbonyl-3,5-cyclopentylene ethylene), poly(1-methyl-1-methoxycarbonyl-3,5-cyclopentylene ethylene), poly(1-ethoxycarbonyl-3,5-cyclopentylene ethylene), poly(1-propoxycarbonyl-3,5-cyclopentylene ethylene), poly(1-butoxycarbonyl-3,5-cyclopentylene ethylene), poly(1-tert-butoxycarbonyl-3,5-cyclopentylene ethylene), poly(1-pentyloxycarbonyl-3,5-cyclopentylene ethylene), poly(1-hexyloxycarbonyl-3,5-cyclopentylene ethylene), poly(1-methoxycarbonylmethyl-3,5-cyclopentylene ethylene), poly(1-methyl-1-methoxycarbonylmethyl-3,5-cyclopentylene ethylene), poly(1-methoxycarbonylethyl-3,5-cyclopentylene ethylene), poly(1-methoxycarbonylpropyl-3,5-cyclopentylene ethylene), poly(1-methoxycarbonylbutyl-3,5-cyclopentylene ethylene), poly(1-methoxycarbonylpentyl-3,5-cyclopentylene ethylene), poly(1-ethoxycarbonylmethyl-3,5-cyclopentylene ethylene), poly(1-methyl-1-ethoxycarbonylmethyl-3,5-cyclopentylene ethylene), poly(1-ethoxycarbonylethyl-3,5-cyclopentylene ethylene), poly(1-ethoxycarbonylpropyl-3,5-cyclopentylene ethylene), poly(1-ethoxycarbonylbutyl-3,5-cyclopentylene ethylene), poly(1-ethoxycarbonylpentyl-3,5-cyclopentylene ethylene), poly(1-phenoxy-3,5-cyclopentylene ethylene), poly(1-methyl-1-phenoxy-3,5-cyclopentylene ethylene), poly(1-(2'-indenyloxy)-3,5-cyclopentylene ethylene), poly(1-(2'-naphtyloxy)-3,5-cyclopentylene ethylene), poly(1-(4'-biphenyloxy)-3,5-cyclopentylene ethylene), poly(1-(2'-anthracenyloxy)-3,5-cyclopentylene ethylene), poly(1-methoxymethyl oxycarbonylmethyl-3,5-cyclopentylene ethylene), poly(1-methyl-1-methoxymethyl oxycarbonylmethyl-3,5-cyclopentylene ethylene), poly(1-ethoxymethyl oxycarbonylmethyl-3,5-cyclopentylene ethylene), poly(1-propoxymethyl oxycarbonylmethyl-3,5-cyclopentylene ethylene), poly(1-butoxymethyl oxycarbonylmethyl-3,5-cyclopentylene ethylene), poly(1-tert-butoxymethyl oxycarbonylmethyl-3,5-cyclopentylene ethylene), poly(1-pentyloxymethyl oxycarbonylmethyl-3,5-cyclopentylene ethylene), poly(1-cyclopentyloxymethyl oxycarbonylmethyl-3,5-cyclopentylene ethylene), poly(1-hexyloxymethyl oxycarbonylmethyl-3,5-cyclopentylene ethylene), poly(1-cyclohexyloxymethyl oxycarbonylmethyl-3,5-cyclopentylene ethylene)poly(1-phenoxycarbonylmethyl-3,5-cyclopentylene ethylene), poly(1-methyl-1-phenoxycarbonylmethyl-3,5-cyclopentylene ethylene), poly(1-(2'-indenyloxycarbonyl methyl)-3,5-cyclopentylene ethylene), poly(1-(2'-naphtyloxycarbonyl methyl)-3,5-cyclopentylene ethylene), poly(1-(4'-biphenyloxycarbonyl methyl)-3,5-cyclopentylene ethylene), poly(1-(2'-anthracenyloxycarbonyl methyl)-3,5-cyclopentylene ethylene) and the like.

Furthermore, n is 1, such as poly(7,9-tricyclo[4.3.0.1$^{2,5}$]decanylene ethylene), poly(3-methyl-7,9-tricyclo[4.3.0.1$^{2,5}$]decanylene ethylene), poly(1,1-dimethyl-7,9-tricyclo[4.3.0.1$^{2,5}$]decanylene ethylene), poly(3-ethyl-7,9-tricyclo[4.3.0.1$^{2,5}$]decanylene ethylene), poly(3-propyl-7,9-tricyclo[4.3.0.1$^{2,5}$]decanylene ethylene), poly(3-isopropyl-7,9-tricyclo[4.3.0.1$^{2,5}$]decanylene ethylene), poly(3-(2'-methylisopropyl)-7,9-tricyclo[4.3.0.1$^{2,5}$]decanylene ethylene), poly(3-butyl-7,9-tricyclo[4.3.0.1$^{2,5}$]decanylene ethylene), poly(3-pentyl-7,9-tricyclo[4.3.0.1$^{2,5}$]decanylene ethylene), poly(3-cyclopentyl-7,9-tricyclo[4.3.0.1$^{2,5}$]decanylene ethylene), poly(3-hexyl-7,9-tricyclo[4.3.0.1$^{2,5}$]decanylene ethylene), poly(3-cyclohexyl-7,9-tricyclo[4.3.0.1$^{2,5}$]decanylene ethylene), poly(3-heptyl-7,9-tricyclo[4.3.0.1$^{2,5}$]decanylene ethylene), poly(3-phenyl-7,9-tricyclo[4.3.0.1$^{2,5}$]decanylene ethylene), poly(3-methyl-3-phenyl-7,9-tricyclo[4.3.0.1$^{2,5}$]decanylene ethylene), poly(3-(2'-indenyl)-7,9-tricyclo[4.3.0.1$^{2,5}$]decanylene ethylene), poly(3-(2'-naphthyl)-7,9-tricyclo[4.3.0.1$^{2,5}$]decanylene ethylene), poly(3-(4'-biphenyl)-7,9-tricyclo[4.3.0.1$^{2,5}$]decanylene ethylene), poly(3-(2'-anthracenyl)-7,9-tricyclo[4.3.0.1$^{2,5}$]decanylene ethylene), poly(3-methoxyl-7,9-tricyclo[4.3.0.1$^{2,5}$]decanylene ethylene), poly(3-methyl-3-methoxyl-7,9-tricyclo[4.3.0.1$^{2,5}$]decanylene ethylene), poly(3-ethoxy-7,9-tricyclo[4.3.0.1$^{2,5}$]decanylene ethylene), poly(3-propoxy-7,9-tricyclo[4.3.0.1$^{2,5}$]decanylene ethylene), poly(3-isopropoxy-7,9-tricyclo[4.3.0.1$^{2,5}$]decanylene ethylene), poly(3-(2'-methylisopropoxy)-7,9-tricyclo[4.3.0.1$^{2,5}$]decanylene ethylene), poly(3-butoxy-7,9-tricyclo[4.3.0.1$^{2,5}$]decanylene ethylene), poly(3-tert-butoxy-7,9-tricyclo[4.3.0.1$^{2,5}$]decanylene ethylene), poly(3-pentyloxy-7,9-tricyclo[4.3.0.1$^{2,5}$]decanylene ethylene), poly(3-cyclopentyloxy-7,9-tricyclo[4.3.0.1$^{2,5}$]decanylene ethylene), poly(3-hexyloxy-7,9-tricyclo[4.3.0.1$^{2,5}$]decanylene ethylene), poly(3-cyclohexyloxy-7,9-tricyclo[4.3.0.1$^{2,5}$]decanylene ethylene), poly(3-methoxymethyl-7,9-tricyclo[4.3.0.1$^{2,5}$]decanylene ethylene), poly(3-methyl-3-methoxymethyl-7,9-tricyclo[4.3.0.1$^{2,5}$]decanylene ethylene), poly(3-ethoxymethyl-7,9-tricyclo[4.3.0.1$^{2,5}$]decanylene ethylene), poly(3-propoxymethyl-7,9-tricyclo[4.3.0.1$^{2,5}$]decanylene ethylene), poly(3-butoxymethyl-7,9-tricyclo[4.3.0.1$^{2,5}$]decanylene ethylene), poly(3-tert-butoxymethyl-7,9-tricyclo[4.3.0.1$^{2,5}$]decanylene ethylene), poly(3-pentyloxymethyl-7,9-tricyclo[4.3.0.1$^{2,5}$]decanylene ethylene), poly(3-cyclopentyloxymethyl-7,9-tricyclo[4.3.0.1$^{2,5}$]decanylene ethylene), poly(3-hexyloxymethyl-7,9-tricyclo[4.3.0.1$^{2,5}$]decanylene ethylene), poly(3-cyclohexyloxymethyl-7,9-tricyclo[4.3.0.1$^{2,5}$]decanylene ethylene), poly(3-methoxyethyl-7,9-tricyclo[4.3.0.1$^{2,5}$]decanylene ethylene), poly(3-methyl-3-methoxyethyl-7,9-tricyclo[4.3.0.1$^{2,5}$]decanylene ethylene), poly(3-ethoxyethyl-7,9-tricyclo[4.3.0.1$^{2,5}$]decanylene ethylene), poly(3-propoxyethyl-7,9-tricyclo[4.3.0.1$^{2,5}$]decanylene ethylene), poly(3-butoxyethyl-7,9-tricyclo[4.3.0.1$^{2,5}$]decanylene ethylene), poly(3-pentyloxyethyl-7,9-tricyclo[4.3.0.1$^{2,5}$]decanylene ethylene), poly(3-hexyloxyethyl-7,9-tricyclo[4.3.0.1$^{2,5}$]decanylene ethylene), poly(3-methoxypropyl-7,9-tricyclo[4.3.0.1$^{2,5}$]decanylene ethylene), poly(3-ethoxypropyl-7,9-tricyclo[4.3.0.1$^{2,5}$]decanylene ethylene), poly(3-propoxypropyl-7,9-tricyclo[4.3.0.1$^{2,5}$]decanylene ethylene), poly(3-butoxypropyl-7,9-tricyclo[4.3.0.1$^{2,5}$]decanylene ethylene), poly(3-pentyloxypropyl-7,9-tricyclo[4.3.0.1$^{2,5}$]decanylene ethylene), poly(3-hexyloxypropyl-7,9-tricyclo[4.3.0.1$^{2,5}$]decanylene ethylene) and the like.

In addition, poly(3-methoxycarbonyl-7,9-tricyclo[4.3.0.1$^{2,5}$]decanylene ethylene), poly(3-methyl-3-methoxycarbonyl-7,9-tricyclo[4.3.0.1$^{2,5}$]decanylene ethylene), poly(3-ethoxycarbonyl-7,9-tricyclo[4.3.0.1$^{2,5}$]decanylene ethylene), poly(3-propoxycarbonyl-7,9-tricyclo[4.3.0.1$^{2,5}$]decanylene ethylene), poly(3-butoxycarbonyl-7,9-tricyclo[4.3.0.1$^{2,5}$]decanylene ethylene), poly(3-tert-butoxycarbonyl-7,9-tricyclo[4.3.0.1$^{2,5}$]decanylene ethylene), poly(3-pentyloxycarbonyl-7,9-tricyclo[4.3.0.1$^{2,5}$]decanylene ethylene), poly(3-hexyloxycarbonyl-7,9-tricyclo[4.3.0.1$^{2,5}$]decanylene ethylene), poly(3-methoxycarbonylmethyl-7,9-tricyclo[4.3.0.1$^{2,5}$]decanylene ethylene), poly(3-methyl-3-methoxycarbonylmethyl-7,9-tricyclo[4.3.0.1$^{2,5}$]decanylene ethylene), poly(3-methoxycarbonylethyl-7,9-tricyclo[4.3.0.1$^{2,5}$]decanylene ethylene), poly(3-methoxycarbonylpropyl-7,9-tricyclo[4.3.0.1$^{2,5}$]decanylene ethylene), poly(3-methoxycarbonylbutyl-7,9-tricyclo[4.3.0.1$^{2,5}$]decanylene ethylene), poly(3-methoxycarbonylpentyl-7,9-tricyclo[4.3.0.1$^{2,5}$]decanylene ethylene), poly(3-ethoxycarbonylmethyl-7,9-tricyclo[4.3.0.1$^{2,5}$]decanylene ethylene), poly(3-methyl-3-ethoxycarbonylmethyl-7,9-tricyclo[4.3.0.1$^{2,5}$]decanyl ene ethylene), poly(3-ethoxycarbonylethyl-7,9-tricyclo[4.3.0.1$^{2,5}$]decanylene ethylene), poly(3-ethoxycarbonylpropyl-7,9-tricyclo[4.3.0.1$^{2,5}$]decanylene ethylene), poly(3-ethoxycarbonylbutyl-7,9-tricyclo[4.3.0.1$^{2,5}$]decanylene ethylene), poly(3-ethoxycarbonylpentyl-7,9-tricyclo[4.3.0.1$^{2,5}$]decanylene ethylene), poly(1-phenoxy-7,9-tricyclo[4.3.0.1$^{2,5}$]decanylene ethylene), poly(1-methyl-1-phenoxy-7,9-tricyclo[4.3.0.1$^{2,5}$]decanylene ethylene), poly(1-(2'-indenyloxy)-7,9-tricyclo[4.3.0.1$^{2,5}$]decanylene ethylene), poly(1-(2'-naphtyloxy)-7,9-tricyclo[4.3.0.1$^{2,5}$]decanylene ethylene), poly(1-(4'-biphenyloxy)-7,9-tricyclo[4.3.0.1$^{2,5}$]decanylene ethylene), poly(1-(2'-anthracenyloxy)-7,9-tricyclo[4.3.0.1$^{2,5}$]decanylene ethylene), poly(3-methoxymethyl oxycarbonylmethyl-7,9-tricyclo[4.3.0.1$^{2,5}$]decanylene ethylene), poly(3-methyl-3-methoxymethyl oxycarbonylmethyl-7,9-tricyclo[4.3.0.1$^{2,5}$]decanylene ethylene), poly(3-ethoxymethyl oxycarbonylmethyl-7,9-tricyclo[4.3.0.1$^{2,5}$]decanylene ethylene), poly(3-propoxymethyl oxycarbonylmethyl-7,9-tricyclo[4.3.0.1$^{2,5}$]decanylene ethylene), poly(3-butoxymethyl oxycarbonylmethyl-7,9-tricyclo[4.3.0.1$^{2,5}$]decanylene ethylene), poly(3-tert-butoxymethyl oxycarbonylmethyl-7,9-tricyclo[4.3.0.1$^{2,5}$]decanylene ethylene), poly(3-pentyloxymethyl oxycarbonylmethyl-7,9-tricyclo[4.3.0.1$^{2,5}$]decanylene ethylene), poly(3-cyclopentyloxymethyl oxycarbonylmethyl-7,9-tricyclo[4.3.0.1$^{2,5}$]decanylene ethylene), poly(3-hexyloxymethyl oxycarbonylmethyl-7,9-tricyclo[4.3.0.1$^{2,5}$]decanylene ethylene), poly(3-cyclohexyloxymethyl oxycarbonylmethyl-7,9-tricyclo[4.3.0.1$^{2,5}$]decanylene ethylene), poly(1-phenoxycarbonylmethyl-7,9-tricyclo[4.3.0.1$^{2,5}$]decanylene ethylene), poly(1-methyl-1-phenoxycarbonylmethyl-7,9-tricyclo[4.3.0.1$^{2,5}$]decanylene ethylene), poly(1-(2'-indenyl oxycarbonylmethyl)-7,9-tricyclo[4.3.0.1$^{2,5}$]decanylene ethylene), poly(1-(2'-naphtyl oxycarbonylmethyl)-7,9-tricyclo[4.3.0.1$^{2,5}$]decanylene ethylene), poly(1-(4'-biphenyl oxycarbonylmethyl)-7,9-tricyclo[4.3.0.1$^{2,5}$]decanylene ethylene), poly(1-(2'-anthracenyl oxycarbonylmethyl)-7,9-tricyclo[4.3.0.1$^{2,5}$]decanylene ethylene) and the like.

Furthermore, examples of $X^3$ in the general formula (3) include —O—, —S—, —NR$^{17}$—, —PR$^{18}$— and —CR$^{17}$R$^{18}$— (R$^{17}$ and R$^{18}$ each independently represent hydrogen or alkyl having 1 to 20 carbon atoms) instead of —CH$_2$— of the above cyclopentylene or decanylene.

In the present invention, the cyclic olefin copolymer containing at least a repeating structural unit [A] represented by the general formula (1) and a repeating structural unit [B] represented by the general formula (2) or the cyclic olefin copolymer containing at least a repeating structural unit [A] represented by the general formula (1) and a repeating structural unit [B] represented by the general formula (2), and containing a repeating structural unit [C] represented by the general formula (3) is an optical material which has a property of exhibiting the dichroic ratio D=I$_∥$/I$_⊥$ of parallel light intensity I$_∥$ to perpendicular light intensity I$_⊥$, each relative to the orientation direction at 1,500 to 1,400 cm$^{-1}$ according to Raman spectroscopy, and in which the absolute value of the ratio ΔOB/ΔF is from 0.001 to 0.250 (the ratio of ΔOB representing the amount of a change in the absolute value of the orientation birefringence to ΔF representing the amount of a change in the absolute value of the orientation coefficient F=(D−1)/(D+2) that is a function of the dichroic ratio D=I$_∥$/I$_⊥$). Furthermore, the copolymer is an optical material exhibiting very low birefringence, in which the absolute value of the orientation coefficient F=(D−1)/(D+2) is equal to or more than 0.001 and the absolute value of the orientation birefringence is equal to or less than 5×10$^{-4}$, and is an optical material exhibiting very low birefringence in which the absolute value of the photoelastic constant is equal to or less than 7×10$^{-12}$ Pa$^{-1}$.

Orientation information of a crystalline polymer from the anisotropy exhibiting the dichroic ratio D=I$_∥$/I$_⊥$ of parallel light intensity I$_∥$ to perpendicular light intensity I$_⊥$, each relative to the orientation direction may generally be obtained by the infrared spectroscopy. However, in an amorphous polymer having a plurality of ring structures such as the cyclic olefin copolymer of the present invention, since the absorption intensity of CH$_2$ of the oriented polymer main chain is saturated, in spite of orientation by stretching, a difference between parallel light intensity I$_∥$ and perpendicular light intensity I$_⊥$ is not observed at all, and essential nature of the polymer has not been clarified.

In the present invention, essential characteristics regarding orientation information of the polymer have been clarified for the first time by the Raman spectroscopy in which a band exhibiting molecular skeleton vibrations appears more strongly than the strong polar functional group, as compared to the infrared spectroscopy. In particular, it has been found that inherent characteristics in the cyclic olefin copolymer of the present invention are obtained from orientation information of anisotropy of the dichroic ratio D=I$_∥$/I$_⊥$ of parallel light intensity I$_∥$ to perpendicular light intensity I$_⊥$, each relative to the orientation direction of the Raman scattering light at Raman shift of 1,500 to 1,400 cm$^{-1}$ belonging to CH$_2$ scissoring vibration of the polymer chain derived from the Raman active bonds.

The relationship between the orientation coefficient F=(D−1)/(D+2) using the dichroic ratio D and orientation information may be considered in the following manner. In consideration of the relationship between orientation information of molecules and Raman spectroscopy reported by Bower (J. Polym. Sci., Polym. Phys. Ed., 10, 2135 (1972)), the intensity of Raman scattering I$_s$ is expressed in Equation (1).

[Equation 1]

$$I_s = I_0 \sum \left( \sum_{ij} l_{i'} l_j \alpha_{ij} \right)^2 \quad (1)$$

Herein, αij is the Raman tensor (i,j=1 to 3), cosine values of respective incident light and scattering light in the polarization direction are li' and lj with respect to a sample-fixed coordinate O-x$_1$x$_2$x$_3$, and Io is a constant depending on the incident light intensity and coefficients of an instrument.

The molecular orientation information from Equation (1) is expressed in Equation (2) when a sample has no preferred orientation with respect to a sample-fixed coordinate O-x$_3$' in a uniaxially stretched system, and in the case of a structural unit of the tensor of the same axis as the coordinate O-x$_1$'x$_2$'x$_3$', No is the total number of the scattering units relating to the Raman intensity.

[Equation 2]

$$\sum \alpha_{ij} \alpha_{pq} = 4\pi^2 N_0 \sum_l M_{100} A_{100}^{ijpg} \quad (2)$$

Herein, $A_{100}^{ijpq}$ is a secondary additivity formula of the Raman polarizability $\alpha i$ (i=1 to 3) given by Bower. $M_{100}$ is a Legendre polynomial and is given in Equation (3).

[Equation 3]

$$M_{100} = (1/4\pi^2)[(2l+1)/2]^{1/2} \langle P_l(\cos\theta) \rangle \quad (3)$$

From Equations (1) to (3), an orientation function is given in the following equation as secondary orientation information.

[Equation 4]

$$\langle P_2(\cos\theta)\rangle = (3\langle \cos^2\theta\rangle -1)/2 \quad (4)$$

Herein, $\theta$ is an angle between the axis of the molecular chain and the orientation direction.

Furthermore, the quaternary Equation (5) is obtained as orientation information.

[Equation 5]

$$\langle P_4(\cos\theta)\rangle = (35\langle \cos^4\theta\rangle -30\langle \cos^2\theta\rangle +3)/8 \quad (5)$$

Meanwhile, a function of secondary orientation information is related to the dichroic ratio D and is expressed in the following equation.

[Equation 6]

$$\langle P_2(\cos\theta)\rangle = (D-1)(2\cot^2\alpha+2)/(D+2)(2\cot^2\alpha-1) \quad (6)$$

Herein, $\alpha$ is an angle between the polarization moment vector of the vibration and the axis of the molecular chain.

Accordingly, if the angle $\alpha=90$ between the polarization moment vector and the axis of the molecular chain becomes an ideal state in the case of a carbon-carbon bond, the orientation function $\langle P_2(\cos\theta)\rangle$ becomes Equation (7) to give a function of the orientation coefficient $F=(D-1)/(D+2)$ that is a function of the dichroic ratio D of the present invention.

[Equation 7]

$$\langle P_2(\cos\theta)\rangle = -2(D-1)/(D+2) \quad (7)$$

The optical material of the present invention exhibits very low birefringence, in which the absolute value of this orientation coefficient $F=(D-1)/(D+2)$ is equal to or more than 0.001 and the absolute value of the orientation birefringence is equal to or less than $5\times10^{-4}$.

When the absolute value of the orientation coefficient is less than 0.001, properties of the cyclic olefin copolymer are not fully exhibited, the orientation state is not sufficient, and improvement of the intensity or elastic modulus due to toughness, tensile and bending by orientation of the molecular chain is not attempted.

Incidentally, regardless of the effect of cancelling the optical anisotropy due to different lengths in the orthogonal direction relative to the main chain of the polarizability ellipsoids, it is not the orientation birefringence in a state that orientation is not applied. Accordingly, even though the absolute value of the orientation birefringence is equal to or less than $5\times10^{-4}$ when the birefringence is measured in a non-orientation state, a mechanism of the cyclic olefin copolymer is not essentially expected to be reflected on the molecular design. In addition, for the cyclic olefin copolymer in such a state, the absolute value of the photoelastic constant to be measured while applying stress is not equal to or less than $7\times10^{-12}$ Pa$^{-1}$, the birefringence may not be cancelled due to stress distortion in the molded product by injection molding.

Meanwhile, the orientation coefficient may be treated as a physical property similar to other inherent physical properties such as respective kinds of the repeating structural units [A] and [B] or the repeating structural units [A], [B] and [C] of the cyclic olefin copolymer, combination, copolymerization ratio, random copolymerizability, tacticity such as isotactic or syndiotactic of the polymer chain, glass transition temperature or the like. This coefficient is affected by hydrogen bonding of the polymer molecular chain, intermolecular electronic repulsion, intermolecular interaction of repulsion or the like, or molecular space such as a molecular volume size of the repeating structural unit, the molecular chain density or the like, and is the physical property value inherent in the polymer to be physically determined by the degree of stress such as external stretching or the like.

Furthermore, this coefficient determined from the dichroic ratio according to Raman spectroscopy is not a method involving totally transmitting and analyzing light beam such as infrared spectroscopy, so that the Raman scattering intensity is not affected by the thickness of the sample. Accordingly, this coefficient can be measured as the orientation coefficient of a thick molded product by injection molding or the like as well as that of a thin material such as a film.

A relationship between the difference ($\Delta n=n_\parallel - n_\perp$) in the refractive index $n_\parallel$ derived from the polarized component parallel to the main chain axis (orientation axis) of the polymer and the refractive index $n_\perp$ derived from the perpendicular polarized component, that is, the absolute value of the orientation birefringence, and the orientation function in Equation (6) is expressed in the following equation.

[Equation 8]

$$\Delta n = \Delta n_0 \langle P_2(\cos\theta)\rangle \quad (8)$$
$$= \Delta n_0[(D-1)(2\cot^2\alpha+2)/(D+2)(2\cot^2\alpha-1)]$$

Herein, $\Delta n_0$ is the orientation birefringence value in an ideal state in which a bonding chain (a main chain) is stretched and fully oriented, and is called the inherent birefringence value. Since the inherent birefringence value is $\Delta n$ value under ideal orientation conditions to the last, when $\Delta n$ value of a substantial polymer material is expressed in $\Delta n$ (real), a relationship of 0<absolute value |$\Delta n$(real)|<absolute value |inherent birefringence value $\Delta n_0$| is formed. For example, the inherent birefringence value $\Delta n_0$ is −0.0043 for polymethyl methacrylate, −0.100 for polystyrene, and +0.044 for polyethylene, which are physical property values inherent in the polymer. On the other hand, the absolute value of $\Delta n$ (real) in an ideal orientation state, that is, $\Delta n_0$, or $\Delta n$ (real)=0 value in a fully non-orientation state is also hardly realized in an actual measurement. However, it may be determined from the relationship in Equation (8) as the physical property value inherent in the polymer.

In the present invention, in the optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, the ratio of the amount of a change in the absolute value of the orientation birefringence $\Delta OB$ to the amount of a change in the absolute value of the orientation coefficient $\Delta F$ determined from the Raman scattering intensity with the orientation birefringence $\Delta n$ value of 0 in a fully non-orientation state, that is, the absolute value of the ratio $\Delta OB/\Delta F$, represents the physical property value inherent in the polymer determining inherent birefringence $\Delta n_0$ from Equation (8). This value may be the absolute value of inherent birefringence from Equation (7) if the angle $\alpha=90°$ between the polarization moment vector and the molecular chain axis of the carbon-carbon bond of the main chain axis of the polymer becomes an ideal state.

Meanwhile, in the present invention, also in the optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, the absolute value of the orientation coefficient $\Delta OB/\Delta F$ determined from the Raman scattering intensity with the orientation birefringence $\Delta n$ value of 0 in a fully non-orientation state represents the physical property value inherent in the polymer determining inherent birefringence $\Delta n_0$ from Equation (8) This value may be the absolute value of inherent birefringence from Equation (7) if the angle $\alpha=90°$ between the polarization moment vector and the molecular chain axis of the carbon-carbon bond of the main chain axis of the polymer becomes an ideal state.

That is, more particularly, Equation (8) becomes the following equation with respect to respective orientation coefficients (F1, F2, F3 . . . ) and orientation birefringences ($\Delta n1$, $\Delta n2$, $\Delta n3$ . . . ).

[Equation 9]

$$\Delta n = \Delta n_0 F[(2\cot^2\alpha + 2)/(2\cot^2\alpha - 1)] \quad (9)$$
$$= \Delta n_0 f(\alpha) F$$

Provided that $f(\alpha) = (2\cot^2\alpha + 2)/(\cot^2\alpha - 1)$
$\Delta n_1 = \Delta n_0 f(\alpha) F_1$
$\Delta n_2 = \Delta n_0 f(\alpha) F_2$
$\Delta n_3 = \Delta n_0 f(\alpha) F_3$
$\vdots$ Furthermore, the amount of a change in the absolute value of the orientation coefficient $\Delta F$ and the amount of a change in the absolute value of the orientation birefringence $\Delta OB$ are represented by derivatives as shown in the following.

$$\Delta OB = \delta \Delta n_i, \Delta F = \delta F_i \quad \text{[Equation 10]}$$

Accordingly, Equation (8) is expressed in the following Equation (9).
[Equation 11]

$$\Delta OB/\Delta F = |\Delta n_0 f(\alpha)| \quad (9)$$

Accordingly, the absolute value of the ratio $\Delta OB/\Delta F$ may represent the physical property value inherent in the polymer.

Furthermore, when the angle between the polarization moment vector and the molecular chain axis of the carbon-carbon bond of the main chain axis of the polymer is $\alpha=90°$, $f(\alpha)=-2$ is substituted into Equation (9).
[Equation 12]

$$\Delta n_0 = 0.5 (\Delta OB/\Delta F) \quad (10)$$

Then, the absolute value of inherent birefringence may be determined from Equation (10).

Accordingly, the absolute value of the ratio $\Delta OB/\Delta F$ of the optical material of the present invention represents the physical property value inherent in the polymer itself, and its value is usually from 0.001 to 0.250, preferably from 0.003 to 0.220, further preferably from 0.005 to 0.200, and particularly preferably from 0.008 to 0.200. When this value exceeds 0.250, there is not obtained an optical material in which the absolute value of the orientation coefficient is equal to or more than 0.001 and the absolute value of the orientation birefringence is equal to or less than $5\times10^{-4}$ in a stretched film in some cases.

The optical film according to the present invention may improve the film intensity by stretching a film consisting of an optical material, and the absolute value of the orientation birefringence of the film is usually equal to or less than $5\times10^{-4}$, preferably equal to or less than $3\times10^{-4}$, and further preferably equal to or less than $1\times10^{-4}$. The orientation birefringence is calculated from the phase difference (nm) at a wavelength of 633 nm/film thickness (μm).

When both of the absolute value of the orientation coefficient and the absolute value of the orientation birefringence are within the above range, there can be obtained an optical film in which the birefringence is suppressed even though the polymer chain itself is oriented, transparency is high and the intensity or elastic modulus is excellent due to toughness, tensile and bending without the limitations of temperature and pressure conditions at the time of molding.

The optical film having such properties can be used as a display member for use in an electronic device material of an anti-reflective filter, a recording medium, a display material, an organic EL or liquid crystal display member, or the like. When the optical film is, for example, used as a liquid crystal display member, "bleeding of light (irregularity)" caused by the orientation birefringence may be prevented by characteristics of very low birefringence, and the optical film is used for a polarizer protective film consisting of the optical film and a polarizing plate consisting of the polarizer protective film. Since a polarizing plate using this film is excellent in angle dependence of the phase difference (viewing angle characteristics), the optical film can be used for a liquid crystal display with an increased size or the like.

Furthermore, a film thickness of the stretched film may be selected depending on the purposes, and it is usually in the range of 10 to 500 μm, preferably in the range of 20 to 300 μm and more preferably in the range of 30 to 100 μm. Furthermore, a film thickness of a raw sheet film before stretching may be set to a film thickness in consideration of the effect by stretching. When it is used as a polarizer protective film, it may be laminated to a polarizing film obtained by immersing iodine or an organic dye in stretched polyvinyl alcohol to give a polarizing plate.

In the present invention, for an optical lens consisting of an optical material in which the absolute value of the photoelastic constant is equal to or less than $7\times10^{-12}$ Pa$^{-1}$, it is possible to cancel the birefringence due to stress distortion in the molded product induced by performing mold-melting molding such as injection molding or extrusion molding, and the absolute value of the photoelastic constant is usually equal to or less than $7\times10^{-12}$ Pa$^{-1}$, preferably equal to or less than $5\times10^{-12}$ Pa$^{-1}$ and further preferably equal to or less than $1\times10^{-12}$ Pa$^{-1}$.

The photoelastic constant is a constant calculated by measuring the phase difference while continuously applying a force such as stretching, compression or the like in the elastic deformation region to a molded product such as a film, a lens or the like, and is expressed in the amount of a change in the phase difference per unit force. For example, in the case of a film, a tensile force of maximum 2N is applied at a rate of 0.1 mm/min to measure the phase difference at a wavelength of 633 nm, whereby the photoelastic constant may be obtained from the following Equation (12).

Equation: Photoelastic constant (Pa$^{-1}$)=$\Delta$Re(nm)/$\Delta$P (N)×film width (mm)  (12)

($\Delta$Re: amount of a change in the phase difference, $\Delta$P: amount of a change in the tensile force in the range in which the phase difference linearly increases with the application of the stress)

Because of the photoelastic constant of very low birefringence, the optical film can be used for an optical lens consisting of an optical material such as a micro lens for a digital camera module, a pick-up lens, an imaging lens, an optical element (such as a micro lens array, an optical waveguide, an optical switching, a Fresnel zone plate, a binary optical element and a blaze diffractive optical element) and the like. For example, when a conventional acrylic resin is used as an optical lens, in a high heat resistant resin, birefringence is high and humidity characteristics are inferior, while in a moisture resistant resin, heat resistance is inferior. In the case of a non-acrylic resin, high heat resistance and low water absorption are achieved, but the birefringence is very high and the productivity is bad, so that there is a problem of high cost. As product qualities required for an optical material or an optical lens, there are excellent transparency, low birefringence, optical properties that are not changed under the use environment and excellent molding properties. As the birefringence, there are orientation birefringence and stress birefringence as described before. In the production of an optical material by molding a thermoplastic polymer material, a thermoplastic resin is subjected to injection molding or extrusion molding while heating and melting it at equal to or more than the glass transition temperature. In these methods, the resulting material is cooled down to equal to or less than the glass transition temperature with a desired shape. The orientation birefringence is produced by orientation of the polymer chain when heated and melted to flow, while the stress birefringence is caused by distortion or the like during cooling. The photoelastic constant is a constant representing the latter stress birefringence. With the use of the cyclic olefin copolymer of the present invention, high heat resistance and low water absorption are achieved, the photoelastic constant is small, the birefringence is very low, the productivity is excellent, and low cost is achieved. The stress birefringence or orientation birefringence generated during molding of a thick molded product such as an optical lens having a thickness of equal to or more than 0.5 mm, particularly a product having a maximum length of equal to or more than 10 mm, may be inhibited.

For the cyclic olefin copolymer of the present invention, the weight average molecular weight (Mw) in terms of polystyrene measured by the gel permeation chromatography (GPC) at a sample concentration of 3.0 to 9.0 mg/ml is usually from 5,000 to 1,000,000 and preferably from 10,000 to 300,000. When the weight average molecular weight (Mw) is equal to or more than 5,000, orientation properties by stretching can be exhibited. On the other hand, when it is equal to or less than 1,000,000, the flowability capable of melt molding and melt stretching may be achieved. Meanwhile, the ratio of the weight average molecular weight (Mw) to the number average molecular weight (Mn), that is, the molecular weight distribution (Mw/Mn), is usually in the range of 1.0 to 5.0.

For example, in order to achieve heat molding properties, the molecular weight distribution is preferably broad, and it is from 1.9 to 5.0 and further preferably from 1.9 to 4.0.

In the present invention, the glass transition temperature of the cyclic olefin copolymer is a maximum value of a loss elastic modulus/storage elastic modulus (=tan δ) in which a dynamical change is measured while increasing or decreasing a temperature of a sample to a fixed value, and there is, for example, a point of change in which heat absorption or heat generation is measured by the differential scanning calorimetry or the like. The glass transition temperature is usually in the range of 50 to 300 degrees centigrade, preferably from 80 to 280 degrees centigrade and further preferably from 100 to 250 degrees centigrade. When the glass transition temperature is equal to or less than 50 degrees centigrade, heat resistance of an optical film or a molded product of an optical material is low, so that it is difficult to maintain its shape under the intended use environment. On the other hand, when it is equal to or more than 300 degrees centigrade, a heat treatment temperature for melt flowing is high, and yellowing or deterioration easily takes place.

In the present invention, a polar cyclic olefin copolymer containing fluorine or cyano having an aliphatic five membered ring structure and an aliphatic polycyclic ring structure in the main chain at a specific copolymerization ratio is an amorphous transparent polymer. Its characteristics are not depending on the hydrogen bonding formed between the molecules or among the molecule of the polymer having a hydrocarbon structure in the main chain of the repeating structural unit, and having a substituent selected from fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms and cyano-containing aryloxycarbonylalkyl having 8 to 20 carbon atoms for at least one of the aforementioned $R^1$ to $R^4$ and at least one of the aforementioned $R^7$ to $R^{10}$ in a side chain, but are not based on the crystallinity or the crosslinking caused by chemical bonding. Heat resistance of equal to or more than 100 degrees centigrade at the glass transition temperature may be imparted.

$R^{13}$ to $R^{16}$ of the repeating structural unit [C] represented by the general formula (3) are substituents different from those of $R^1$ to $R^4$ of the repeating structural unit [A] represented by the general formula (1) and $R^7$ to $R^{10}$ of the repeating structural unit [B] represented by the general formula (2), whereby formation of the hydrogen bonding between the molecules or within the molecule of the cyclic olefin copolymer of the present invention may be suppressed to a low level. By the use of the cyclic olefin copolymer containing the repeating structural unit [C], heat resistance of equal to or more than 100 degrees centigrade at the glass transition temperature may be imparted and melt flowability may be effectively improved. That is, the melt molding temperature is thus lowered, and yellowing or deterioration during film processing or injection molding processing is prevented.

In general, an amorphous thermoplastic polymer has a rapidly decreased elastic modulus in the region of temperature which is equal to or more than the glass transition temperature when such hydrogen bonding or chemical crosslinking is not present. Thus, the variation in the storage elastic modulus or the loss elastic modulus with respect to the change in temperature may be shown at least equal to or less than −10 MPa/degrees centigrade. On the other hand, the polar cyclic olefin copolymer containing fluorine or cyano of the present invention is derived from the interaction of the physical hydrogen bonding that is reversible with respect to the change in temperature, the variation at equal to or more than the glass transition temperature is small, and the change in shape of a molded product or a film due to heat is suppressed to a low level.

In the present invention, the fluorine-containing cyclic olefin copolymer is excellent in water-repellent property, low water absorption, water vapor permeability and oxygen permeability as characteristics of a fluorine atom, further exhibits light permeability exceeding 90% in a wide range of light wavelength from ultraviolet rays to near infrared rays, and has excellent transparency. On the other hand, the cyano-containing cyclic olefin copolymer exhibits strong adhesion to a substrate of glass, plastic, stainless or the like, and has heat resistance of a cyano-containing group. Furthermore, it exhibits light permeability exceeding 85% in a wide range of light wavelength from visible rays to near infrared rays, and has excellent transparency. Meanwhile, in the case of fluorine, the dipole moment becomes great by the electron withdrawing effect, so that these substituents are polarized. In the case of cyano, the dipole moment becomes great due to the triple bond by n electrons between carbon and nitrogen, so that these substituents are polarized. These substituents have the effect of increasing the polarizability difference within the molecule by placement at the end portion of the ring structure in the side chain forming a vertical axis with the main chain. Namely, because of the substituent effect as well as the ring structure of the cyclic olefin copolymer, the polarizability difference becomes great, the major axis of the polarizability ellipsoid of the repeating structural unit becomes long, and the cancellation effect of optical anisotropy due to different lengths in the orthogonal direction with respect to the main chain of polarizability ellipsoids of the repeating structural unit [A] represented by the general formula (1) and the repeating structural unit [B] represented by the general formula (2) may be effectively exhibited. Thus, an optical material with low orientation birefringence or small photoelastic constant, that is, a polar cyclic olefin copolymer, is obtained. The molar ratio of the repeating structural units [A] to [B] exhibiting these characteristics is in the range of 95/5 to 1/99, preferably in the range of 80/20 to 1/99 and further preferably in the range of 60/40 to 1/99.

Meanwhile, the cyclic olefin copolymer containing a repeating structural unit [A] represented by the general formula (1) and a repeating structural unit [B] represented by the general formula (2), and containing a repeating structural unit [C] represented by the general formula (3) needs to be contained to the extent that a big polarizability difference in repeating structural units [A] and [B] due to the substituent effect is maintained, and exhibition of cancellation effect of optical anisotropy is not hindered due to different lengths in the orthogonal direction with respect to the main chain of the polarizability ellipsoids. In particular, the molar ratio of the repeating structural units [A] to [B] is from 95/5 to 1/99. In the cyclic olefin copolymer containing the repeating structural unit [C], in order to decrease the photoelastic constant, the molar ratio of [C] to ([A]+[B]) is in the range of 1/99 to 40/60, preferably in the range of 1/99 to 30/70 and further preferably in the range of 1/99 to 20/80. When the ratios are out of these ranges, there is not obtained an optical material in which the effect of cancelling the optical anisotropy is very low, and the orientation birefringence or stress birefringence is very low in some cases.

In the present invention, the cyclic olefin copolymer containing a repeating structural unit [A] represented by the general formula (1) and a repeating structural unit [B] represented by the general formula (2) can be synthesized by copolymerizing a cyclic olefin monomer represented by the general formula (4) with a cyclic olefin monomer represented by the general formula (5) using a ring-opening metathesis polymerization catalyst, and subjecting the olefin moiety of the main chain of the resulting polymer to a hydrogenation reaction.

The cyclic olefin monomer represented by The general formula (4) is expressed in the following formula,

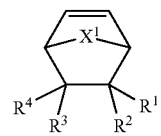

(4)

wherein, in the formula (4), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —NR$^5$—, —PR$^5$— and —CR$^5$R$^6$— (R$^5$ and R$^6$ each independently represent hydrogen or alkyl having 1 to 20 carbon atoms).

More specifically, examples of $R^1$ to $R^4$ in the general formula (4) include fluorine; fluorine-containing alkyl having 1 to 10 carbon atoms such as alkyl obtained by substituting a part or all of the hydrogen atoms with fluorine such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl or the like; fluorine-containing alkoxy having 1 to 10 carbon atoms such as alkoxy obtained by substituting a part or all of the hydrogen atoms with fluorine such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentyloxy, perfluorocyclopentyloxy or the like; fluorine-containing alkoxyalkyl having 2 to 10 carbon atoms such as alkoxyalkyl obtained by substituting a part or all of the hydrogen atoms with fluorine such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentyloxymethyl, perfluorocyclopentyloxymethyl or the like; fluorine-containing aryl having 6 to 20 carbon atoms such as aryl obtained by substituting a part or all of the hydrogen atoms with fluorine such as perfluorophenyl, trifluorophenyl or the like; fluorine-containing alkoxycarbonyl having 2 to 10 carbon atoms such as alkoxycarbonyl obtained by substituting a part or all of the hydrogen atoms with fluorine such as fluoromethoxycarbonyl, difluoromethoxycarbonyl, trifluoromethoxycarbonyl, trifluoroethoxycarbonyl, pentafluoroethoxycarbonyl, heptafluoropropoxycarbonyl, hexafluoroisopropoxycarbonyl, heptafluoroisopropoxycarbonyl, hexafluoro-2-methylisopropoxycarbonyl, perfluoro-2-methylisopropoxycarbonyl, n-perfluorobutoxycarbonyl, n-perfluoropentyloxycarbonyl, perfluorocyclopentyloxycarbonyl or the like; fluorine-containing aryloxycarbonyl having 7 to 20 carbon atoms such as aryloxycarbonyl obtained by substituting a part or all of the hydrogen atoms with fluorine such as perfluorophenyloxycarbonyl, trifluorophenyloxycarbonyl or the like; fluorine-containing alkoxycarbonylalkyl having 3 to 10 carbon atoms such as alkoxycarbonylalkyl obtained by substituting a part or all of the hydrogen atoms with fluorine such as fluoromethoxycarbonylmethyl, difluoromethoxycarbonylmethyl, trifluoromethoxycarbonylmethyl, trifluoroethoxycarbonylmethyl, pentafluoroethoxycarbonylmethyl, heptafluoropropoxycarbonylmethyl, hexafluoroisopropoxycarbonylmethyl, heptafluoroisopropoxycarbonylmethyl, hexafluoro-2-methylisopropoxycarbonylmethyl, perfluoro-2-methylisopropoxycarbonylmethyl, n-perfluorobutoxycarbonylmethyl, n-perfluoropentyloxycarbonylmethyl, perfluorocyclopentyloxymethyl or the like; and fluorine-containing aryloxycarbonylalkyl having 7 to 20 carbon atoms such as aryloxycarbonylmethyl obtained by substituting a part or all of the hydrogen atoms with fluorine such as perfluorophenyloxycarbonylmethyl, trifluorophenyloxycarbonylmethyl or the like.

Further examples include cyano; cyano-containing alkyl having 2 to 10 carbon atoms such as cyanomethyl, cyanoethyl, 1-cyanopropyl, 1-cyanobutyl, 1-cyanohexyl or the like; cyano-containing alkoxy having 2 to 10 carbon atoms such as alkoxy obtained by substituting a part of the hydrogen atoms with cyano such as cyanoethoxy, 1-cyanopropoxy, 1-cyanobutoxy, 1-cyanopentyloxy or the like; cyano-containing alkoxyalkyl having 3 to 10 carbon atoms such as alkoxyalkyl obtained by substituting a part of the hydrogen atoms with cyano such as cyanoethoxymethyl, 1-cyanopropoxymethyl, 1-cyanobutoxymethyl, 1-cyanopentyloxymethyl or the like; cyano-containing aryl having 7 to 20 carbon atoms such as aryl obtained by substituting a part of the hydrogen atoms with cyano such as 4-cyanophenyl, 3,5-dicyanophenyl or the like; cyano-containing alkoxycarbonyl having 3 to 10 carbon atoms such as alkoxycarbonyl obtained by substituting a part of the hydrogen atoms with cyano such as cyanoethoxycarbonyl, 1-cyanopropoxycarbonyl, 1-cyanobutoxycarbonyl, 1-cyanopentyloxycarbonyl or the like; cyano-containing aryloxycarbonyl having 8 to 20 carbon atoms such as aryloxycarbonyl obtained by substituting a part of the hydrogen atoms with cyano such as 4-cyanophenyloxycarbonyl, 3,5-dicyanophenyloxycarbonyl or the like; cyano-containing alkoxycarbonylalkyl having 4 to 10 carbon atoms such as alkoxycarbonylalkyl obtained by substituting a part of the hydrogen atoms with cyano such as cyanoethoxycarbonylmethyl, 1-cyanopropoxycarbonylmethyl, 1-cyanobutoxycarbonylmethyl, 1-cyanopentyloxycarbonylmethyl or the like; and cyano-containing aryloxycarbonylalkyl having 8 to carbon atoms such as aryloxycarbonylalkyl obtained by substituting a part of the hydrogen atoms with cyano such as 4-cyanophenyloxycarbonylmethyl, 3,5-dicyanophenylxoycarbonylmethyl or the like.

Furthermore, $R^1$ to $R^4$ may be bonded to each other to form a ring structure. For example, $R^1$ to $R^4$ may form a ring such as perfluorocycloalkyl, perfluorocycloether interrupted with oxygen or the like.

Furthermore, examples of other $R^1$ to $R^4$ containing no fluorine or containing no cyano include hydrogen; alkyl having 1 to 10 carbon atoms such as methyl, ethyl, propyl, isopropyl, 2-methylisopropyl, n-butyl, n-pentyl, cyclopentyl or the like; aryl having 6 to 20 carbon atoms such as phenyl, naphthyl or the like; alkoxy having 1 to 10 carbon atoms such as methoxy, ethoxy, tert-butoxy or the like; alkoxyalkyl having 2 to 10 carbon atoms such as methoxymethyl, ethoxymethyl, tert-butoxymethyl or the like; alkoxycarbonyl having 2 to 10 carbon atoms such as methoxycarbonyl, ethoxycarbonyl, tert-butoxycarbonyl or the like; aryloxycarbonyl having 7 to 20 carbon atoms such as phenyloxycarbonyl, methylphenyloxycarbonyl or the like; alkoxycarbonylalkyl having 3 to 10 carbon atoms such as methoxycarbonylmethyl, ethoxycarbonylmethyl, tert-butoxycarbonylmethyl or the like; and aryloxycarbonylalkyl having 8 to 20 carbon atoms such as phenyloxycarbonylmethyl, methylphenyloxycarbonylmethyl or the like.

Furthermore, structural units may be composed of two or more kinds in which at least one of $R^1$ to $R^4$ in the general formula (4) is different from the others.

The cyclic olefin monomer represented by the general formula (5) is expressed in the following formula,

(5)

wherein, in the formula (5), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$— ($R^{11}$ and $R^{12}$ each independently represent hydrogen or alkyl having 1 to 20 carbon atoms), and may be identical with or different from each other; and n represents 1 to 3.

More specifically, examples of $R^7$ to $R^{10}$ in the general formula (5) include fluorine; fluorine-containing alkyl having 1 to 10 carbon atoms such as alkyl obtained by substituting a part or all of the hydrogen atoms with fluorine such as fluoromethyl, difluoromethyl, trifluoromethyl, trifluoroethyl, pentafluoroethyl, heptafluoropropyl, hexafluoroisopropyl, heptafluoroisopropyl, hexafluoro-2-methylisopropyl, perfluoro-2-methylisopropyl, n-perfluorobutyl, n-perfluoropentyl, perfluorocyclopentyl or the like; fluorine-containing alkoxy having 1 to 10 carbon atoms such as alkoxy obtained by substituting a part or all of the hydrogen atoms with fluorine such as fluoromethoxy, difluoromethoxy, trifluoromethoxy, trifluoroethoxy, pentafluoroethoxy, heptafluoropropoxy, hexafluoroisopropoxy, heptafluoroisopropoxy, hexafluoro-2-methylisopropoxy, perfluoro-2-methylisopropoxy, n-perfluorobutoxy, n-perfluoropentyloxy, perfluorocyclopentyloxy or the like; fluorine-containing alkoxyalkyl having 2 to 10 carbon atoms such as alkoxyalkyl obtained by substituting a part or all of the hydrogen atoms with fluorine such as fluoromethoxymethyl, difluoromethoxymethyl, trifluoromethoxymethyl, trifluoroethoxymethyl, pentafluoroethoxymethyl, heptafluoropropoxymethyl, hexafluoroisopropoxymethyl, heptafluoroisopropoxymethyl, hexafluoro-2-methylisopropoxymethyl, perfluoro-2-methylisopropoxymethyl, n-perfluorobutoxymethyl, n-perfluoropentyloxymethyl, perfluorocyclopentyloxymethyl or the like; fluorine-containing aryl having 6 to 20 carbon atoms such as aryl obtained by substituting a part or all of the hydrogen atoms with fluorine such as perfluorophenyl, trifluorophenyl or the like; fluorine-containing alkoxycarbonyl having 2 to 10 carbon atoms such as alkoxycarbonyl obtained by substituting a part or all of the hydrogen atoms with fluorine such as fluoromethoxycarbonyl, difluoromethoxycarbonyl, trifluoromethoxycarbonyl, trifluoroethoxycarbonyl, pentafluoroethoxycarbonyl, heptafluoropropoxycarbonyl, hexafluoroisopropoxycarbonyl, heptafluoroisopropoxycarbonyl, hexafluoro-2-methylisopropoxycarbonyl, perfluoro-2-methylisopropoxycarbonyl, n-perfluorobutoxycarbonyl, n-perfluoropentyloxycarbonyl, perfluorocyclopentyloxycarbonyl or the like; fluorine-containing aryloxycarbonyl having 7 to 20 carbon atoms such as aryloxycarbonyl obtained by substituting a part or all of the hydrogen atoms with fluorine such as perfluorophenyloxycarbonyl, trifluorophenyloxycarbonyl or the like; fluorine-containing alkoxycarbonylalkyl having 3 to 10 carbon atoms such as alkoxycarbonylalkyl obtained by substituting a part or all of the hydrogen atoms with fluorine such as fluoromethoxycarbonylmethyl, difluoromethoxycarbonylmethyl, trifluoromethoxycarbonylmethyl, trifluoroethoxycarbonylmethyl, pentafluoroethoxycarbonylmethyl, heptafluoropropoxycarbonylmethyl, hexafluoroisopropoxycarbonylmethyl, heptafluoroisopropoxycarbonylmethyl, hexafluoro-2-methylisopropoxycarbonylmethyl, perfluoro-2-methylisopropoxycarbonylmethyl, n-perfluorobutoxycarbonylmethyl, n-perfluoropentyloxycarbonylmethyl, perfluorocyclopentyloxymethyl or the like; and fluorine-containing aryloxycarbonylalkyl having 7 to 20 carbon atoms such as aryloxycarbonylmethyl obtained by substituting a part or all of the hydrogen atoms with fluorine such as perfluorophenyloxycarbonylmethyl, trifluorophenyloxycarbonylmethyl or the like.

Further examples include cyano; cyano-containing alkyl having 2 to 10 carbon atoms such as cyanomethyl, cyanoethyl, 1-cyanopropyl, 1-cyanobutyl, 1-cyanohexyl or the like; cyano-containing alkoxy having 2 to 10 carbon atoms such as alkoxy obtained by substituting a part of the hydrogen atoms with cyano such as cyanoethoxy, 1-cyanopropoxy, 1-cyanobutoxy, 1-cyanopentyloxy or the like; cyano-containing alkoxyalkyl having 3 to 10 carbon atoms such as alkoxyalkyl obtained by substituting a part of the hydrogen atoms with cyano such as cyanoethoxymethyl, 1-cyanopropoxymethyl, 1-cyanobutoxymethyl, 1-cyanopentyloxymethyl or the like; cyano-containing aryl having 7 to 20 carbon atoms such as aryl obtained by substituting a part of the hydrogen atoms with cyano such as 4-cyanophenyl, 3,5-dicyanophenyl or the like; cyano-containing alkoxycarbonyl having 3 to 10 carbon atoms such as alkoxycarbonyl obtained by substituting a part of the hydrogen atoms with cyano such as cyanoethoxycarbonyl, 1-cyanopropoxycarbonyl, 1-cyanobutoxycarbonyl, 1-cyanopentyloxycarbonyl or the like; cyano-containing aryloxycarbonyl having 8 to 20 carbon atoms such as aryloxycarbonyl obtained by substituting a part of the hydrogen atoms with cyano such as 4-cyanophenyloxycarbonyl, 3,5-dicyanophenyloxycarbonyl or the like; cyano-containing alkoxycarbonylalkyl having 4 to 10 carbon atoms such as alkoxycarbonylalkyl obtained by substituting a part of the hydrogen atoms with cyano such as cyanoethoxycarbonylmethyl, 1-cyanopropoxycarbonylmethyl, 1-cyanobutoxycarbonylmethyl, 1-cyanopentyloxycarbonylmethyl or the like; and cyano-containing aryloxycarbonylalkyl having 8 to 20 carbon atoms such as aryloxycarbonylalkyl obtained by substituting a part of the hydrogen atoms with cyano such as 4-cyanophenyloxycarbonylmethyl, 3,5-dicyanophenyloxycarbonylmethyl or the like.

Furthermore, $R^7$ to $R^{10}$ may be bonded to each other to form a ring structure. For example, $R^7$ to $R^{10}$ may form a ring such as perfluorocycloalkyl, perfluorocycloether interrupted with oxygen or the like.

Furthermore, examples of other $R^7$ to $R^{10}$ containing no fluorine or containing no cyano include hydrogen; alkyl having 1 to 10 carbon atoms such as methyl, ethyl, propyl, isopropyl, 2-methylisopropyl, n-butyl, n-pentyl, cyclopentyl or the like; aryl having 6 to 20 carbon atoms such as phenyl, naphthyl or the like; alkoxy having 1 to 10 carbon atoms such as methoxy, ethoxy, tert-butoxy or the like; alkoxyalkyl having 2 to 10 carbon atoms such as methoxymethyl, ethoxymethyl, tert-butoxymethyl or the like; alkoxycarbonyl having 2 to 10 carbon atoms such as methoxycarbonyl, ethoxycarbonyl, tert-butoxycarbonyl or the like; aryloxycarbonyl having 7 to 20 carbon atoms such as phenyloxycarbonyl, methylphenyloxycarbonyl or the like; alkoxycarbonylalkyl having 3 to 10 carbon atoms such as methoxycarbonylmethyl, ethoxycarbonylmethyl, tert-butoxycarbonylmethyl or the like; and aryloxycarbonylalkyl having 8 to 20 carbon atoms such as phenyloxycarbonylmethyl, methylphenyloxycarbonylmethyl or the like.

Furthermore, structural units may be composed of two or more kinds in which at least one of $R^7$ to $R^{10}$ in the general formula (5) is different from the others.

In the present invention, the cyclic olefin copolymer containing a repeating structural unit [A] represented by the general formula (1), a repeating structural unit [B] represented by the general formula (2) and a repeating structural unit [C] represented by the general formula (3) can be synthesized by copolymerizing a cyclic olefin monomer represented by the general formula (6) with a cyclic olefin monomers represented by the general formulae (4) and (5), and subjecting the olefin moiety of the main chain of the resulting polymer to a hydrogenation reaction.

The cyclic olefin monomer represented by the general formula (6) is expressed in the following formula,

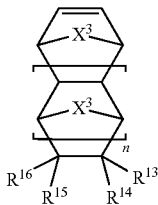

(6)

wherein, in the formula (6), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^{13}$ to $R^{16}$ may be bonded to each other to form a ring structure; $X^3$ is selected from —O—, —S—, —NR$^{17}$—, —PR$^{18}$— and —CR$^{17}$R$^{18}$— ($R^{17}$ and $R^{18}$ each independently represent hydrogen or alkyl having 1 to 20 carbon atoms), and may be identical with or different from each other; and n represents 0 or 1.

More specifically, $R^{13}$ to $R^{16}$ in the general formula (6) include hydrogen; alkyl having 1 to 10 carbon atoms such as methyl, ethyl, propyl, isopropyl, 2-methylisopropyl, n-butyl, n-pentyl, cyclopentyl, hexyl, cyclohexyl, heptyl, octyl or the like; aryl having 6 to 20 carbon atoms such as phenyl, naphthyl, indenyl, biphenyl, anthracenyl, phenanthracenyl, triphenylenyl or the like; alkoxy having 1 to 10 carbon atoms such as methoxy, ethoxy, propoxy, butoxy, tert-butoxy, pentyloxy, cyclopentyloxy, hexyloxy, cyclohexyloxy or the like; alkoxyalkyl having 2 to 10 carbon atoms such as methoxymethyl, ethoxymethyl, propoxymethyl, butoxymethyl, tert-butoxymethyl, pentyloxymethyl, cyclopentyloxymethyl, hexyloxymethyl, cyclohexyloxymethyl, methoxyethyl, ethoxyethyl, propoxyethyl, butoxyethyl, pentyloxyethyl, cyclopentyloxyethyl, hexyloxyethyl, cyclohexyloxyethyl, methoxypropyl, ethoxypropyl, propoxypropyl, butoxypropyl, pentyloxypropyl, cyclopentyloxypropyl, hexyloxypropyl, cyclohexyloxypropyl or the like; alkoxycarbonyl having 2 to 10 carbon atoms such as methoxycarbonyl, ethoxycarbonyl, tert-butoxycarbonyl, pentyloxycarbonyl, cyclopentyloxycarbonyl, hexyloxycarbonyl, cyclohexyloxycarbonyl or the like; alkoxycarbonylalkyl having 3 to 10 carbon atoms such as methoxycarbonylmethyl, ethoxycarbonylmethyl, tert-butoxycarbonylmethyl, pentyloxycarbonylmethyl, cyclopentyloxycarbonylmethyl, hexyloxycarbonylmethyl, cyclohexyloxycarbonylmethyl or the like; and alkoxyalkyloxycarbonyl having 3 to 10 carbon atoms such as methoxymethyloxycarbonyl, ethoxymethyloxycarbonyl, propoxymethyloxycarbonyl, butoxymethyloxycarbonyl, tert-butoxymethyloxycarbonyl, pentyloxymethyloxycarbonyl, cyclopentyloxymethyloxycarbonyl, hexyloxymethyloxycarbonyl, cyclohexyloxymethyloxycarbonyl or the like.

Furthermore, structural units may be composed of two or more kinds in which at least one of $R^{13}$ to $R^{16}$ in the general formula (6) is different from the others.

Meanwhile, a monomer other than the cyclic olefin monomers represented by the general formulae (4), (5) and (6) may be contained, to the extent that the effect of the present invention is not impaired.

The ring-opening metathesis polymerization catalyst used for polymerization of the cyclic olefin monomer is not limited as long as it is a catalyst capable of carrying out ring-opening metathesis polymerization, and examples thereof include tungsten-based alkylidene catalysts such as $W(N-2,6-Pr^i{}_2C_6H_3)(CHBu^t)(OBu^t)_2$, $W(N-2,6-Pr^i{}_2C_6H_3)(CHBu^t)(OCMe_2CF_3)_2$, $W(N-2,6-Pr^i{}_2C_6H_3)(CHBu^t)(OCMe(CF_3)_2)_2$, $W(N-2,6-Pr^i{}_2C_6H_3)(CHBu^t)(OC(CF_3)_3)_2$, $W(N-2,6-Me_2C_6H_3)(CHBu^t)(OC(CF_3)_3)_2$, $W(N-2,6-Pr^i{}_2C_6H_3)(CHCMe_2Ph)(OBu^t)_2$, $W(N-2,6-Pr^i{}_2C_6H_3)(CHCMe_2Ph)(OCMe_2CF_3)_2$, $W(N-2,6-Pr^i{}_2C_6H_3)(CHCMe_2Ph)(OCMe(CF_3)_2)_2$, $W(N-2,6-Pr^i{}_2C_6H_3)(CHCMe_2Ph)(OC(CF_3)_3)_2$, $W(N-2,6-Me_2C_6H_3)(CHCMe_2Ph)(OC(CF_3)_3)_2$, or $W(N-2,6-Me_2C_6H_3)(CHCHCMePh)$ $OBut)_2(PR_3)$, $W(N-2,6-Me_2C_6H_3)(CHCHCMe_2)(OBu^t)_2(PR_3)$, $W(N-2,6-Me_2C_6H_3)(CHCHCPh_2)(OBu^t)_2(PR_3)$, $W(N-2,6-Me_2C_6H_3)(CHCHCMePh)(OCMe_2CF_3)_2(PR_3)$, $W(N-2,6-Me_2C_6H_3)(CHCHCMe_2)(OCMe_2CF_3)_2(PR_3)$, $W(N-2,6-Me_2C_6H_3)(CHCHCPh_2)(OCMe_2CF_3)_2(PR_3)$, $W(N-2,6-Me_2C_6H_3)(CHCHCMePh)(OCMe(CF_3)_2)_2(PR_3)$, $W(N-2,6-Me_2C_6H_3)(CHCHCMe_2)(OCMe(CF_3)_2)_2(PR_3)$, $W(N-2,6-Me_2C_6H_3)(CHCHCPh_2)(OCMe(CF_3)_2)_2(PR_3)$, $W(N-2,6-Me_2C_6H_3)(CHCHCMePh)(OC(CF_3)_3)_2(PR_3)$, $W(N-2,6-Me_2C_6H_3)(CHCHCMe_2)(OC(CF_3)_3)_2(PR_3)$, $W(N-2,6-Me_2C_6H_3)(CHCHCPh_2)(OC(CF_3)_3)_2(PR_3)$, $W(N-2,6-Pr^i{}_2C_6H_3)(CHCHCMePh)(OCMe_2CF_3)_2(PR_3)$, $W(N-2,6-Pr^i{}_2C_6H_3)(CHCHCMePh)(OCMe(CF_3)_2)_2(PR_3)$, $W(N-2,6-Pr^i{}_2C_6H_3)(CHCHCMePh)(OC(CF_3)_3)_2$ $(PR_3)$, $W(N-2,6-Pr^i{}_2C_6H_3)(CHCHCMePh)(OPh)_2(PR_3)$, or $W(N-2,6-Me_2C_6H_3)(CHCHCMePh)(OBu^t)_2(Py)$, $W(N-2,6-Me_2C_6H_3)(CHCHCMe_2)(OBu^t)_2(Py)$, $W(N-2,6-Me_2C_6H_3)(CHCHCPh_2)(OBu^t)_2$ $(PY)$, $W(N-2,6-Me_2C_6H_3)(CHCHCMePh)(OCMe_2CF_3)_2$ $(Py)$, $W(N-2,6-Me_2C_6H_3)(CHCHCMe_2)(OCMe_2CF_3)_2(Py)$, $W(N-2,6-Me_2C_6H_3)(CHCHCPh_2)(OCMe_2CF_3)_2(Py)$, $W(N-2,6-Me_2C_6H_3)(CHCHCMePh)(OCMe_2CF_3)_2(PY)$, $W(N-2,6-Me_2C_6H_3)(CHCHCMe_2)(OCMe(CF_3)_2)_2(Py)$, $W(N-2,6-Me_2C_6H_3)(CHCHCPh_2)(OCMe(CF_3)_2)_2$ $(PY)$, $W(N-2,6-Me_2C_6H_3)(CHCHCMePh)(OC(CF_3)_3)_2(Py)$, $W(N-2,6-Me_2C_6H_3)(CHCHCMe_2)(OC(CF_3)_3)_2(PY)$, $W(N-2,6-Me_2C_6H_3)(CHCHCPh_2)(OC(CF_3)_3)_2$ $(Py)$, $W(N-2,6-Pr^i{}_2C_6H_3)(CHCHCMePh)(OCMe_2CF_3)_2(Py)$, $W(N-2,6-Pr^i{}_2C_6H_3)(CHCHCMePh)(OCMe(CF_3)_2)_2(Py)$, $W(N-2,6-Pr^i{}_2C_6H_3)(CHCHCMePh)(OC(CF_3)_3)_2(Py)$, $W(N-2,6-Pr^i{}_2C_6H_3)(CHCHCMePh)(OPh)_2(Py)$ and the like; molybdenum-based alkylidene catalysts such as $Mo(N-2,6-Pr^i{}_2C_6H_3)(CHBu^t)(OBu^t)_2$, $Mo(N-2,6-Pr^i{}_2C_6H_3)(CHBu^t)(OCMe_2CF_3)_2$, $Mo(N-2,6-Pr^i{}_2C_6H_3)(CHBu^t)(OCMe(CF_3)_2)_2$, $Mo(N-2,6-Pr^i{}_2C_6H_3)(CHBu^t)(OC(CF_3)_3)_2$, $Mo(N-2,6-Me_2C_6H_3)(CHBu^t)(OC(CF_3)_3)_2$, $Mo(N-2,6-Pr^i{}_2C_6H_3)(CHCMe_2Ph)(OCMe_3)_2$, $Mo(N-2,6-Pr^i{}_2C_6H_3)(CHCMe_2Ph)(OCMe_2CF_3)_2$, $Mo(N-2,6-Pr^i{}_2C_6H_3)(CHCMe_2Ph)(OCMe(CF_3)_2)_2$, $Mo(N-2,6-Pr^i{}_2C_6H_3)(CHCMe_2Ph)(OC(CF_3)_3)_2$, $Mo(N-2,6-Me_2C_6H_3)(CHCMe_2Ph)(OC(CF_3)_3)_2$, $Mo(N-2,6-Pr^i{}_2C_6H_3)(CHCMe_2Ph)(OBu^t)_2(PR_3)$, $Mo(N-2,6-Pr^i{}_2C_6H_3)(CHCMe_2Ph)(OCMe_2CF_3)_2(PR_3)$, $Mo(N-2,6-Pr^i{}_2C_6H_3)(CHCMe_2Ph)(OCMe(CF_3)_2)_2(PR_3)$, $Mo(N-2,6-Pr^i{}_2C_6H_3)(CHCMe_2Ph)(OC(CF_3)_3)_2(PR_3)$, $Mo(N-2,6-Me_2C_6H_3)(CHCMe_2Ph)(OC(CF_3)_3)_2(PR_3)$, $Mo(N-2,6-Pr^i{}_2C_6H_3)(CHCMe_2Ph)(OBu^t)_2(PY)$, $Mo(N-2,6-Pr^i{}_2C_6H_3)(CHCMe_2Ph)(OCMe_2CF_3)_2(Py)$, $Mo(N-2,6-Pr^i{}_2C_6H_3)(CHCMe_2Ph)(OCMe(CF_3)_2)_2(Py)$, $Mo(N-2,6-Pr^i{}_2C_6H_3)$ (CHCMe$_2$Ph)(OC(CF$_3$)$_3$)$_2$(PY), Mo(N-2,6-Me$_2$C$_6$H$_3$)(CHCMe$_2$Ph)(OC(CF$_3$)$_3$)$_2$ (Py) and the like (Pr$^i$ in the above formulas represents an iso-propyl group; R represents an alkyl group such as a methyl group or an ethyl group, or an alkoxy group such as a methoxy group or an ethoxy group; Bu$^t$ represents a tert-butyl group; Me represents a methyl group; Ph represents a phenyl group; and Py is a pyridine group); and ruthenium-based alkylidene catalysts such as Ru(CHCHCPh$_2$)(PPh$_3$)$_2$Cl$_2$ and the like (Ph in the formula represents a phenyl group), which can be all preferably used. Furthermore, these ring-opening metathesis polymerization catalysts may be used singly or in combination of two or more kinds.

On the other hand, in addition to the ring-opening metathesis polymerization catalysts described above, a ring-opening metathesis polymerization catalyst formed from a combination of an organic transition metal complex, a transition metal halide or a transition metal oxide, and a Lewis acid as a co-catalyst can also be used, but these catalyst has low polymerization catalytic activity with respect to polar monomers and is not preferable from an industrial viewpoint.

In the ring-opening metathesis polymerization of the cyclic olefin monomer, the molar ratio of the cyclic olefin monomer to the ring-opening metathesis polymerization catalyst is such that in the case of a transition metal alkylidene catalyst of tungsten, molybdenum or ruthenium, the monomer is usually used in an amount of 100 moles to 30,000 moles and preferably 1,000 moles to 20,000 moles, relative to 1 mole of the transition metal alkylidene catalyst.

Furthermore, an olefin can be used as a chain transfer agent in order to control the molecular weight and the molecular weight distribution. Examples of the olefin include α-olefins such as ethylene, propylene, 1-butene, 1-pentene, 1-hexene, 1-octene and the like; and fluorine-containing olefins derived from those olefins. Further examples include silicon-containing olefins such as vinyltrimethylsilane, allyltrimethylsilane, allyltriethylsilane, allyltriisopropylsilane and the like; and fluorine- and silicon-containing olefins derived from those olefins, and examples of the dienes include non-conjugated dienes such as 1,4-pentadiene, 1,5-hexadiene, 1,6-heptadiene and the like; and fluorine-containing non-conjugated dienes derived from those dienes. These olefins, fluorine-containing olefins, dienes and fluorine-containing dienes may be used singly or in combination of two or more kinds.

The amount of the olefins, fluorine-containing olefins, dienes or fluorine-containing dienes used is such that an olefin or a diene is usually used in an amount in the range of 0.001 to 1,000 moles and preferably in the range of 0.01 to 100 moles, based on 1 mole of the cyclic olefin monomer. Furthermore, an olefin or a diene is usually used in an amount in the range of 0.1 to 1,000 moles and preferably in the range of 1 to 500 moles, based on 1 mole of the transition metal alkylidene catalyst.

The ring-opening metathesis polymerization of the cyclic olefin monomer may be carried out without a solvent or in a solvent, but particularly preferable examples of the solvent that is used include ethers such as tetrahydrofuran, diethyl ether, dibutyl ether, dimethoxyethane, dioxane and the like; esters such as ethyl acetate, propyl acetate, butyl acetate and the like; aromatic hydrocarbons such as benzene, toluene, xylene, ethylbenzene and the like; aliphatic hydrocarbons such as pentane, hexane, heptanes and the like; aliphatic cyclic hydrocarbons such as cyclopentane, cyclohexane, methylcyclohexane, dimethylcyclohexane, decalin and the like; halogenated hydrocarbons such as methylene dichloride, dichloroethane, dichloroethylene, tetrachloroethane, chlorobenzene, trichlorobenzene and the like; fluorine-containing aromatic hydrocarbons such as fluorobenzene, difluorobenzene, hexafluorobenzene, trifluoromethylbenzene, meta-xylene hexafluoride and the like; fluorine-containing aliphatic hydrocarbons such as perfluorohexane and the like; fluorine-containing aliphatic cyclic hydrocarbons such as perfluorocyclodecalin and the like; and fluorine-containing ethers such as perfluoro-2-butyltetrahydrofuran and the like. These may be used in combination of two or more kinds.

In the ring-opening metathesis polymerization of the cyclic olefin monomer, the concentration of the cyclic olefin monomer in the monomer solution may vary depending on the reactivity of the monomer and the solubility of the monomer in the polymerization solvent, but the concentration is usually in the range of 5 to 100 mass % and preferably in the range of 10 to 60 mass %. The reaction temperature is usually in the range of −30 to 150 degrees centigrade and preferably in the range of 30 to 100 degrees centigrade. The reaction time is usually in the range of 10 minutes to 120 hours and preferably in the range of 30 minutes to 48 hours. Furthermore, a solution of the polymer can be obtained by terminating the reaction with a deactivator such as water, an aldehyde such as butyl aldehyde; or an alcohol such as methanol.

The cyclic olefin copolymer of the present invention is obtained by subjecting a cyclic olefin monomer to ring-opening metathesis polymerization and subjecting the olefin moiety of the main chain of the resulting polymer to a hydrogenation reaction using a catalyst. The hydrogenation catalyst may be any of a homogeneous metal complex catalyst or a heterogeneous metal-supported catalyst, as long as it is a catalyst capable of hydrogenating the olefin moiety of the main chain of the polymer without causing a hydrogenation reaction of the solvent in use. Examples of the homogeneous metal complex catalyst include chlorotris(triphenylphosphine)rhodium, dichlorotris(triphenylphosphine)osmium, dichlorohydridobis(triphenylphosphine)iridium, dichlorotris(triphenylphosphine)ruthenium, dichlorotetrakis(triphenylphosphine)ruthenium, chlorohydridocarbonyltris(triphenylphosphine)ruthenium, dichlorotris(trimethylphosphine)ruthenium and the like. Examples of the heterogeneous metal-supported catalyst include activated carbon-supported palladium, alumina-supported palladium, activated carbon-supported rhodium, alumina-supported rhodium, activated carbon-supported ruthenium, alumina-supported ruthenium and the like. These hydrogenation catalysts may be used singly or in combination of two or more kinds.

When the hydrogenation treatment of the olefin moiety of the main chain is carried out, in the case of using a known heterogeneous or homogeneous hydrogenation catalyst, the amount of the hydrogenation catalyst used is such that the metal component in the hydrogenation catalyst is usually used in an amount of $5 \times 10^{-4}$ to 100 mass parts and preferably $1 \times 10^{-2}$ to 30 mass parts, relative to 100 mass parts of the polymer prior to the hydrogenation treatment.

The solvent used in the hydrogenation is not particularly limited as long as the solvent dissolves the cyclic olefin copolymer and the solvent itself is not hydrogenated. Examples of the solvent include ethers such as tetrahydrofuran, diethyl ether, dibutyl ether, dimethoxyethane and the like; esters such as ethyl acetate, propyl acetate, butyl acetate and the like; aromatic hydrocarbons such as benzene, toluene, xylene, ethylbenzene and the like; aliphatic hydrocarbons such as pentane, hexane, heptane and the like; aliphatic cyclic hydrocarbons such as cyclopentane, cyclohexane, methylcyclohexane, dimethylcyclohexane, decalin and the like; halogenated hydrocarbons such as methylene dichloride, chloroform, dichloroethane, dichloroethylene, tetrachloroethane, chlorobenzene, trichlorobenzene and the like; fluorine-containing aromatic hydrocarbons such as fluorobenzene, difluorobenzene, hexafluorobenzene, trifluoromethylbenzene, meta-xylene hexafluoride and the like; fluorine-containing aliphatic hydrocarbons such as perfluorohexane and the like; fluorine-containing aliphatic cyclic hydrocarbons such as perfluorocyclodecalin and the like; and fluorine-containing ethers such as perfluoro-2-butyltetrahydrofuran and the like. These solvents may be used in combinations of two or more kinds.

The hydrogenation reaction of the olefin moiety of the main chain is carried out at a hydrogen pressure in the range of normal pressure to 30 MPa, preferably in the range of 0.5 to 20 MPa and particularly preferably in the range of 2 to 15 MPa, and the reaction temperature is usually in the temperature range of 0 to 300 degrees centigrade, preferably in the temperature range of room temperature to 250 degrees centigrade and particularly preferably in the temperature range of 50 to 200 degrees centigrade. There are no particular limitations on the mode of carrying out the hydrogenation reaction, but examples include a method of performing the reaction with the catalyst dispersed or dissolved in a solvent, and a method of filling the catalyst in a column or the like and performing the reaction by passing a polymer solution through the column as a static phase.

There are no particular limitations on the hydrogenation treatment of the olefin moiety of the main chain, and the hydrogenation treatment may be carried out after precipitating a polymerization solution of the cyclic olefin copolymer prior to the hydrogenation treatment in a poor solvent, isolating the polymer, and then dissolving the polymer again in a solvent, or the hydrogenation treatment may be carried out using the hydrogenation catalyst described above, without isolating the polymer from the polymerization solution.

Furthermore, the hydrogenation rate of the olefin moiety of the cyclic olefin copolymer is equal to or more than 50%, preferably from 70 to 100%, and more preferably from 90 to 100%. When this hydrogenation rate is less than 50%, the olefin moiety may be deteriorated due to oxidation or light absorption, thereby causing deterioration of heat resistance or weather resistance.

In the present invention, the method for recovering the cyclic olefin copolymer from the polymer solution after hydrogenation is not particularly limited, but examples include a method of discharging the reaction solution into a poor solvent under stirring; a method of precipitating the polymer by a steam stripping method in which steam is blown into the reaction solution or the like, and recovering the polymer by filtration, centrifugation, decantation or the like; and a method of evaporating and removing the solvent from the reaction solution through heating or the like.

Furthermore, various known additives such as an adhesion auxiliary agent, an ultraviolet absorbent, an antioxidant, a flame retardant, a leveling agent and an antistatic agent, a resin component in addition to the resin of the present invention or a rubber component can also be incorporated into the recovered polymer, to the extent that the purpose of the present invention is not impaired. The resulting material can be used as an optical material. Furthermore, the method of incorporating various additives is not particularly limited, but examples include a method of mixing the cyclic olefin copolymer and an additive while kneading with a kneading machine such as a roll, a kneader, a kneading extruder, a Banbury mixer, a feeder ruder or the like; and a method of dissolving the cyclic olefin copolymer in an appropriate solvent, incorporating it into an additive for mixing, and then removing the solvent.

The optical film of the present invention can be produced by a melt molding method or a solution casting method. When the optical film is produced by a melt molding method, a method of forming a film through a T die using a melt-kneading machine or a tubular film process is used for the production. In the production of a film which is melt-extruded by a T die, for example, a cyclic olefin copolymer mixed with an additive as necessary is put into an extruder and is usually melt-kneaded at a temperature of 50 to 200 degrees centigrade higher than the glass transition temperature and preferably at a temperature of 80 to 150 degrees centigrade higher than that, and the molten polymer is extruded from the T die and is cooled with a cooling roll or the like, thus forming a film. On the other hand, when the optical film is produced by a solution casting method, the polymer solution is applied on a base material by a method such as table coating, spin coating, dip coating, die coating, spray coating, bar coating, roll coating or curtain flow coating, is dried and is detached, thus forming a film. The base material is made of a metallic material such as stainless steel or silicon; an inorganic material such as glass or quartz; or a resin material such as polyimide, polyamide, polyester, polycarbonate, polyphenylene ether, polyphenylene sulfide, polyacrylate, polymethacrylate, polyallylate, an epoxy resin or a silicone resin.

There are no particular limitations on the organic solvent used in the solution casting method, but the organic solvent can be selected from, for example, fluorine-containing aromatic hydrocarbons such as meta-xylene hexafluoride, benzotrifluoride, fluorobenzene, difluorobenzene, hexafluorobenzene, trifluoromethylbenzene, bis(trifluoromethyl) benzene and the like; fluorine-containing aliphatic hydrocarbons such as perfluorohexane, perfluorooctane and the like; fluorine-containing aliphatic cyclic hydrocarbons such as perfluorocyclodecalin and the like; fluorine-containing ethers such as perfluoro-2-butyltetrahydrofuran and the like; halogenated hydrocarbons such as chloroform, chlorobenzene, trichlorobenzene and the like; ethers such as tetrahydrofuran, dibutyl ether, 1,2-dimethoxyethane, dioxane and the like; esters such as ethyl acetate, propyl acetate, butyl acetate and the like; and ketones such as methyl isobutyl ketone, cyclohexanone and the like, in consideration of the solubility and film formability. In particular, from the viewpoint of film formability, a solvent having a boiling point of equal to or more than 70 degrees centigrade at atmospheric pressure is preferable. If the boiling point of the solvent is low, the rate of evaporation is high and the solvent begins to partially dry during application. Thus, a low boiling point of the solvent causes deterioration of the film thickness accuracy or fisheyes on the film surface.

The method for stretching the film and conditions are not particularly limited. Examples of the method include uniaxial stretching methods such as a method of uniaxial stretching in the longitudinal direction utilizing the difference in the circumferential speed between rolls and a method of uniaxial stretching in the transverse direction using a tenter; biaxial stretching methods such as a method of simultaneous biaxial stretching involving longitudinal stretching by increasing the distance between clips fixing both sides of the film and transverse stretching by an increase in the angle of opening of guide rails, and a method of successive biaxial stretching involving longitudinal stretching utilizing the difference in the circumferential speed between rolls and transverse stretching using a tenter by gripping both end portions by clips; and an oblique stretching method using a tenter stretcher which can apply longitudinal or transverse tensile force at different rightward and leftward speeds, or a tenter stretcher which has the same distance of movement with a fixed angle of stretching or has different distances of movement while longitudinal or transverse tensile force can be applied at the same rightward and leftward speeds. Furthermore, a temperature at the time of stretching as stretching conditions is usually a temperature in which the range of −20 to 150 degrees centigrade is added to the glass transition temperature, preferably a temperature in which the range of −5 to 110 degrees centigrade is added, and further preferably a temperature in which the range of 0 to 80 degrees centigrade is added. The stretch ratio is usually in the range of 1.05 to 10 times, preferably in the range of 1.10 to 6.0 times, further preferably in the range of 1.10 to 5.0 times, more preferably in the range of 1.10 to 2.4 times, and particularly preferably in the range of 1.20 to 2.4 times. For these stretch conditions and orientation state, if the stretch ratio is just increased, the orientation state is not always high, but the orientation state may be determined by the orientation coefficient as the physical property value inherent in the polymer of the present invention.

The optical material of the present invention can be molded by known injection molding methods. As the injection molding method, there may be exemplified a method involving putting pellets or powders of the cyclic olefin copolymer mixed with an additive as necessary into a hopper of an injection molding machine, sending to a cylinder using a screw with the number of rotations set to a value such that a molding material is uniformly mixed, and then injecting into a mold. The temperature of the cylinder is usually set in the range of 150 to 400 degrees centigrade, preferably in the range of 150 to 350 degrees centigrade, and more preferably in the range of 180 to 300 degrees centigrade. The injection speed from the cylinder to the mold is usually from 1 to 50 mm/sec. The injection pressure from the cylinder to the mold is usually in the range of 50 to 150 MPa. The injection pressure in this case may be properly selected and set in consideration of conditions such as a mold design or flowability of a molding material in use. After filling into the mold by injection, the hold pressure applied over a certain period of time until a molten resin at the gate of the mold is fully cooled and solidified is generally set in the range of the clamping pressure of the mold, but it is usually set in the range of 10 to 200 MPa, preferably in the range of 12 to 170 MPa, and more preferably in the range of 15 to 150 MPa. The mold temperature in this case is set usually at a temperature lower than the glass transition temperature (Tg) of the cyclic olefin copolymer, preferably a temperature which is 5 to 50 degrees centigrade lower than Tg, and more preferably a temperature which is 8 to 30 degrees centigrade lower than Tg.

EXAMPLES

Hereinafter, the present invention will be described with reference to Examples. However, the present invention is not restricted to these Examples.

Incidentally, a method of measuring analysis values of the polymers synthesized in the Examples, a method of measuring the photoelastic constant, a method of stretching the films, a method of measuring the orientation birefringences, and a method of calculating the orientation coefficients will be described below.

[Weight Average Molecular Weight (Mw), Molecular Weight Distribution (Mw/Mn)]

The weight average molecular weight (Mw) and number average molecular weight (Mn) of a polymer dissolved in tetrahydrofuran (THF) were measured by using gel permeation chromatography (GPC) under the following conditions, under the correction of the molecular weight relative to polystyrene standards.

Detector: RI-2031 and 875-UV manufactured by JASCO Corporation, or Model 270 manufactured by Viscotec Corporation; columns connected in series: Shodex K-806M, 804, 803, 802.5; column temperature: 40 degrees centigrade; flow rate: 1.0 ml/min; sample concentration: 3.0 mg/ml

[Hydrogenation Rate of Cyclic Olefin Copolymer]

A powder of a ring-opening metathesis polymer which had been subjected to a hydrogenation reaction was dissolved in deuterated chloroform or deuterated tetrahydrofuran, a 270 MHz-$^1$H-NMR spectrum was measured using a nuclear magnetic resonance apparatus manufactured by JEOL Ltd., and the hydrogenation rate was calculated from the integrated values of the signals originating from the hydrogen bonded to the double bond carbons in the main chain at $\delta$=4.5 to 7.0 ppm.

[Composition (Molar) Ratio of Cyclic Olefin Copolymer]

A cyclic olefin copolymer obtained by subjecting a ring opening metathesis polymer to hydrogenation was dissolved in deuterated chloroform or deuterated tetrahydrofuran and analyzed according to the following method, and the composition (molar) ratio [A]/[B] or [A]/[B]/[C] of the cyclic olefin copolymer was calculated.

In the case of a fluorine-containing copolymer: Ortho-difluorobenzene was added as a reference substance. A 373 MHz-$^{19}$F-NMR spectrum was measured using a nuclear magnetic resonance apparatus, ECX400, manufactured by JEOL Ltd. The composition (molar) ratio [A]/[B] was calculated from the integrated values of fluorine originating from —CF at $\delta$=−150 to −200 ppm, —CF$_2$ at $\delta$=−100 to −150 ppm or —CF$_3$ at $\delta$=−60 to −100 ppm in the respective unit structure [A] of the general formula (1) and the unit structure [B] of the general formula (2) with the ortho-difluorobenzene at $\delta$=−139 ppm set as the reference signal.

Furthermore, a 125 MHz-$^{13}$C-NMR spectrum was measured using a nuclear magnetic resonance apparatus, ECA500, manufactured by JEOL Ltd. The composition (molar) ratio [A]/[B]/[C] was calculated from the integrated values of carbon originating from —CF at $\delta$=85 to 105 ppm, —CF$_2$ at $\delta$=110 to 135 ppm or —CF$_3$ at $\delta$=115 to 135 ppm, the integrated values of carbon originating from methine at $\delta$=45 to 55 ppm, and the calibration curve of molar composition-molar integrated values. Also, the composition (molar) ratio [A]/[B] was calculated.

In the case of a polymer containing cyano: A 125 MHz-$^{13}$C-NMR spectrum was measured using a nuclear magnetic resonance apparatus, ECA500, manufactured by JEOL Ltd. The composition (molar) ratio [A]/[B] was calculated from the integrated values of carbon originating from cyano at $\delta$=115 to 135 ppm of respective unit structures of the general formulae (1) and (2) with deuterated chloroform at $\delta$=77 ppm set as the reference signal.

Furthermore, the composition (molar) ratio [A]/[B]/[C] was calculated from the integrated values of carbon originating from cyano at $\delta$=115 to 135 ppm, the integrated values of carbon originating from methine at $\delta$=40 to 60 ppm and the calibration curve of molar composition-molar integrated values.

[Glass Transition Temperature]

A measurement sample was heated at a temperature increase rate of 10 degrees centigrade/min as under a nitrogen atmosphere and analyzed using DSC-50 manufactured by Shimadzu Corporation.

[Film Stretching Method]

Using a stretching apparatus, SS-70, manufactured by Shibayama Scientific Co., Ltd., a film having a size of 30 mm (between chucks)×30 mm (width)×35 to 43 μm (thickness) was heated to a predetermined temperature and then uniaxially stretched to a predetermined magnification at a rate of 30 mm/min.

[Measurement of Orientation Birefringence]

According to the Senarmont method, the phase difference at a wavelength of 632.8 nm was measured using a HeNe laser manufactured by Melles Griot Inc. as a light source and a power meter manufactured by Anritsu Corporation as a detector, and the orientation birefringence of the stretched film was calculated according to the following Equation (11).

$$\text{Orientation birefringence } (\Delta n) = Re(nm)/T(\mu m) \quad (11)$$

Herein, Re represents the phase difference (nm) of the stretched film; and T represents the film thickness (μm) of the stretched film.

[Measurement of Photoelastic Constant]

Using a photoelastic constant measuring device, PHEL-20A-S, manufactured by Uniopt Co., Ltd., the phase difference at a wavelength of 633 nm was measured by applying a tensile force of maximum 2N to a film having a size of 60 mm (between chucks)×10 mm (width) at a rate of 0.1 mm/min, and the photoelastic constant was calculated from the amount of a change in the tensile force $\Delta P(N)$ and the amount of a change in the phase difference $\Delta Re(nm)$ in the range in which the phase difference linearly increases with the application of the stress according to the following Equation (12).

$$\text{Photoelastic constant } (Pa^{-1}) = \Delta Re(nm)/\Delta P(N) \times \text{film width (mm)} \quad (12)$$

[Measurement of Dichroic Ratio of Stretched Film According to Raman Spectroscopy]

Raman spectra of respective parallel direction and perpendicular direction were measured by taking a stretching axis of the stretched film as the parallel direction and a direction tilted by 90 degrees as the perpendicular direction using JRS-SYSTEM2000 manufactured by Renishaw Inc., and the dichroic ratio D was calculated from parallel light intensity ($I_\parallel$) and perpendicular light intensity ($I_\perp$) belonging to $CH_2$ scissoring vibration of the polymer chain observed in the vicinity of Raman shift of 1,450 $cm^{-1}$ according to Equation (13) based on a baseline.

$$\text{Dichroic ratio } D = I_\parallel / I_\perp \quad (13)$$

[Calculation of Absolute Value of Orientation Coefficient]

The absolute value of the orientation coefficient of the stretched film was calculated from the dichroic ratio D of the Raman scattering intensity according to the following Equation (14)

$$\text{Absolute Value of Orientation coefficient } F = |(D-1)/(D+2)| \quad (14)$$

[Calculation of Absolute Value of $\Delta OB/\Delta F$]

The amount of a change in the absolute value of the orientation birefringence $\Delta OB$ to the amount of a change in the absolute value of the orientation coefficient $\Delta F$ determined from Equations (13) and (14), that is, the absolute value of the ratio $\Delta OB/\Delta F$, was calculated from a linear gradient of the absolute value of the orientation birefringence with respect to the absolute value of the orientation coefficient in a region in which the orientation birefringence linearly varied with respect to the orientation coefficient of the stretched film when the orientation birefringence $\Delta n$ value of the non-stretched film (the absolute value of the orientation coefficient was 0) was 0.

[Examination of Stress Birefringence of Injection-Molded Product]

Using a small-sized injection molding machine, Micro-1, manufactured by Meiho Co., Ltd., an injection-molded product having a size of 11 mm (diameter)×3 mm (thickness) was prepared. As the molding conditions, the temperature of a heating and kneading section was 130 to 170 degrees centigrade higher than the glass transition temperature of the polymer, the temperature of a mold was 5 to 30 degrees centigrade lower than the glass transition temperature, the injection speed was 10 to 40 mm/sec, and the injection pressure was 20 to 70 MPa. Thus, 30 to 50 injection-molded products were prepared while adjusting respective conditions for each type of the polymer. For the evaluation of a molded product, the stress birefringence of the molded product was observed using a distortion tester LSM-2001 (crossed Nicols meter) manufactured by Luceo Ltd.

Example 1

Synthesis of Polymer 1

A tetrahydrofuran solution of a polymerization catalyst, $Mo(N-2,6-Pr^i_2C_6H_3)(CHCMe_2Ph)(OBu^t)_2$ (18 mg), was added to a tetrahydrofuran solution of two kinds of monomers consisting of 5-cyano-bicyclo[2.2.1]hept-2-ene (10 g) and 8-cyano-tetracyclo[$4.4.0.1^{2,5}.1^{7,10}$]-3-dodecene (36 g), and 1-hexene (8.0 g), and ring-opening metathesis polymerization was carried out by consuming monomers completely at 60 degrees centigrade. The olefin moiety of the polymer thus obtained was subjected to a hydrogenation reaction using a hydrogenation catalyst $(Ph_3P)_3CORuHCl$ (18.4 mg) and triethylamine (5.9 mg) at 125 degrees centigrade under hydrogen pressure, and thus a tetrahydrofuran solution of a copolymer of poly(1-cyano-3,5-cyclopentylene ethylene)/(3-cyano-7,9-tricyclo[$4.3.0.1^{2,5}$]decanylene ethylene) was obtained. The solution was added to methanol, and a white polymer was separated by filtration and was dried. Thus, 46 g of a polymer 1 was obtained. The hydrogenation rate was 100%, the composition ratio [A]/[B] was 30/70, the weight average molecular weight (Mw) was 65,000, the molecular weight distribution (Mw/Mn) was 2.75, and the glass transition temperature was 178 degrees centigrade. Furthermore, a $^{13}C$-NMR spectrum of the polymer 1 is illustrated in FIG. 1.

Example 2

Synthesis of Polymer 2

43 g of a polymer 2 was obtained in the same manner as in Example 1, except that the molar ratio of two kinds of monomers in Example 1 was changed to [A]/[B]=20/80. The hydrogenation rate was 100%, the composition ratio [A]/[B] was 20/80, the weight average molecular weight (Mw) was 59,000, the molecular weight distribution (Mw/Mn) was 2.72, and the glass transition temperature was 192 degrees centigrade.

Example 3

Synthesis of Polymer 3

43 g of a polymer 3 was obtained in the same manner as in Example 1, except that the molar ratio of two kinds of monomers in Example 1 was changed to [A]/[B]=50/50. The hydrogenation rate was 100%, the composition ratio [A]/[B] was 50/50, the weight average molecular weight (Mw) was 60,000, the molecular weight distribution (Mw/Mn) was 2.65, and the glass transition temperature was 145 degrees centigrade.

Example 4

Synthesis of Polymer 4

A tetrahydrofuran solution of a polymerization catalyst, $Mo(N-2,6-Pr^i_2C_6H_3)(CHCMe_2Ph)(OCMe(CF_3)_2)_2$ (25 mg), was added to a tetrahydrofuran solution of two kinds of monomers consisting of 5-cyano-bicyclo[2.2.1]hept-2-ene (10 g) and 8-cyano-tetracyclo[$4.4.0.1^{2,5}.1^{7,10}$]-3-dodecene (36 g), and 1-hexene (0.7 g), and ring-opening metathesis polymerization was carried out by consuming monomers completely at 60 degrees centigrade. The olefin moiety of the polymer thus obtained was subjected to a hydrogenation reaction using a 5% ruthenium/alumina-supported hydrogenation catalyst (2.5 g) at 160 degrees centigrade under hydrogen pressure, and thus a tetrahydrofuran solution of a copolymer was obtained. The solution was added to methanol, and a white polymer was separated by filtration and was dried. Thus, 46 g of a polymer 4 was obtained. The hydrogenation rate was 100%, the composition ratio [A]/[B] was 30/70, the weight average molecular weight (Mw) was 56,000, the molecular weight distribution (Mw/Mn) was 2.15, and the glass transition temperature was 186 degrees centigrade.

Example 5

Synthesis of Polymer 5

A tetrahydrofuran solution of a polymerization catalyst, $Mo(N-2,6-Pr^i_2C_6H_3)(CHCMe_2Ph)(OBu^t)_2$ (15 mg), was added to a tetrahydrofuran solution of three kinds of monomers consisting of 5-cyano-bicyclo[2.2.1]hept-2-ene (11.4 g), 8-cyano-tetracyclo[$4.4.0.1^{2,5}.1^{7,10}$]-3-dodecene (25.2 g, [B1]) and 10-cyano-hexacyclo[$8.4.0^{1,6}.0^{8,13}.1^{2,5}.1^{7,14}.1^{9,12}$]-3-heptadecene (10.2 g, [B2]), and 1-hexene (6.6 g), and ring-opening metathesis polymerization was carried out by consuming monomers completely at 60 degrees centigrade. The olefin moiety of the polymer thus obtained was subjected to a hydrogenation reaction using a 5% ruthenium/alumina-supported hydrogenation catalyst (2.5 g) at 160 degrees centigrade under hydrogen pressure, and thus a tetrahydrofuran solution of a ternary copolymer of poly(1-cyano-3,5-cyclopentylene ethylene)/(3-cyano-7,9-tricyclo[$4.3.0.1^{2,5}$]decanylene ethylene)/(4-cyano-10,12-pentacyclo[$6.5.1.0^{2,7}.0^{9,13}.1^{3,6}$]pentadecanylene ethylene) was obtained. The solution was added to methanol, and a white polymer was separated by filtration and was dried. Thus, 46 g of a polymer 5 was obtained. The hydrogenation rate was 100%, the composition ratio [A]/[B] was 35/65 (provided that [B]=[B1]+[B2] and [B1]/[B2]=50/15), the weight average molecular weight (Mw) was 68,000, the molecular weight distribution (Mw/Mn) was 2.81, and the glass transition temperature was 194 degrees centigrade.

Example 6

Synthesis of Polymer 6

47 g of a polymer 6 of a copolymer of poly(1-cyano-3,5-cyclopentylene ethylene)/(4-cyano-10,12-pentacyclo[$6.5.1.0^{2,7}.0^{9,13}.1^{3,6}$]pentadecanylene ethylene) was obtained in the same manner as in Example 5, except that three kinds of monomers in Example 5 were changed to two kinds of monomers consisting of 5-cyano-bicyclo[2.2.1]hept-2-ene (25.1 g) and 10-cyano-hexacyclo[$8.4.0^{1,6}.0^{8,13}.1^{2,5}.1^{7,14}.1^{9,12}$]-3-heptadecene (22.5 g), and 1-hexene (6.0 g). The hydrogenation rate was 100%, the composition ratio [A]/[B] was 70/30, the weight average molecular weight (Mw) was 63,000, the molecular weight distribution (Mw/Mn) was 2.79, and the glass transition temperature was 167 degrees centigrade.

Example 7

Synthesis of Polymer 7

43 g of a polymer 7 a copolymer of poly(1-cyano-1-methyl-3,5-cyclopentylene ethylene)/(3-cyano-3-methyl-7,9-tricyclo[$4.3.0.1^{2,5}$]decanylene ethylene) was obtained in the same manner as in Example 4, except that two kinds of monomers in Example 4 were changed to 5-cyano-5-methyl-bicyclo[2.2.1]hept-2-ene (8.0 g) and 10-cyano-10-methyl-hexacyclo[$8.4.0^{1,6}.0^{8,13}.1^{2,5}.1^{7,14}.1^{9,12}$]-3-heptadecene (35.8 g). The hydrogenation rate was 100%, the composition ratio [A]/[B] was 25/75, the weight average molecular weight (Mw) was 55,000, the molecular weight distribution (Mw/Mn) was 2.75, and the glass transition temperature was 196 degrees centigrade.

Example 8

Synthesis of Polymer 8

Figure 2:
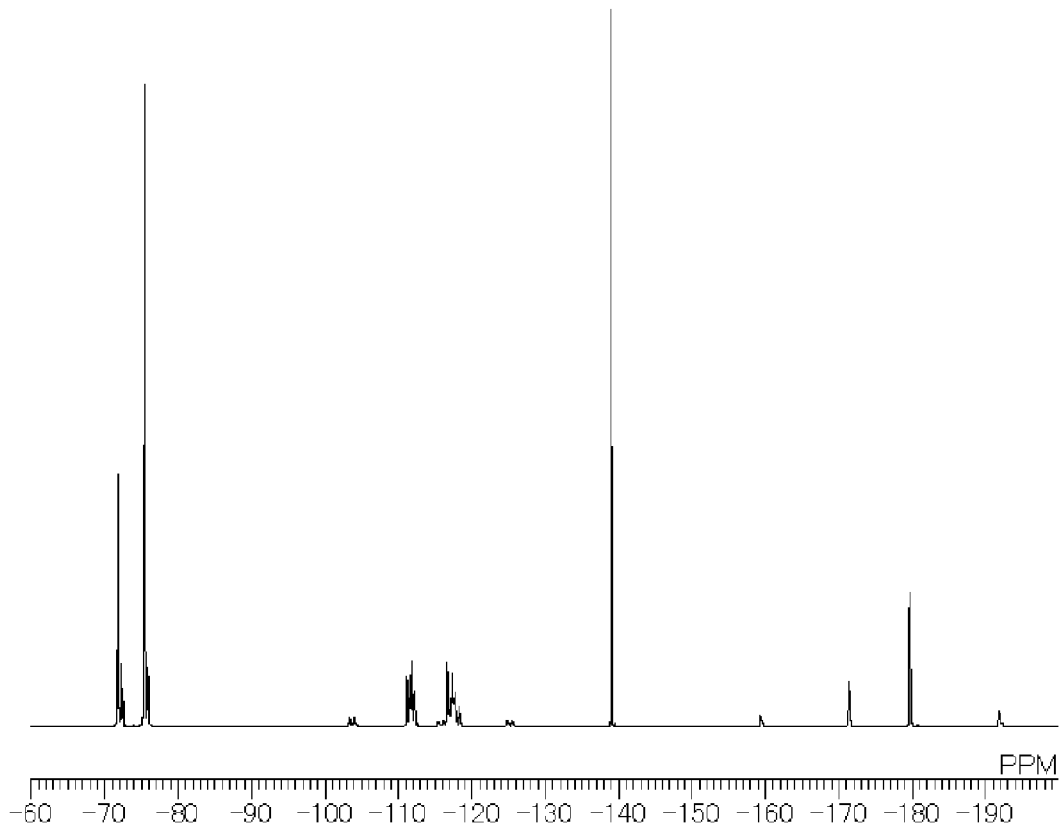
FIG. 2 illustrates a $^{19}$F-NMR spectrum of a cyclic olefin copolymer in Example 8.
Figure 3:
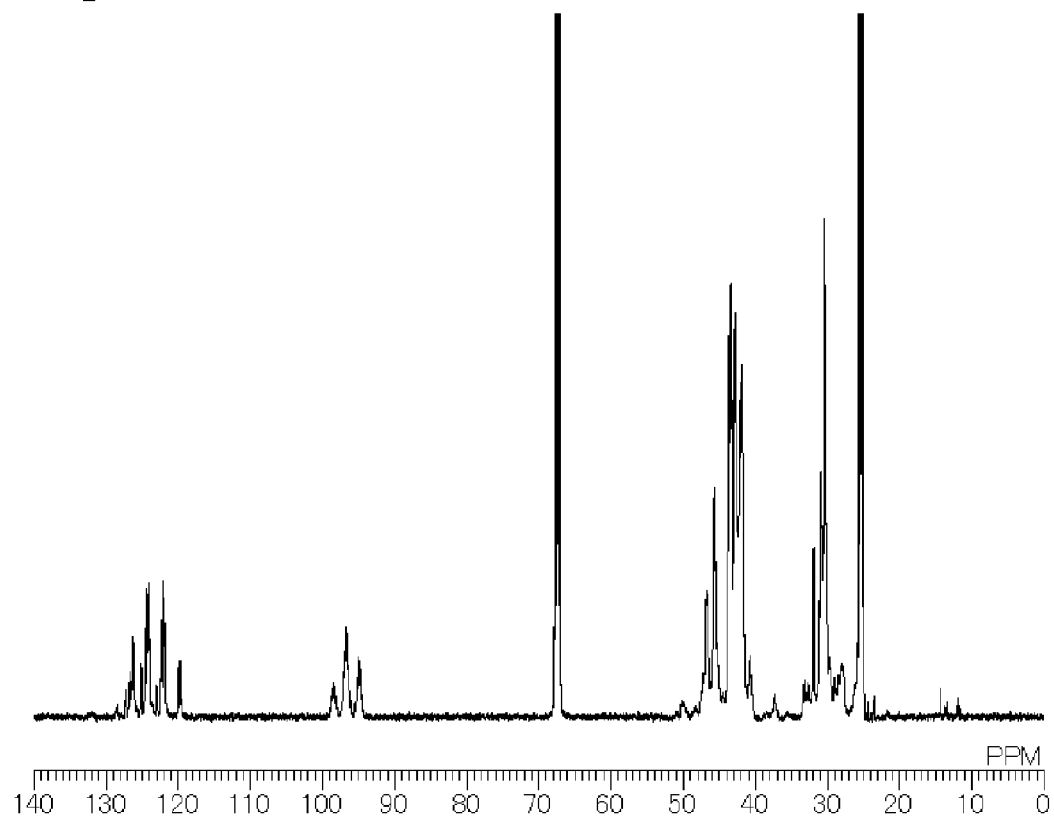
FIG. 3 illustrates a $^{13}$C-NMR spectrum of a cyclic olefin copolymer in Example 8.

A tetrahydrofuran solution of $Mo(N-2,6-Pr^i_2C_6H_3)(CHCMe_2Ph)(OBu^t)_2$ (17 mg) was added to a tetrahydrofuran solution of two kinds of monomers consisting of 5,5,6-trifluoro-6-trifluoromethyl-bicyclo[2.2.1]hept-2-ene (6.6 g) and 8,8,9-trifluoro-9-trifluoromethyl-tetracyclo[$4.4.0.1^{2,5}.1^{7,10}$]-3-dodecene (34.5 g), and 1,5-hexadiene (0.27 g), and ring-opening metathesis polymerization was carried out by consuming monomers completely at 70 degrees centigrade. The olefin moiety of the polymer thus obtained was subjected to a hydrogenation reaction using a 5% palladium/alumina-supported hydrogenation catalyst (2.3 g) at 160 degrees centigrade under hydrogen pressure, and thus a tetrahydrofuran solution of a copolymer of poly(1,1,2-trifluoro-2-trifluoromethyl-3,5-cyclopentylene ethylene)/(3,3,4-trifluoro-4-trifluoromethyl-7,9-tricyclo[$4.3.0.1^{2,5}$]decanylene ethylene) was obtained. The solution was added to methanol, and a white polymer was separated by filtration and was dried. Thus, 41 g of a polymer 8 was obtained. The hydrogenation rate was 100%, the composition ratio [A]/[B] was 20/80, the weight average molecular weight (Mw) was 75,000, the molecular weight distribution (Mw/Mn) was 3.06, and the glass transition temperature was 169 degrees centigrade. Furthermore, a $^{19}F$-NMR spectrum and a $^{13}C$-NMR spectrum of the polymer 8 are respectively illustrated in FIGS. 2 and 3.

Example 9

Synthesis of Polymer 9

41 g of a polymer 9 was obtained in the same manner as in Example 8, except that the molar ratio of two kinds of monomers in Example 8 was changed to [A]/[B]=50/50. The hydrogenation rate was 100%, the composition ratio [A]/[B] was 50/50, the weight average molecular weight (Mw) was 76,000, the molecular weight distribution (Mw/Mn) was 3.27, and the glass transition temperature was 149 degrees centigrade.

Example 10

Synthesis of Polymer 10

40 g of a polymer was obtained in the same manner as in Example 3, except that the monomer of the structural unit [B] in Example 3 was changed to 8,8,9-trifluoro-9-trifluoromethyl-tetracyclo[$4.4.0.1^{2,5}.1^{7,10}$]-3-dodecene, and the feeding molar ratio was changed to [A]/[B]=50/50. The hydrogenation rate was 100%, the composition ratio [A]/[B] was 50/50, the weight average molecular weight (Mw) was 54,000, the molecular weight distribution (Mw/Mn) was 3.81, and the glass transition temperature was 136 degrees centigrade.

Example 11

Synthesis of Polymer 11

41 g of a polymer was obtained in the same manner as in Example 10, except that the monomer of the structural unit [A] of Example was changed to 5,6-difluoro-5,6-bistrifluoromethyl-7-oxa-bicyclo[2.2.1]hept-2-ene and the feeding molar ratio was changed to [A]/[B]=50/50. The hydrogenation rate was 100%, the composition ratio [A]/[B] was 50/50, the weight average molecular weight (Mw) was 69,000, the molecular weight distribution (Mw/Mn) was 2.99, and the glass transition temperature was 124 degrees centigrade.

Example 12

A cyclohexane solution prepared by dissolving the polymer 1 synthesized in Example 1 at a concentration of 20 mass % was coated on a glass substrate and was uniformly coated using an applicator. Then, the coated substrate was dried at 180 degrees centigrade for 30 minutes and was detached, whereby a film having a thickness of 41.0 µm with a smooth surface was obtained. The absolute value of the photoelastic constant of the same film was $4.3 \times 10^{-12}$ $Pa^{-1}$. For the film with a smooth surface which was stretched by 1.2 times and 1.4 times at 198 degrees centigrade, the dichroic ratios calculated from the peak intensity ratio at Raman shift of 1,451 $cm^{-1}$ were respectively 1.005 and 1.010, the absolute values of the orientation coefficients were respectively 0.0017 and 0.0033, the absolute values of the orientation birefringences were respectively $0.2 \times 10^{-4}$ and $0.4 \times 10^{-4}$, and the absolute value of the ratio $\Delta OB/\Delta F$ was 0.012.

Figure 4:
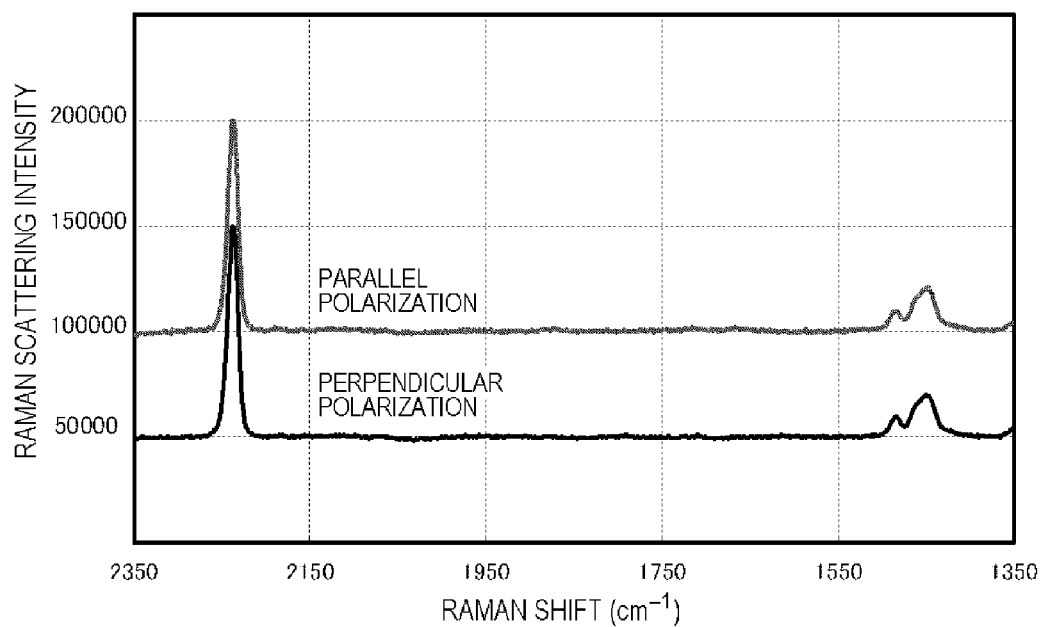
FIG. 4 illustrates a Raman spectrum of perpendicular polarized light and parallel polarized light of a 2.4-times stretched film in Example 12.

Furthermore, for the film with a smooth surface which was stretched by 2.4 times at the same temperature, the dichroic ratio calculated from the peak intensity ratio at Raman shift of 1,451 $cm^{-1}$ was 1.055, the absolute value of the orientation coefficient was 0.0180, and the absolute value of the orientation birefringence was $0.6 \times 10^{-4}$. A Raman spectrum of perpendicular polarized light and parallel polarized light of the 2.4-times stretched film is illustrated in FIG. 4.

Example 13

A film having a thickness of 40.5 µm with a smooth surface was obtained in the same manner as in Example 12 using the polymer 2 synthesized in Example 2. For the film with a smooth surface which was stretched by 1.3 times and 1.5 times at 212 degrees centigrade, the dichroic ratios calculated from the peak intensity ratios at Raman shift of 1,451 $cm^{-1}$ were respectively 1.009 and 1.012, the absolute values of the orientation coefficients were respectively 0.0030 and 0.0040, the absolute values of the orientation birefringences were respectively $0.7 \times 10^{-4}$ and $1.0 \times 10^{-4}$, and the absolute value of the ratio $\Delta OB/\Delta F$ was 0.026.

Example 14

A film having a thickness of 37.3 µm with a smooth surface was obtained in the same manner as in Example 12 using the polymer 3 synthesized in Example 3. For the film with a smooth surface which was stretched by 1.2 times and 1.5 times at 165 degrees centigrade, the dichroic ratios calculated from the peak intensity ratios at Raman shift of 1,452 $cm^{-1}$ were respectively 1.011 and 1.030, the absolute values of the orientation coefficients were respectively 0.0037 and 0.0099, the absolute values of the orientation birefringences were respectively $1.2 \times 10^{-4}$ and $3.4 \times 10^{-4}$, and the absolute value of the ratio $\Delta OB/\Delta F$ was 0.034.

Example 15

A film having a thickness of 42.0 µm with a smooth surface was obtained in the same manner as in Example 12 using the polymer 4 synthesized in Example 4. The absolute value of the photoelastic constant of the same film was $4.5 \times 10^{-12}$ $Pa^{-1}$. For the film with a smooth surface which was stretched by 1.2 times and 1.4 times at 206 degrees centigrade, the dichroic ratios calculated from the peak intensity ratios at Raman shift of 1,452 $cm^{-1}$ were respectively 1.008 and 1.015, the absolute values of the orientation coefficients were respectively 0.0027 and 0.0050, the absolute values of the orientation birefringences were respectively $0.3 \times 10^{-4}$ and $0.6 \times 10^{-4}$, and the absolute value of the ratio $\Delta OB/\Delta F$ was 0.012.

Furthermore, for the film with a smooth surface which was stretched by 2.4 times at the same temperature, the dichroic ratio calculated from the peak intensity ratio at Raman shift of 1,453 $cm^{-1}$ was 1.065, the absolute value of the orientation coefficient was 0.0212, and the absolute value of the orientation birefringence was $0.7 \times 10^{-4}$.

Example 16

A film having a thickness of 40.8 µm with a smooth surface was obtained in the same manner as in Example 12 using the polymer 5 synthesized in Example 5. The absolute value of the photoelastic constant of the same film was $0.8 \times 10^{-12}$ $Pa^{-1}$. For the film with a smooth surface which was stretched by 1.4 times and 1.6 times at 214 degrees centigrade, the dichroic ratios calculated from the peak intensity ratios at Raman shift of 1,452 $cm^{-1}$ were respectively 1.007 and 1.013, the absolute values of the orientation coefficients were respectively 0.0023 and 0.0043, the absolute values of the orientation birefringences were respectively $0.2 \times 10^{-4}$ and $0.4 \times 10^{-4}$, and the absolute value of the ratio $\Delta OB/\Delta F$ was 0.009.

Furthermore, for the film with a smooth surface which was stretched by 2.4 times at the same temperature, the dichroic ratio calculated from the peak intensity ratio at Raman shift of 1,451 $cm^{-1}$ was 1.061, the absolute value of the orientation coefficient was 0.0199, and the absolute value of the orientation birefringence was $0.4 \times 10^{-4}$.

Example 17

A film having a thickness of 43.0 µm with a smooth surface was obtained in the same manner as in Example 12 using the polymer 6 synthesized in Example 6. The absolute value of the photoelastic constant of the same film was $0.9 \times 10^{-12}$ $Pa^{-1}$. For the film with a smooth surface which was stretched by 1.2 times and 1.5 times at 187 degrees centigrade, the dichroic ratios calculated from the peak intensity ratios at Raman shift of 1,454 $cm^{-1}$ were respectively 1.010 and 1.020, the absolute values of the orientation coefficients were respectively 0.0033 and 0.0066, the absolute values of the orientation birefringences were respectively $0.3 \times 10^{-4}$ and $0.5 \times 10^{-4}$, and the absolute value of the ratio $\Delta OB/\Delta F$ was 0.008.

Furthermore, for the film with a smooth surface which was stretched by 2.4 times at the same temperature, the dichroic ratio calculated from the peak intensity ratio at Raman shift of 1,451 cm$^{-1}$ was 1.070, the absolute value of the orientation coefficient was 0.0228, and the absolute value of the orientation birefringence was 0.5×10$^{-4}$.

Example 18

A film having a thickness of 42.5 μm with a smooth surface was obtained in the same manner as in Example 12 using the polymer 7 synthesized in Example 7. The absolute value of the photoelastic constant of the same film was 3.3×10$^{-12}$ Pa$^{-1}$. For the film with a smooth surface which was stretched by 1.3 times and 1.5 times at 216 degrees centigrade, the dichroic ratios calculated from the peak intensity ratios at Raman shift of 1,450 cm$^{-1}$ were respectively 1.008 and 1.015, the absolute values of the orientation coefficients were respectively 0.0027 and 0.0050, the absolute values of the orientation birefringences were respectively 0.3×10$^{-4}$ and 0.5×10$^{-4}$, and the absolute value of the ratio ΔOB/ΔF was 0.010.

Furthermore, for the film with a smooth surface which was stretched by 2.4 times at the same temperature, the dichroic ratio calculated from the peak intensity ratio at Raman shift of 1,451 cm$^{-1}$ was 1.063, the absolute value of the orientation coefficient was 0.0206, and the absolute value of the orientation birefringence was 0.6×10$^{-4}$.

Example 19

A film having a thickness of 34.9 μm with a smooth surface was obtained in the same manner as in Example 12 using the polymer 8 synthesized in Example 8. The absolute value of the photoelastic constant of the same film was 6.5×10$^{-12}$ Pa$^{-1}$. For the film with a smooth surface which was stretched by 1.1 times and 1.3 times at 199 degrees centigrade, the dichroic ratios calculated from the peak intensity ratios at Raman shift of 1,452 cm$^{-1}$ were respectively 1.003 and 1.004, the absolute values of the orientation coefficients were respectively 0.0010 and 0.0013, the absolute values of the orientation birefringences were respectively 1.5×10$^{-4}$ and 2.1×10$^{-4}$, and the absolute value of the ratio ΔOB/ΔF was 0.155.

Furthermore, for the film with a smooth surface which was stretched by 1.8 times at the same temperature, the dichroic ratio calculated from the peak intensity ratio at Raman shift of 1,453 cm$^{-1}$ was 1.010, the absolute value of the orientation coefficient was 0.0033, and the absolute value of the orientation birefringence was 3.5×10$^{-4}$.

Example 20

A film having a thickness of 35.0 μm with a smooth surface was obtained in the same manner as in Example 12 using the polymer 9 synthesized in Example 9. For the film with a smooth surface which was stretched by 1.3 times and 1.6 times at 179 degrees centigrade, the dichroic ratios calculated from the peak intensity ratios at Raman shift of 1,454 cm$^{-1}$ were respectively 1.005 and 1.006, the absolute values of the orientation coefficients were respectively 0.0017 and 0.0020, the absolute values of the orientation birefringences were respectively 2.8×10$^{-4}$ and 3.5×10$^{-4}$, and the absolute value of the ratio ΔOB/ΔF was 0.173.

Furthermore, for the film with a smooth surface which was stretched by 2.2 times at the same temperature, the dichroic ratio calculated from the peak intensity ratio at Raman shift of 1,452 cm$^{-1}$ was 1.007, the absolute value of the orientation coefficient was 0.0022, and the absolute value of the orientation birefringence was 4.7×10$^{-4}$.

Example 21

A film having a thickness of 36.0 μm with a smooth surface was obtained in the same manner as in Example 12 using the polymer 10 synthesized in Example 10. For the film with a smooth surface which was stretched by 1.1 times and 1.3 times at 166 degrees centigrade, the dichroic ratios calculated from the peak intensity ratios at Raman shift of 1,452 cm$^{-1}$ were respectively 1.013 and 1.030, the absolute values of the orientation coefficients were respectively 0.0043 and 0.0100, the absolute values of the orientation birefringences were respectively 1.3×10$^{-4}$ and 3.2×10$^{-4}$, and the absolute value of the ratio ΔOB/ΔF was 0.032.

Furthermore, for the film with a smooth surface which was stretched by 1.8 times at the same temperature, the dichroic ratio calculated from the peak intensity ratio Raman shift of 1,453 cm$^{-1}$ was 1.074, the absolute value of the orientation coefficient was 0.0240, and the absolute value of the orientation birefringence was 4.8×10$^{-4}$.

Example 22

A film having a thickness of 34.7 μm with a smooth surface was obtained in the same manner as in Example 12 using the polymer 11 synthesized in Example 11. The absolute value of the photoelastic constant of the same film was 6.8×10$^{-12}$Pa$^{-1}$. For the film with a smooth surface which was stretched by 1.4 times and 1.6 times at 154 degrees centigrade, the dichroic ratios calculated from the peak intensity ratios at Raman shift of 1,449 cm$^{-1}$ were respectively 1.005 and 1.009, the absolute values of the orientation coefficients were respectively 0.0017 and 0.0030, the absolute values of the orientation birefringences were respectively 2.3×10$^{-4}$ and 4.0×10$^{-4}$, and the absolute value of the ratio ΔOB/ΔF was 0.135.

For the films obtained in Examples 12 to 22, the absolute values of the orientation coefficients were equal to or more than 0.001 and the absolute values of the orientation birefringences were equal to or less than 5×10$^{-4}$. From the facts, it was considered that there could be obtained an optical film which was highly transparent and was excellent in the intensity or elastic modulus due to toughness, tensile and bending without the limitations of temperature and pressure conditions at the time of molding or the like.

Example 23

Examination of Stress Birefringence of Injection-molded Product

The polymer 1 synthesized in Example 1 was subjected to injection molding while adjusting molding conditions, and thus 38 molded products were prepared. When the stress birefringence in the plane direction of the molded product was observed with a distortion-inspection gauge, the stress birefringence was not observed in 12 molded products thus formed in which surface transcription was excellent and no shrinkage cavity was generated.

From the results, according to the optical material of the present invention, it was considered that there could be obtained a molded product which was highly transparent and was excellent in the toughness without the limitations of temperature and pressure conditions at the time of molding or the like, and it could be widely applied to an optical lens. Furthermore, it was considered that molded products obtained from the polymers synthesized in Examples 2 to 11 also exhibited the same results.

Comparative Example 1

Synthesis of Polymer 12 and Measurement of Birefringence

A tetrahydrofuran solution of a polymerization catalyst, Mo(N-2,6-Me$_2$C$_6$H$_3$)(CHCMe$_2$Ph)(OBu$^t$)$_2$ (17 mg), was added to a tetrahydrofuran solution of a monomer of 5-cyano-bicyclo[2.2.1]hept-2-ene (43.0 g) and 1-hexene (6.9 g), and ring-opening metathesis polymerization was carried out by consuming monomers completely at 60 degrees centigrade. The olefin moiety of the polymer thus obtained was subjected to a hydrogenation reaction in the same manner as in Example 1, and thus a tetrahydrofuran solution of poly(1-cyano-3,5-cyclopentylene ethylene) was obtained. The solution was added to methanol, and a white polymer was separated by filtration and was dried. Thus, 43 g of a polymer 12 was obtained. The hydrogenation rate was 100%, the weight average molecular weight (Mw) was 48,000, the molecular weight distribution (Mw/Mn) was 2.65, and the glass transition temperature was 88 degrees centigrade.

Subsequently, a film having a thickness of 40.6 μm with a smooth surface was obtained in the same manner as in Example 12. The absolute value of the photoelastic constant of the same film was $14.9 \times 10^{-12}$ Pa$^{-1}$. For the film with a smooth surface which was stretched by 1.2 times and 1.5 times at 108 degrees centigrade, the dichroic ratios calculated from the peak intensity ratios at Raman shift of 1,452 cm$^{-1}$ were respectively 1.007 and 1.014, the absolute values of the orientation coefficients were respectively 0.0023 and 0.0046, the absolute values of the orientation birefringences were respectively $6.5 \times 10^{-4}$ and $13.0 \times 10^{-4}$, and the absolute value of the ratio ΔOB/ΔF was 0.280.

Comparative Example 2

Synthesis of Polymer 13 and Measurement of Birefringence

A tetrahydrofuran solution of a polymerization catalyst, Mo(N-2,6-Pr$^i_2$C$_6$H$_3$)(CHCMe$_2$Ph)(OBu$^t$)$_2$ (17 mg), was added to a tetrahydrofuran solution of a monomer of 5,5,6-trifluoro-6-trifluoromethyl-bicyclo[2.2.1]hept-2-ene (41.0 g) and 1,5-hexadiene (0.54 g), and ring-opening metathesis polymerization was carried out by consuming monomers completely at 70 degrees centigrade. The olefin moiety of the polymer thus obtained was subjected to a hydrogenation reaction in the same manner as in Example 8, and thus a tetrahydrofuran solution of poly(1,1,2-trifluoro-2-trifluoromethyl-3,5-cyclopentylene ethylene) was obtained. The solution was added to methanol, and a white polymer was separated by filtration and was dried. Thus, 41 g of a polymer 13 was obtained. The hydrogenation rate was 100%, the weight average molecular weight (Mw) was 68,000, the molecular weight distribution (Mw/Mn) was 2.45, and the glass transition temperature was 110 degrees centigrade.

Subsequently, a film having a thickness of 35.8 μm with a smooth surface was obtained in the same manner as in Example 12. The absolute value of the photoelastic constant of the same film was $16.0 \times 10^{-12}$ Pa$^{-1}$. For the film with a smooth surface which was stretched by 1.1 times and 1.3 times at 130 degrees centigrade, the dichroic ratios calculated from the peak intensity ratios at Raman shift of 1,454 cm$^{-1}$ were respectively 1.006 and 1.010, the absolute values of the orientation coefficients were respectively 0.0020 and 0.0033, the absolute values of the orientation birefringences were respectively $8.0 \times 10^{-4}$ and $13.5 \times 10^{-4}$, and the absolute value of the ratio ΔOB/ΔF was 0.405.

Comparative Example 3

Synthesis of Polymer 14 and Measurement of Birefringence

A tetrahydrofuran solution of a polymerization catalyst, Mo(N-2,6-Pr$^i_2$C$_6$H$_3$)(CHCMe$_2$Ph)(OCMe(CF$_3$)$_2$)$_2$(25 mg), was added to a tetrahydrofuran solution of two kinds of monomers of the structural unit [A] consisting of 5,5,6-trifluoro-6-trifluoromethyl-bicyclo[2.2.1]hept-2-ene (9.4 g) and 5,6-difluoro-5,6-bistrifluoromethyl-7-oxa-bicyclo[2.2.1]hept-2-ene (30.0 g), and 1,5-hexadiene (0.63 g), and ring-opening metathesis polymerization was carried out by consuming monomers completely at 70 degrees centigrade. The olefin moiety of the polymer thus obtained was subjected to a hydrogenation reaction in the same manner as in Example 8, and thus a tetrahydrofuran solution of a copolymer having a composition ratio of 50/50 of poly(1-trifluoromethyl-3,5-cyclopentylene ethylene)/(1,2-difluoro-1,2-bistrifluoromethyl-4-oxa-3,5-cyclo pentylene ethylene) was obtained. The solution was added to methanol, and a white polymer was separated by filtration and was dried. Thus, 39 g of a polymer 14 was obtained. The hydrogenation rate was 100%, the weight average molecular weight (Mw) was 59,000, the molecular weight distribution (Mw/Mn) was 2.68, and the glass transition temperature was 84 degrees centigrade.

Subsequently, a film having a thickness of 37.4 μm with a smooth surface was obtained in the same manner as in Example 12. The absolute value of the photoelastic constant of the same film was $10.7 \times 10^{-12}$ Pa$^{-1}$. For the film with a smooth surface which was stretched by 1.3 times and 1.6 times at 104 degrees centigrade, the dichroic ratios calculated from the peak intensity ratios at Raman shift of 1,449 cm$^{-1}$ were respectively 1.006 and 1.011, the absolute values of the orientation coefficients were respectively 0.0020 and 0.0037, the absolute values of the orientation birefringences were respectively $9.0 \times 10^{-4}$ and $16.5 \times 10^{-4}$, and the absolute value of the ratio ΔOB/ΔF was 0.452.

Comparative Example 4

Measurement of Infrared Spectrum

Figure 5:
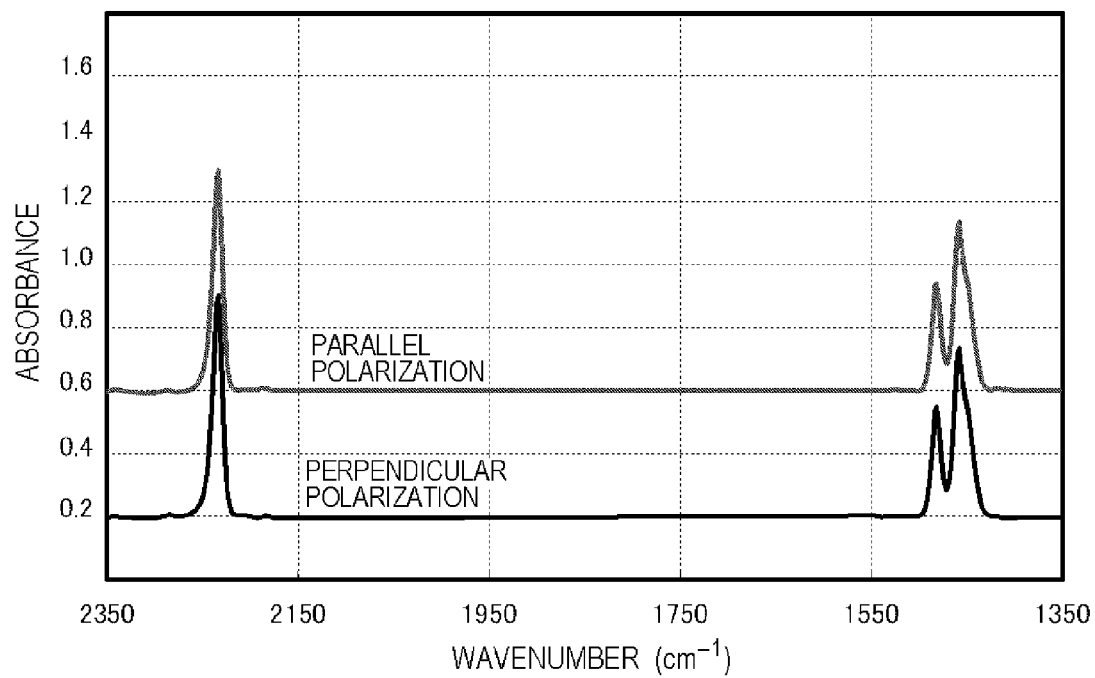
FIG. 5 illustrates an infrared spectrum of perpendicular polarized light and parallel polarized light of a 2.4-time stretched film in Comparative Example 4.

For the 1.4-times stretched film with a smooth surface in Example 12, the dichroic ratio calculated from the absorbance ratio based on a baseline of a peak at a wavenumber of 1,456 cm$^{-1}$ in an infrared spectrum was 1.000, and the dichroic ratio which was not measured but calculated from Equation (14) was 0. Furthermore, for the 2.4-times stretched film with a smooth surface, the dichroic ratio calculated from the absorbance ratio of a peak at a wavenumber of 1,455 cm$^{-1}$ in an infrared spectrum was 0.999, the value calculated by substituting values into Equation (12) was 0.0003, and the orientation state could not be measured. An infrared spectrum of perpendicular polarized light and parallel polarized light of the 2.4-times stretched film is illustrated in FIG. 5.

Comparative Example 5

Examination of Stress Birefringence of Injection-Molded Product

The polymer 12 synthesized in Comparative Example 1 was subjected to injection molding while adjusting molding conditions, and thus 50 molded products were prepared. When the stress birefringence in the plane direction of the molded product was observed with a distortion-inspection gauge, the stress birefringence was observed at the end portion in all molded products although the degree was different.

Example 24

Synthesis of Polymer 15

A tetrahydrofuran solution of a polymerization catalyst, Mo(N-2,6-Pr$^i_2$C$_6$H$_3$)(CHCMe$_2$Ph)(OBu$^t$)$_2$ (18 mg), was added to a tetrahydrofuran solution of two kinds of monomers consisting of 5-cyano-bicyclo[2.2.1]hept-2-ene (24.9 g) and 8-cyano-tetracyclo[4.4.0.1$^{2,5}$.1$^{7,10}$]-3-dodecene (16.5 g), and 1-hexene (8.5 g), and ring-opening metathesis polymerization was carried out by consuming monomers completely at 60 degrees centigrade. The olefin moiety of the polymer thus obtained was subjected to a hydrogenation reaction using a hydrogenation catalyst (Ph$_3$P)$_3$CORuHCl (18.4 mg) and triethylamine (5.9 mg) at 125 degrees centigrade under hydrogen pressure, and thus a tetrahydrofuran solution of a copolymer of poly(1-cyano-3,5-cyclopentylene ethylene)/(3-cyano-7,9-tricyclo[4.3.0.1$^{2,5}$]decanylene ethylene) was obtained. The solution was added to methanol, and a white polymer was separated by filtration and was dried. Thus, 41 g of a polymer 15 was obtained. The hydrogenation rate was 100%, the composition ratio [A]/[B] was 70/30, the weight average molecular weight (Mw) was 63,000, the molecular weight distribution (Mw/Mn) was 2.71, and the glass transition temperature was 117 degrees centigrade.

Example 25

Synthesis of Polymer 16

40 g of a polymer 16 was obtained in the same manner as in Example 1, except that the molar ratio of two kinds of monomers in Example 24 was changed to [A]/[B]=10/90. The hydrogenation rate was 100%, the composition ratio [A]/[B] was 10/90, the weight average molecular weight (Mw) was 65,000, the molecular weight distribution (Mw/Mn) was 2.83, and the glass transition temperature was 206 degrees centigrade.

Example 26

Synthesis of Polymer 17

A tetrahydrofuran solution of Mo(N-2,6-Pr$^i_2$C$_6$H$_3$)(CHCMe$_2$Ph)(OBu$^t$)$_2$(17 mg) was added to a tetrahydrofuran solution of two kinds of monomers consisting of 5,5,6-trifluoro-6-trifluoromethyl-bicyclo[2.2.1]hept-2-ene (21.3 g) and 8,8,9-trifluoro-9-trifluoromethyl-tetracyclo[4.4.0.1$^{2,5}$.1$^{7,10}$]-3-dodecene (18.5 g), and 1,5-hexadiene (0.36 g), and ring-opening metathesis polymerization was carried out by consuming monomers completely at 70 degrees centigrade. The olefin moiety of the polymer thus obtained was subjected to a hydrogenation reaction using a 5% palladium/alumina-supported hydrogenation catalyst (2.0 g) at 160 degrees centigrade under hydrogen pressure, and thus a tetrahydrofuran solution of a copolymer of poly(1,1,2-trifluoro-2-trifluoromethyl-3,5-cyclopentylene ethylene)/(3,3,4-trifluoro-4-trifluoromethyl-7,9-tricyclo[4.3.0.1$^{2,5}$]decanylene ethylene) was obtained. The solution was added to methanol, and a white polymer was separated by filtration and was dried. Thus, 39 g of a polymer 17 was obtained. The hydrogenation rate was 100%, the composition ratio [A]/[B] was 60/40, the weight average molecular weight (Mw) was 74,000, the molecular weight distribution (Mw/Mn) was 3.12, and the glass transition temperature was 138 degrees centigrade.

Example 27

Synthesis of Polymer 18

41 g of a polymer 18 was obtained in the same manner as in Example 24, except that the monomer of the structural unit [B] in Example 24 was changed to 8,8,9-trifluoro-9-trifluoromethyl-tetracyclo[4.4.0.1$^{2,5}$.1$^{7,10}$]-3-dodecene (25.5 g) and the feeding molar ratio was changed to [A]/[B]=60/40. The hydrogenation rate was 100%, the composition ratio [A]/[B] was 60/40, the weight average molecular weight (Mw) was 56,000, the molecular weight distribution (Mw/Mn) was 3.61, and the glass transition temperature was 129 degrees centigrade.

Example 28

Synthesis of Polymer 19

Figure 6:
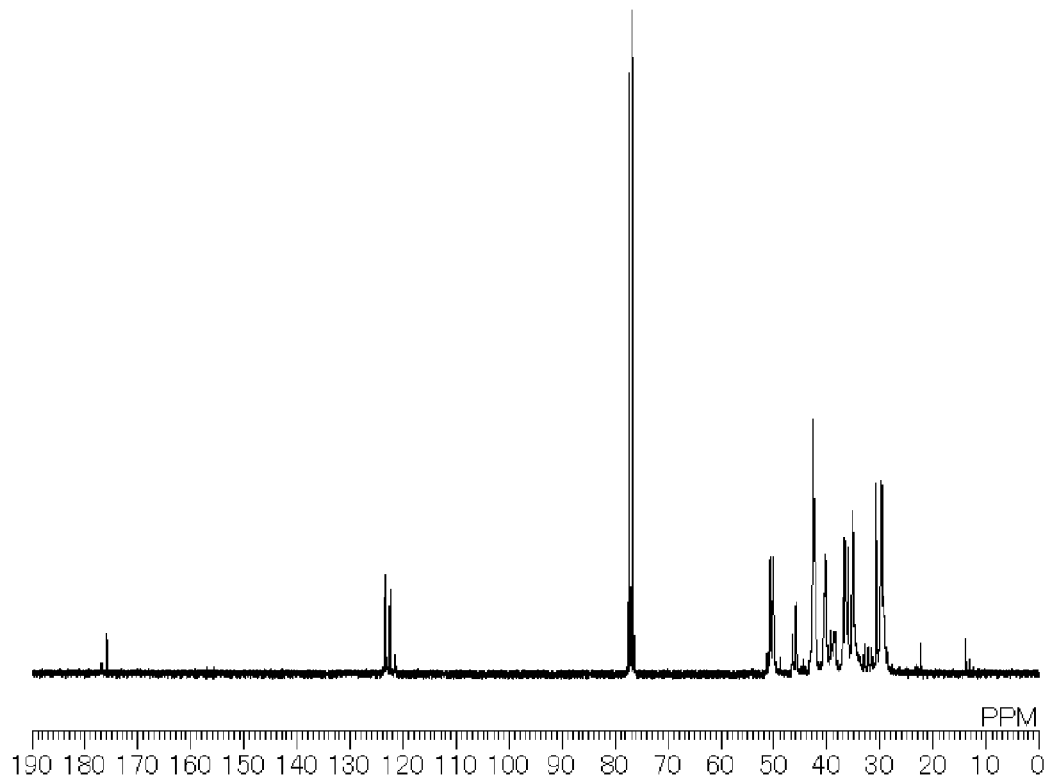
FIG. 6 illustrates a $^{13}$C-NMR spectrum of a cyclic olefin copolymer in Example 28.

A tetrahydrofuran solution of a polymerization catalyst, Mo(N-2,6-Pr$^i_2$C$_6$H$_3$)(CHCMe$_2$Ph)(OBu$^t$)$_2$ (18 mg), was added to a tetrahydrofuran solution of three kinds of monomers consisting of 5-cyano-bicyclo[2.2.1]hept-2-ene (7.7 g), 8-cyano-tetracyclo[4.4.0.1$^{2,5}$.1$^{7,10}$]-3-dodecene (28.5 g) and 5-methoxycarbonyl-bicyclo[2.2.1]hept-2-ene (5.8 g), and 1-hexene (7.4 g), and ring-opening metathesis polymerization was carried out by consuming monomers completely at 60 degrees centigrade. The olefin moiety of the polymer thus obtained was subjected to a hydrogenation reaction using a hydrogenation catalyst (Ph$_3$P)$_3$CORuHCl (18.4 mg) and triethylamine (5.9 mg) at 125 degrees centigrade under hydrogen pressure, and thus a tetrahydrofuran solution of a copolymer of poly(1-cyano-3,5-cyclopenLylerine ethylene)/(3-cyano-7,9-tricyclo[4.3.0.1$^{2,5}$]decanylene ethylene)/(1-methoxycarbonyl-3,5-cyclopentylene ethylene) was obtained. The solution was added to methanol, and a white polymer was separated by filtration and was dried. Thus, 41 g of a polymer 19 was obtained. The hydrogenation rate was 100%, the composition ratio [A]/[B]/[C] was 25/60/15 ([A]/[B]=30/70, [C]/([A]+[B])=15/85), the weight average molecular weight (Mw) was 62,000, the molecular weight distribution (Mw/Mn) was 2.99, and the glass transition temperature was 145 degrees centigrade. Furthermore, a $^{13}$C-NMR spectrum of the polymer 19 is illustrated in FIG. 6.

Example 29

Synthesis of Polymer 20

39 g of a polymer 20 was obtained in the same manner as in Example 28, except that the molar ratio of three kinds of monomers in Example 28 was changed to [A]/[B]/[C]=17/68/15. The hydrogenation rate was 100%, the composition ratio [A]/[B]/[C] was 17/68/15 ([A]/[B]=20/80, [C]/([A]+[B])=15/85), the weight average molecular weight (Mw) was 63,000, the molecular weight distribution (Mw/Mn) was 2.98, and the glass transition temperature was 158 degrees centigrade.

Example 30

Synthesis of Polymer 21

40 g of a polymer 21 was obtained in the same manner as in Example 28, except that the monomer of the structural unit [C] in Example 28 was changed to 5-methyl-bicyclo[2.2.1]hept-2-ene (2.6 g) and the molar ratio of three kinds of monomers was changed to [A]/[B]/[C]=18/72/10. The hydrogenation rate was 100%, the composition ratio [A]/[B]/[C] was 18/72/10 ([A]/[B]=20/80, [C]/([A]+[B])=10/90), the weight average molecular weight (Mw) was 67,000, the molecular weight distribution (Mw/Mn) was 2.95, and the glass transition temperature was 172 degrees centigrade.

Example 31

Synthesis of Polymer 22

38 g of a polymer 22 was obtained in the same manner as in Example 28, except that the monomer of the structural unit [C] in Example 28 was changed to bicyclo[2.2.1]hept-2-ene (1.1 g) and the molar ratio of three kinds of monomers was changed to [A]/[B]/[C]=19/76/5. The hydrogenation rate was 100%, the composition ratio [A]/[B]/[C] was 19/76/5 ([A]/[B]=20/80, [C]/([A]+[B])=5/95), the weight average molecular weight (Mw) was 64,000, the molecular weight distribution (Mw/Mn) was 2.92, and the glass transition temperature was 180 degrees centigrade.

Example 32

Synthesis of Polymer 23

A tetrahydrofuran solution of Mo(N-2,6-Pr$^i_2$C$_6$H$_3$)(CHCMe$_2$Ph)(OBu$^t$)$_2$ (17 mg) was added to a tetrahydrofuran solution of three kinds of monomers consisting of 5,5,6-trifluoro-6-trifluoromethyl-bicyclo[2.2.1]hept-2-ene (6.2 g), 8,8,9-trifluoro-9-trifluoromethyl-tetracyclo[4.4.0.1$^{2,5}$.1$^{7,10}$]-3-dodecene (32.6 g) and 5-methoxycarbonyl-bicyclo[2.2.1]hept-2-ene (2.4 g), and 1,5-hexadiene (0.26 g), and ring-opening metathesis polymerization was carried out by consuming monomers completely at 70 degrees centigrade. The olefin moiety of the polymer thus obtained was subjected to a hydrogenation reaction using a 5% palladium/alumina-supported hydrogenation catalyst (2.1 g) at 160 degrees centigrade under hydrogen pressure, and thus a tetrahydrofuran solution of a copolymer of poly(1,1,2-trifluoro-2-trifluoromethyl-3,5-cyclopentylene ethylene)/(3,3,4-trifluoro-4-trifluoromethyl-7,9-tricyclo[4.3.0.1$^{2,5}$]decanylene ethylene)/(1-methoxycarbonyl-3,5-cyclopentylene ethylene) was obtained. The solution was added to methanol, and a white polymer was separated by filtration and was dried. Thus, 40 g of a polymer 23 was obtained. The hydrogenation rate was 100%, the composition ratio [A]/[B]/[C] was 18/72/10 ([A]/[B]=20/80, [C]/([A]+[B])=10/90), the weight average molecular weight (Mw) was 72,000, the molecular weight distribution (Mw/Mn) was 3.24, and the glass transition temperature was 144 degrees centigrade.

Example 33

Synthesis of Polymer 24

45 g of a polymer 24 was obtained in the same manner as in Example 28, except that the monomer of the strucLural uniL [C] in Example 28 was changed to 8-methoxycarbonyl-tetracyclo[4.4.0.1$^{2,5}$.1$^{7,10}$]-3-dodecene (8.3 g) and the molar ratio of three kinds of monomers was changed to [A]/[B]/[C]=17/68/15. The hydrogenation rate was 100%, the composition ratio [A]/[B]/[C] was 17/68/15 ([A]/[B]=20/80, [C]/([A]+[B])=15/85), the weight average molecular weight (Mw) was 64,000, the molecular weight distribution (Mw/Mn) was 2.91, and the glass transition temperature was 184 degrees centigrade.

Example 34

Synthesis of Polymer 25

43 g of a polymer 25 was obtained in the same manner as in Example 32, except that the monomer of the structural unit [C] in Example 32 was changed to 8-methoxycarbonyl-tetracyclo[4.4.0.1$^{2,5}$.1$^{7,10}$]-3-dodecene (5.5 g) and the molar ratio of the monomer was changed to [A]/[B]/[C]=17/68/15. The hydrogenation rate was 100%, the composition ratio [A]/[B]/[C] was 17/68/15 ([A]/[B]=20/80, [C]/([A]+[B])=15/85), the weight average molecular weight (Mw) was 71,000, the molecular weight distribution (Mw/Mn) was 3.11, and the glass transition temperature was 165 degrees centigrade.

Example 35

A cyclohexane solution prepared by dissolving the polymer 15 synthesized in Example 24 at a concentration of 20 mass % was coated on a glass substrate and was uniformly coated using an applicator. Then, the coated substrate was dried at 180 degrees centigrade for minutes and was detached, whereby a film having a thickness of 40.6 μm with a smooth surface was obtained. The absolute value of the photoelastic constant of the same film was $6.7 \times 10^{-12}$ Pa$^{-1}$. For the film with a smooth surface which was stretched by 1.2 times and 1.7 times at 137 degrees centigrade, the dichroic ratios calculated from the peak intensity ratios at Raman shift of 1,451 cm$^{-1}$ were respectively 1.015 and 1.019, the absolute values of the orientation coefficients were respectively 0.0049 and 0.0064, the absolute values of the orientation birefringences were respectively $3.3 \times 10^{-4}$ and $4.3 \times 10^{-4}$, and the absolute value of the ratio ΔOB/ΔF was 0.067.

Example 36

A film having a thickness of 40.8 μm with a smooth surface was obtained in the same manner as in Example 35 using the polymer 16 synthesized in Example 25. For the film with a smooth surface which was stretched by 1.3 times and 1.8 times at 226 degrees centigrade, the dichroic ratios calculated from the peak intensity ratios at Raman shift of 1,451 cm$^{-1}$ were respectively 1.005 and 1.007, the absolute values of the orientation coefficients were respectively 0.0017 and 0.0023, the absolute values of the orientation birefringences were respectively $0.3 \times 10^{-4}$ and $0.4 \times 10^{-4}$, and the absolute value of the ratio ΔOB/ΔF was 0.017.

Example 37

A film having a thickness of 40.5 μm with a smooth surface was obtained in the same manner as in Example 35 using the polymer 17 synthesized in Example 26. For the film with a smooth surface which was stretched by 1.2 times and 1.6 times at 158 degrees centigrade, the dichroic ratios calculated from the peak intensity ratios at Raman shift of 1,452 cm$^{-1}$ were respectively 1.005 and 1.007, the absolute values of the orientation coefficients were respectively 0.0016 and 0.0022, the absolute values of the orientation birefringences were respectively $3.1 \times 10^{-4}$ and $4.2 \times 10^{-4}$, and the absolute value of the ratio ΔOB/ΔF was 0.183.

Example 38

A film having a thickness of 40.2 μm with a smooth surface was obtained in the same manner as in Example 35 using the polymer 18 synthesized in Example 27. For the film with a smooth surface which was stretched by 1.2 times and 1.4 times at 149 degrees centigrade, the dichroic ratios calculated from the peak intensity ratios at Raman shift of 1,452 cm$^{-1}$ were respectively 1.014 and 1.272, the absolute values of the orientation coefficients were respectively 0.0045 and 0.0090, the absolute values of the orientation birefringences were respectively $1.8 \times 10^{-4}$ and $3.6 \times 10^{-4}$, and the absolute value of the ratio $\Delta OB/\Delta F$ was 0.040.

Example 39

A film having a thickness of 40.9 μm with a smooth surface was obtained in the same manner as in Example 35 using the polymer 19 synthesized in Example 28. The absolute value of the photoelastic constant of the same film was $5.1 \times 10^{-12}$ $Pa^{-1}$. For the film with a smooth surface which was stretched by 1.2 times and 1.4 times at 165 degrees centigrade, the dichroic ratios calculated from the peak intensity ratios at Raman shift of 1,451 $cm^{-1}$ were respectively 1.010 and 1.011, the absolute values of the orientation coefficients were respectively 0.0027 and 0.0037, the absolute values of the orientation birefringences were respectively $2.7 \times 10^{-4}$ and $3.7 \times 10^{-4}$, and the absolute value of the ratio $\Delta OB/\Delta F$ was 0.100.

Figure 7:
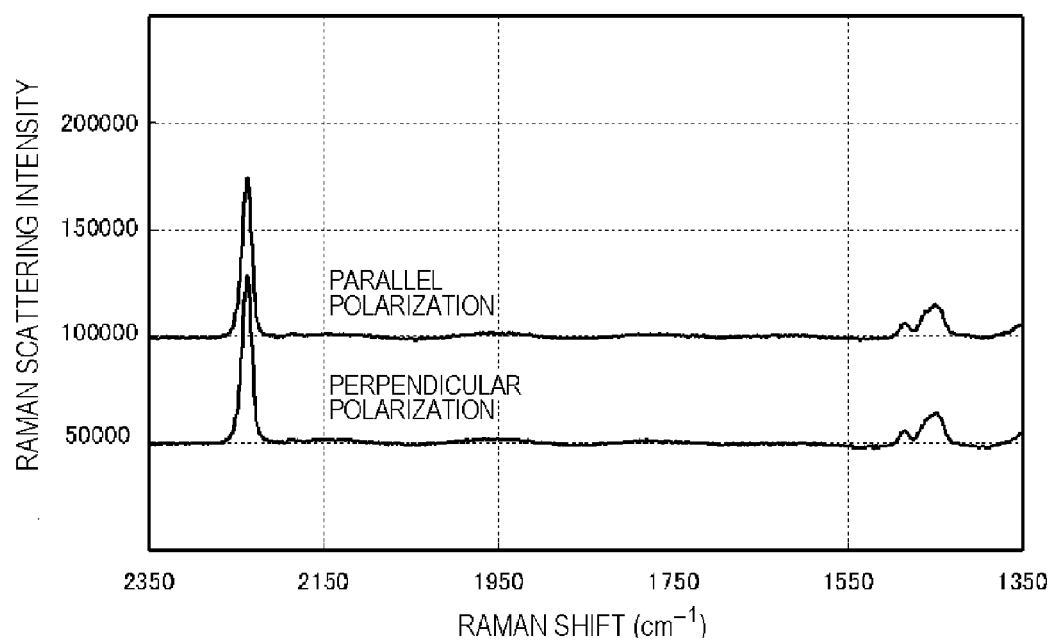
FIG. 7 illustrates a Raman spectrum of perpendicular polarized light and parallel polarized light of a 2.4-times stretched film in Example 28.

Furthermore, for the film with a smooth surface which was stretched by 2.4 times at the same temperature, the dichroic ratio calculated from the peak intensity ratio at Raman shift of 1,451 $cm^{-1}$ was 1.014, the absolute value of the orientation coefficient was 0.0048, and the absolute value of the orientation birefringence was $4.8 \times 10^{-4}$. A Raman spectrum of perpendicular polarized light and parallel polarized light of the 2.4-times stretched film is illustrated in FIG. 7.

Example 40

A film having a thickness of 40.1 μm with a smooth surface was obtained in the same manner as in Example 35 using the polymer 20 synthesized in Example 29. For the film with a smooth surface which was stretched by 1.2 times and 1.5 times at 178 degrees centigrade, the dichroic ratios calculated from the peak intensity ratios at Raman shift of 1,452 $cm^{-1}$ were respectively 1.015 and 1.021, the absolute values of the orientation coefficients were respectively 0.0049 and 0.0069, the absolute values of the orientation birefringences were respectively $2.9 \times 10^{-4}$ and $4.2 \times 10^{-4}$, and the absolute value of the ratio $\Delta OB/\Delta F$ was 0.065.

Example 41

A film having a thickness of 39.1 μm with a smooth surface was obtained in the same manner as in Example 35 using the polymer 21 synthesized in Example 30. The absolute value of the photoelastic constant of the same film was $3.7 \times 10^{-12}$ $Pa^{-1}$. For the film with a smooth surface which was stretched by 1.2 times and 1.5 times at 192 degrees centigrade, the dichroic ratios calculated from the peak intensity ratios at Raman shift of 1,452 $cm^{-1}$ were respectively 1.006 and 1.015, the absolute values of the orientation coefficients were respectively 0.0020 and 0.0029, the absolute values of the orientation birefringences were respectively $2.1 \times 10^{-4}$ and $2.9 \times 10^{-4}$, and the absolute value of the ratio $\Delta OB/\Delta F$ was 0.089.

Example 42

A film having a thickness of 39.6 μm with a smooth surface was obtained in the same manner as in Example 35 using the polymer 22 synthesized in Example 31. The absolute value of the photoelastic constant of the same film was $4.1 \times 10^{-12}$ $Pa^{-1}$. For the film with a smooth surface which was stretched by 1.2 times and 1.6 times at 200 degrees centigrade, the dichroic ratios calculated from the peak intensity ratios at Raman shift of 1,452 $cm^{-1}$ were respectively 1.012 and 1.015, the absolute values of the orientation coefficients were respectively 0.0039 and 0.0051, the absolute values of the orientation birefringences were respectively $1.9 \times 10^{-4}$ and $2.5 \times 10^{-4}$, and the absolute value of the ratio $\Delta OB/\Delta F$ was 0.050.

Example 43

A film having a thickness of 41.1 μm with a smooth surface was obtained in the same manner as in Example 35 using the polymer 23 synthesized in Example 32. The absolute value of the photoelastic constant of the same film was $6.9 \times 10^{-12}$ $Pa^{-1}$. For the film with a smooth surface which was stretched by 1.1 times and 1.3 times at 164 degrees centigrade, the dichroic ratios calculated from the peak intensity ratios at Raman shift of 1,452 $cm^{-1}$ were respectively 1.005 and 1.006, the absolute values of the orientation coefficients were respectively 0.0017 and 0.0020, the absolute values of the orientation birefringences were respectively $3.5 \times 10^{-4}$ and $4.1 \times 10^{-4}$, and the absolute value of the ratio $\Delta OB/\Delta F$ was 0.200.

Example 44

A film having a thickness of 39.9 μm with a smooth surface was obtained in the same manner as in Example 35 using the polymer 24 synthesized in Example 33. The absolute value of the photoelastic constant of the same film was $5.9 \times 10^{-12}$ $Pa^{-1}$. For the film with a smooth surface which was stretched by 1.2 times and 1.5 times at 204 degrees centigrade, the dichroic ratios calculated from the peak intensity ratios at Raman shift of 1,452 $cm^{-1}$ were respectively 1.007 and 1.011, the absolute values of the orientation coefficients were respectively 0.0024 and 0.0038, the absolute values of the orientation birefringences were respectively $1.2 \times 10^{-4}$ and $1.9 \times 10^{-4}$, and the absolute value of the ratio $\Delta OB/\Delta F$ was 0.050.

Example 45

A film having a thickness of 40.5 μm with a smooth surface was obtained in the same manner as in Example 35 using the polymer 25 synthesized in Example 34. The absolute value of the photoelastic constant of the same film was $6.5 \times 10^{-12}$ $Pa^{-1}$. For the film with a smooth surface which was stretched by 1.3 times and 1.6 times at 185 degrees centigrade, the dichroic ratios calculated from the peak intensity ratios at Raman shift of 1,451 $cm^{-1}$ were respectively 1.003 and 1.005, the absolute values of the orientation coefficients were respectively 0.0011 and 0.0017, the absolute values of the orientation birefringences were respectively $1.9 \times 10^{-4}$ and $3.1 \times 10^{-4}$, and the absolute value of the ratio $\Delta OB/\Delta F$ was 0.200.

For the films obtained in Examples 35 to 45, the absolute values of the orientation coefficients were equal to or more than 0.001 and the absolute values of the orientation birefringences were equal to or less than $5 \times 10^{-4}$. From the facts, it was considered that there could be obtained an optical film which was highly transparent and was excellent in the intensity or elastic modulus due to toughness, tensile and bending without the limitations of temperature and pressure conditions at the time of molding or the like.

Example 46

Examination of Stress Birefringence of Injection-Molded Product

The polymer 19 synthesized in Example 28 was subjected to injection molding, and thus 38 molded products were prepared in the same manner as in Example 23, except that the preset temperature of a heating and kneading section for melting the polymer and the preset temperature of the mold were set at a temperature which was 30 degrees centigrade lower than Example 23. When the stress birefringence in the plane direction of the molded product was observed with a distortion-inspection gauge, the stress birefringence was not observed in 20 molded products thus formed in which surface transcription was excellent and no shrinkage cavity was generated.

From the results, in the same as the polymer 1 of Example 23, according to the optical material in which the composition ratio [A]/[B] was 30/70 and the composition ratio [C]/([A]+[B]) was 15/85, the glass transition temperature was lowered, that is, 33 degrees centigrade and melt flowability became excellent, whereby even though each of the preset temperatures was lowered, it was confirmed that there could be obtained a molded product which was highly transparent and was excellent in the toughness without the limitations of temperature and pressure conditions at the time of molding or the like, and it could be widely applied to an optical lens. Furthermore, it was considered that molded products obtained from the polymers synthesized in Examples 28 to 34 also exhibited the same results.

Comparative Example 6

Synthesis of Polymer 26 and Measurement of Birefringence

A tetrahydrofuran solution of a polymerization catalyst, $Mo(N-2,6-Pr^i{}_2C_6H_3)(CHCMe_2Ph)(OBu^t)_2$ (18 mg), was added to a tetrahydrofuran solution of two kinds of monomers consisting of 5-methyl-bicyclo[2.2.1]hept-2-ene (5.4 g) and 8-methyl-tetracyclo[$4.4.0.1^{2,5}.1^{7,10}$]-3-dodecene (35.1 g), and 1-hexene (7.3 g), and ring-opening metathesis polymerization was carried out by consuming monomers completely at 60 degrees centigrade. The olefin moiety of the polymer thus obtained was subjected to a hydrogenation reaction using a hydrogenation catalyst $(Ph_3P)_3CORuHCl$ (18.4 mg) and triethylamine (5.9 mg) at 125 degrees centigrade under hydrogen pressure, and thus a tetrahydrofuran solution of a copolymer of poly(1-methyl-3,5-cyclopentylene ethylene)/(3-methyl-7,9-tricyclo[$4.3.0.1^{2,5}$]decanylene ethylene) was obtained. The solution was added to methanol, and a white polymer was separated by filtration and was dried. Thus, 40 g of a polymer 26 was obtained. The hydrogenation rate was 100%, the composition ratio [A]/[B] was 20/80, the weight average molecular weight (Mw) was 52,000, the molecular weight distribution (Mw/Mn) was 2.37, and the glass transition temperature was 129 degrees centigrade.

Subsequently, a film having a thickness of 39.4 μm with a smooth surface was obtained in the same manner as in Example 35. The absolute value of the photoelastic constant of the same film was $1.3 \times 10^{-12}$ $Pa^{-1}$. For the film with a smooth surface which was stretched by 1.2 times and 1.4 times at 149 degrees centigrade, the dichroic ratios calculated from the peak intensity ratios at Raman shift of 1,450 $cm^{-1}$ were respectively 1.004 and 1.009, the absolute values of the orientation coefficients were respectively 0.0014 and 0.0029, the absolute values of the orientation birefringences were respectively $5.3 \times 10^{-4}$ and $10.9 \times 10^{-4}$, and the absolute value of the ratio ΔOB/ΔF was 0.373.

Comparative Example 7

Synthesis of Polymer 27 and Measurement of Birefringence

A tetrahydrofuran solution of a polymerization catalyst, $Mo(N-2,6-Pr^i{}_2C_6H_3)(CHCMe_2Ph)(OBu^t)_2$ (18 mg), was added to a tetrahydrofuran solution of two kinds of monomers consisting of 5-methoxycarbonyl-bicyclo[2.2.1]hept-2-ene (9.0 g) and 8-methoxycarbonyl-tetracyclo[$4.4.0.1^{2,5}.1^{7,10}$]-3-dodecene (30.1 g), and 1-hexene (5.7 g), and ring-opening metathesis polymerization was carried out by consuming monomers completely at 60 degrees centigrade. The olefin moiety of the polymer thus obtained was subjected to a hydrogenation reaction using a hydrogenation catalyst $(Ph_3P)_3CORuHCl$ (18.4 mg) and triethylamine (5.9 mg) at 125 degrees centigrade under hydrogen pressure, and thus a tetrahydrofuran solution of a copolymer of poly(1-methoxycarbonyl-3,5-cyclopentylene ethylene)/(3-methoxycarbonyl-7,9-tricyclo[$4.3.0.1^{2,5}$]decanylene ethylene) was obtained. The solution was added to methanol, and a white polymer was separated by filtration and was dried. Thus, 39 g of a polymer 27 was obtained. The hydrogenation rate was 100%, the composition ratio [A]/[B] was 30/70, the weight average molecular weight (Mw) was 51,000, the molecular weight distribution (Mw/Mn) was 2.66, and the glass transition temperature was 113 degrees centigrade.

Subsequently, a film having a thickness of 40.1 μm with a smooth surface was obtained in the same manner as in Example 35. The absolute value of the photoelastic constant of the same film was $12.8 \times 10^{-12}$ $Pa^{-1}$. For the film with a smooth surface which was stretched by 1.1 times and 1.4 times at 133 degrees centigrade, the dichroic ratios calculated from the peak intensity ratios at Raman shift of 1,450 $cm^{-1}$ were respectively 1.006 and 1.014, the absolute values of the orientation coefficients were respectively 0.0020 and 0.0045, the absolute values of the orientation birefringences were respectively $8.1 \times 10^{-4}$ and $18.4 \times 10^{-4}$, and the absolute value of the ratio ΔOB/ΔF was 0.412.

Comparative Example 8

Synthesis of Polymer 28 and Measurement of Birefringence

A tetrahydrofuran solution of a polymerization catalyst, $Mo(N-2,6-M_2C_6H_3)(CHCMe_2Ph)(OBu^t)_2$ (18 mg), was added to a tetrahydrofuran solution of a monomer of 5-methoxycarbonyl-bicyclo[2.2.1]hept-2-ene (45.0 g) and 1-hexene (8.8 g), and ring-opening metathesis polymerization was carried out by consuming monomers completely at 60 degrees centigrade. The olefin moiety of the polymer thus obtained was subjected to a hydrogenation reaction in the same manner as in Example 24, and thus a tetrahydrofuran solution of poly(1-methoxycarbonyl-3,5-cyclopentylene ethylene) was obtained. The solution was added to methanol, and a white polymer was separated by filtration and was dried. Thus, 43 g of a polymer 28 was obtained. The hydrogenation rate was 100%, the weight average molecular weight (Mw) was 49,000, the molecular weight distribution (Mw/Mn) was 2.69, and the glass transition temperature was 41 degrees centigrade.

Subsequently, a film having a thickness of 39.9 μm with a smooth surface was obtained in the same manner as in Example 35 using the polymer 28. For the film with a smooth surface which was stretched by 1.2 times and 1.4 times at 61 degrees centigrade, the dichroic ratios calculated from the peak intensity ratios at Raman shift of 1,450 cm$^{-1}$ were respectively 1.004 and 1.008, the absolute values of the orientation coefficients were respectively 0.0012 and 0.0026, the absolute values of the orientation birefringences were respectively 10.1×10$^{-4}$ and 22.4×10$^{-4}$, and the absolute value of the ratio ΔOB/ΔF was 0.879.

The present invention also includes the following aspects.

(a) An optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the ratio ΔOB/ΔF is from 0.001 to 0.250 in which ΔOB represents the amount of a change in the absolute value of the orientation birefringence calculated from the phase difference (nm) at a wavelength of 633 nm/film thickness (μm) in a stretched film obtained from the optical material, and ΔF represents the amount of a change in the absolute value of the orientation coefficient F=(D−1)/(D+2) that is a function of the dichroic ratio D=I$_∥$/I$_⊥$ of parallel light intensity I$_∥$ to perpendicular light intensity I$_⊥$, each relative to the orientation direction at 1,500 to 1,400 cm$^{-1}$ according to Raman spectroscopy in a molded product obtained from the optical material,

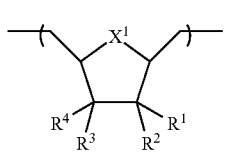

(1)

wherein, in the formula (1), at least one of R$^1$ to R$^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when R$^1$ to R$^4$ are groups containing no fluorine or groups containing no cyano, R$^1$ to R$^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; R$^1$ to R$^4$ may be bonded to each other to form a ring structure; and X$^1$ is selected from —O—, —S—, —NR$^5$—, —PR$^5$— and —CR$^5$R$^6$— (R$^5$ and R$^6$ each independently represent hydrogen or alkyl having 1 to 20 carbon atoms),

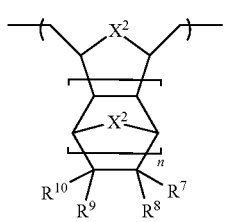

(2)

wherein, in the formula (2), at least one of R$^7$ to R$^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when R$^7$ to R$^{10}$ are groups containing no fluorine or groups containing no cyano, R$^7$ to R$^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; R$^7$ to R$^{10}$ may be bonded to each other to form a ring structure; X$^2$ is selected from —O—, —S—, —NR$^{11}$—, —PR$^{11}$— and —CR$^{11}$R$^{12}$— (R$^{11}$ and R$^{12}$ each independently represent hydrogen or alkyl having 1 to 20 carbon atoms), and may be identical with or different from each other; and n represents 1 to 3.

(b) The optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99 according to (a), wherein the absolute value of the orientation coefficient F=(D−1)/(D+2) that is a function of the dichroic ratio D=I$_∥$/I$_⊥$ of parallel light intensity I$_∥$ to perpendicular light intensity I$_⊥$, each relative to the orientation direction at 1,500 to 1,400 cm$^{-1}$ according to Raman spectroscopy in a molded product obtained from the optical material is equal to or more than 0.001, and the absolute value of the orientation birefringence calculated from the phase difference (nm) at a wavelength of 633 nm/film thickness (μm) in a stretched film obtained from the optical material is equal to or less than 5×10$^{-4}$.

(c) The optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99 according to (a) or (b), wherein the absolute value of the photoelastic constant obtained from the following Equation (12) is equal to or less than 7×10$^{-12}$ Pa$^{-1}$ when a tensile force of maximum 2N is applied at a rate of 0.1 mm/min to measure the phase difference at a wavelength of 633 nm in a film obtained from the optical material.

Equation: Photoelastic constant (Pa$^{-1}$)=ΔR (nm)/ΔP (N)×film width (mm) (12)

(ΔRe: amount of a change in the phase difference, ΔP: amount of a change in the tensile force in the range in which the phase difference linearly increases with the application of the stress)

(d) An optical film obtained by stretching a film consisting of an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the orientation coefficient F=(D−1)/(D+2) that is a function of the dichroic ratio D=I$_∥$/I$_⊥$ of parallel light intensity I$_∥$ to perpendicular light intensity I$_⊥$, each relative to the orientation direction at 1,500 to 1,400 cm$^{-1}$ according to Raman spectroscopy is equal to or more than 0.001, and the absolute value of the orientation birefringence calculated from the phase difference (nm) at a wavelength of 633 nm/film thickness (μm) is equal to or less than 5×10$^{-4}$,

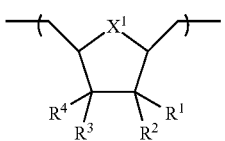

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; $R^1$ to $R^4$ may be bonded to each other to form a ring structure; and $X^1$ is selected from —O—, —S—, —NR$^5$—, —PR$^5$— and —CR$^5$R$^6$— ($R^5$ and $R^6$ each independently represent hydrogen or alkyl having 1 to 20 carbon atoms),

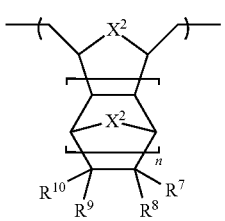

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; $R^7$ to $R^{10}$ may be bonded to each other to form a ring structure; $X^2$ is selected from —O—, —S—, —NR$^{11}$—, —PR$^{11}$— and —CRR$^{12}$— ($R^{11}$ and $R^{12}$ each independently represent hydrogen or alkyl having 1 to 20 carbon atoms), and may be identical with or different from each other; and n represents 1 to 3.

(e) An optical lens obtained by molding an optical material including a cyclic olefin copolymer containing at least a repeating structural unit [A] represented by the general formula (1) and a repeating structural unit [B] represented by the general formula (2) and having a molar ratio [A]/[B] of from 95/5 to 1/99 in which the absolute value of the photoelastic constant obtained from the following Equation (12) is equal to or less than $7 \times 10^{-12}$ Pa$^{-1}$ when a tensile force of maximum 2N is applied at a rate of 0.1 mm/min to measure the phase difference at a wavelength of 633 nm in the obtained film, Equation: Photoelastic constant $(Pa^{-1}) = \Delta Re(nm)/\Delta P (N) \times$ film width (mm)  (12)

($\Delta Re$: amount of a change in the phase difference, $\Delta P$: amount of a change in the tensile force in the range in which the phase difference linearly increases with the application of the stress)

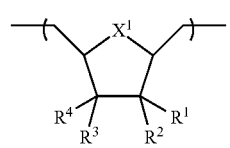

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when $R^1$ to $R^4$ are groups containing no fluorine or groups containing no cyano, $R^1$ to $R^4$ are each selecLed from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; $R^1$ to $R^4$ may be bonded to each other to form a ring structure; and $X^1$ is selected from —O—, —S—, —NR$^5$—, —PR$^5$— and —CR$^5$R$^6$— ($R^5$ and $R^6$ each independently represent hydrogen or alkyl having 1 to 20 carbon atoms),

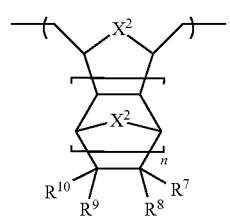

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, cyano or cyano-containing alkyl having 2 to 10 carbon atoms; when $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms or alkoxycarbonylalkyl having 3 to 10 carbon atoms; $R^7$ to $R^{10}$ may be bonded to each other to form a ring structure; $X^2$ is selected from —O—, —S—, —NR$^1$—, —PR$^1$— and —CR$^{11}$R$^{12}$— ($R^{11}$ and $R^{12}$ each independently represent hydrogen or alkyl having 1 to 20 carbon atoms), and may be identical with or different from each other; and n represents 1 to 3.

Industrial Applicability

The optical material of the present invention having very low orientation birefringence and photoelastic constant, and its molded product are useful as an optical film for use in an electronic device material of an anti-reflective filter, a recording medium, a display material, an organic EL or liquid crystal plastic member or the like; and an optical lens such as a micro lens, a pick-up lens, an imaging lens, an optical element (such as a micro lens array, an optical waveguide, an optical switching, a Fresnel zone plate, a binary optical element and a blaze diffractive optical element) or the like, and are industrially highly valuable.

The invention claimed is:

1. An optical film having a thickness equal to or more than 10 μm and equal to or less than 500 μm comprising a cyclic olefin copolymer containing at least a repeating structural unit [A] represented by the general formula (1) and a repeating structural unit [B] represented by the general formula (2) and having a molar ratio [A]/[B] of from 95/5 to 1/99,
wherein the absolute value of the ratio ΔOB/ΔF is from 0.001 to 0.250 in which ΔOB represents the amount of a change in the absolute value of the orientation birefringence calculated from the phase difference (nm) at a wavelength of 633 nm/film thickness (μm) in a stretched film obtained from said cyclic olefin copolymer, and ΔF represents the amount of a change in the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy in a molded product obtained from said cyclic olefin copolymer,

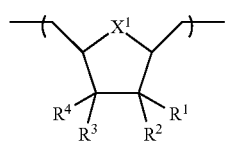

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —NR$^5$—, —PR$^5$— and —CR$^5$R$^6$—, $R^5$ and $R^6$ each independently represent hydrogen or alkyl having 1 to 20 carbon atoms,

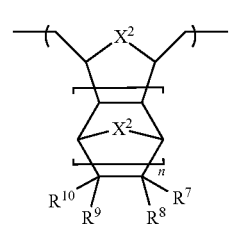

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —NR$^{11}$—, —PR$^{11}$— and —CR$^{11}$R$^{12}$—, $R^{11}$ and $R^{12}$ each independently represent hydrogen or alkyl having 1 to 20 carbon atoms, and may be identical with or different from each other; and n represents 1 to 3,
wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 cm$^{-1}$ according to Raman spectroscopy in a molded product obtained from said cyclic olefin copolymer is equal to or more than 0.001, and
the absolute value of the orientation birefringence calculated from the phase difference (nm) at a wavelength of 633 nm/film thickness (μm) in a stretched film obtained from said cyclic olefin copolymer is equal to or less than $5 \times 10^{-4}$.

2. An optical film having a thickness equal to or more than 10 μm and equal to or less than 500 μm comprising a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the ratio ΔOB/ΔF is from 0.001 to 0.250 in which ΔOB represents the amount of a change in the absolute value of the orientation birefringence calculated from the phase difference (nm) at a wavelength of 633 nm/film thickness (μm) in a stretched film obtained from said cyclic olefin copolymer, and ΔF represents the amount of a change in the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_{195}$, each relative to the orientation direction at 1,500 to 1,400 $cm^{-1}$ according to Raman spectroscopy in a molded product obtained from said cyclic olefin copolymer,

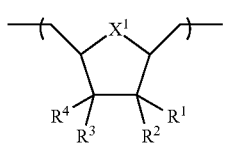

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —NR$^5$—, —PR$^5$— and —CR$^5$R$^6$—, $R^5$ and $R^6$ each independently represent hydrogen or alkyl having 1 to 20 carbon atoms,

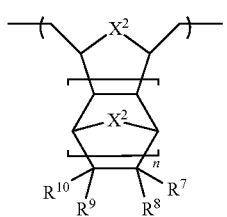

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —NR$^{11}$—, —PR$^{11}$— and —CR$^{11}$R$^{12}$—, $R^{11}$ and $R^{12}$ each independently represent hydrogen or alkyl having 1 to 20 carbon atoms, and may be identical with or different from each other; and n represents 1 to 3,

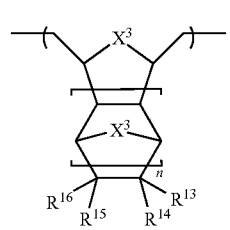

(3)

wherein, in the formula (3), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3to 10carbon atoms or aryloxycarbonylalkyl having 8 to 20 carbon atoms; $R^{13}$ to $R^{16}$ may be bonded to each other to form a ring structure; $X^3$ is selected from —O—, —S—, —NR$^{17}$—, —PR$^{18}$— and —CR$^{17}$R$^{18}$—, $R^{17}$ and $R^{18}$ each independently represent hydrogen or alkyl having 1 to 20 carbon atoms, and may be identical with or different from each other; and n represents 0 or 1, wherein the absolute value of the orientation coefficient $F=(D-1)/(D+2)$ that is a function of the dichroic ratio $D=I_\parallel/I_\perp$ of parallel light intensity $I_\parallel$ to perpendicular light intensity $I_\perp$, each relative to the orientation direction at 1,500 to 1,400 $cm^{-1}$ according to Raman spectroscopy in a molded product obtained from said cyclic olefin copolymer is equal to or more than 0.001, and the absolute value of the orientation birefringence calculated from the phase difference (nm) at a wavelength of 633 nm/film thickness (μm) in a stretched film obtained from said cyclic olefin copolymer is equal to or less than $5 \times 10^{-4}$.

3. The optical film as set forth in claim 1 comprising a cyclic olefin copolymer containing at least a repeating structural unit [A] represented by the general formula (1) and a repeating structural unit [B] represented by the general formula (2) and having a molar ratio [A]/[B] of from 95/5 to 1/99, wherein the absolute value of the photoelastic constant obtained from the following Equation (12) is equal to or less than $7 \times 10^{12}$ $Pa^{-1}$ when a tensile force of maximum 2 N is applied at a rate of 0.1 mm/min to measure the phase difference at a wavelength of 633 nm in a film obtained from said cyclic olefin copolymer, $$\text{Equation: Photoelastic constant } (Pa^{-1}) = \Delta Re(nm)/\Delta P \text{ (N)} \times \text{film width (mm)} \quad (12)$$

ΔRe: amount of a change in the phase difference, ΔP: amount of a change in the tensile force in the range in which the phase difference linearly increases with the application of the stress.

4. The optical film as set forth in claim 2 comprising a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60, wherein the absolute value of the photoelastic constant obtained from the following Equation (12) is equal to or less than $7 \times 10^{-12}$ $Pa^{-1}$ when a tensile force of maximum 2N is applied at a rate of 0.1 mm/min to measure the phase difference at a wavelength of 633 nm in a film obtained from said cyclic olefin copolymer, $$\text{Equation: Photoelastic constant } (Pa^{-1}) = \Delta Re(nm)/\Delta P \text{ (N)} \times \text{film width (mm)} \quad (12)$$

ΔRe: amount of a change in the phase difference, ΔP: amount of a change in the tensile force in the range in which the phase difference linearly increases with the application of the stress.

5. An optical lens obtained by molding an optical film having a thickness equal to or more than 10 μm and equal to or less than 500 μm comprising a cyclic olefin copolymer containing at least a repeating structural unit [A] represented by the general formula (1) and a repeating structural unit [B] represented by the general formula (2) and having a molar ratio [A]/[B] of from 95/5 to 1/99 in which the absolute value of the photoelastic constant obtained from the following Equation (12) is equal to or less than $7 \times 10^{-12}$ $Pa^{-1}$ when a tensile force of maximum 2N is applied at a rate of 0.1 mm/min to measure the phase difference at a wavelength of 633 nm in the obtained film, $$\text{Equation: Photoelastic constant } (Pa^{-1}) = \Delta Re(nm)/\Delta P \text{ (N)} \times \text{film width (mm)} \quad (12)$$

ΔRe: amount of a change in the phase difference, ΔP: amount of a change in the tensile force in the range in which the phase difference linearly increases with the application of the stress

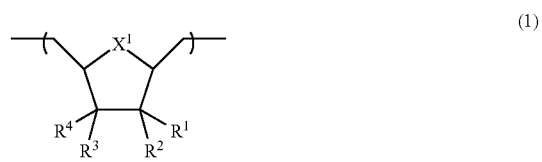

(1)

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —$NR^5$—, —$PR^5$— and —$CR^5R^6$—, $R^5$ and $R^6$ each independently represent hydrogen or alkyl having 1 to 20 carbon atoms,

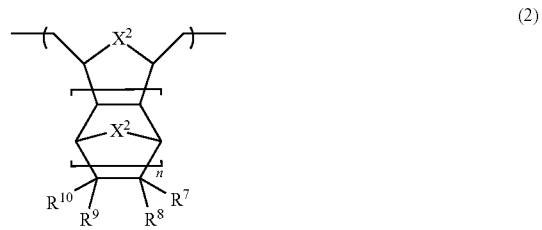

(2)

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —NR$^{11}$—, —PR$^{11}$— and —CR$^{11}$R$^{12}$—, $R^{11}$ and $R^{12}$ each independently represent hydrogen or alkyl having 1 to 20 carbon atoms, and may be identical with or different from each other; and n represents 1 to 3, wherein the absolute value of the orientation coefficient $F=(D-1)/(D+2)$ that is a function of the dichroic ratio $D=I_{\parallel}/I_{\perp}$ of parallel light intensity $I_{\parallel}$ to perpendicular light intensity $I_{\perp}$, each relative to the orientation direction at 1,500 to 1,400 cm$^{-1}$ according to Raman spectroscopy in a molded product obtained from said cyclic olefin copolymer is equal to or more than 0.001, and the absolute value of the orientation birefringence calculated from the phase difference (nm) at a wavelength of 633 nm/film thickness (μm) in a stretched film obtained from said cyclic olefin copolymer is equal to or less than $5\times10^{-4}$.

6. An optical lens obtained by molding an optical film having a thickness equal to or more than 10 μm and equal to or less than 500 μm comprising a cyclic olefin copolymer containing at least a repeating structural unit [A] represented by the general formula (1) and a repeating structural unit [B] represented by the general formula (2) and having a molar ratio [A]/[B] of from 95/5 to 1/99, and containing a repeating structural unit [C] represented by the general formula (3) and having a molar ratio [C]/([A]+[B]) of from 1/99 to 40/60 in which the absolute value of the photoelastic constant obtained from the following Equation (12) is equal to or less than $7\times10^{-12}$ Pa$^{-1}$ when a tensile force of maximum 2N is applied at a rate of 0.1 mm/min to measure the phase difference at a wavelength of 633 nm in the obtained film, Equation: Photoelastic constant (Pa$^{-1}$)=ΔRe(nm)/ΔP(N)×film width (mm)  (12)

ΔRe: amount of a change in the phase difference, ΔP: amount of a change in the tensile force in the range in which the phase difference linearly increases with the application of the stress (1)

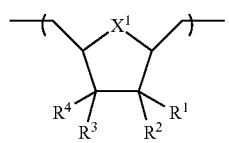

wherein, in the formula (1), at least one of $R^1$ to $R^4$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^1$ to $R^4$ are groups containing no fluorine or groups containing no cyano, $R^1$ to $R^4$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^1$ to $R^4$ may be bonded to each other to form a ring structure; and $X^1$ is selected from —O—, —S—, —NR$^5$—, —PR$^5$— and —CR$^5$R$^6$—, $R^5$ and $R^6$ each independently represent hydrogen or alkyl having 1 to 20 carbon atoms, (2)

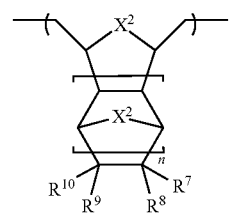

wherein, in the formula (2), at least one of $R^7$ to $R^{10}$ is fluorine, fluorine-containing alkyl having 1 to 10 carbon atoms, fluorine-containing alkoxy having 1 to 10 carbon atoms, fluorine-containing alkoxyalkyl having 2 to 10 carbon atoms, fluorine-containing aryl having 6 to 20 carbon atoms, fluorine-containing alkoxycarbonyl having 2 to 10 carbon atoms, fluorine-containing aryloxycarbonyl having 7 to 20 carbon atoms, fluorine-containing alkoxycarbonylalkyl having 3 to 10 carbon atoms, fluorine-containing aryloxycarbonylalkyl having 7 to 20 carbon atoms, cyano, cyano-containing alkyl having 2 to 10 carbon atoms, cyano-containing alkoxy having 2 to 10 carbon atoms, cyano-containing alkoxyalkyl having 3 to 10 carbon atoms, cyano-containing aryl having 7 to 20 carbon atoms, cyano-containing alkoxycarbonyl having 3 to 10 carbon atoms, cyano-containing aryloxycarbonyl having 8 to 20 carbon atoms, cyano-containing alkoxycarbonylalkyl having 4 to 10 carbon atoms or cyano-containing aryloxycarbonylalkyl having 8 to 20 carbon atoms; to the extent that $R^7$ to $R^{10}$ are groups containing no fluorine or groups containing no cyano, $R^7$ to $R^{10}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^7$ to $R^{10}$ may be bonded to each other to form a ring structure; $X^2$ is selected from —O—, —S—, —$NR^{11}$—, —$PR^{11}$— and —$CR^{11}R^{12}$—, $R^{11}$ and $R^{12}$ each independently represent hydrogen or alkyl having 1 to 20 carbon atoms, and may be identical with or different from each other; and n represents 1 to 3,

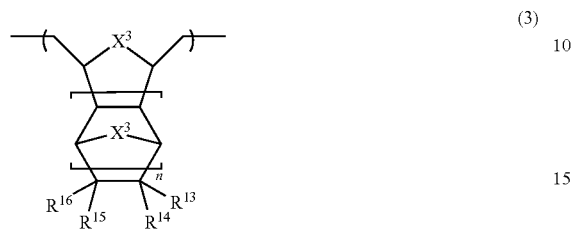
(3)

wherein, in the formula (3), $R^{13}$ to $R^{16}$ are each selected from hydrogen, alkyl having 1 to 10 carbon atoms, aryl having 6 to 20 carbon atoms, alkoxy having 1 to 10 carbon atoms, alkoxyalkyl having 2 to 10 carbon atoms, alkoxycarbonyl having 2 to 10 carbon atoms, aryloxycarbonyl having 7 to 20 carbon atoms, alkoxycarbonylalkyl having 3 to 10 carbon atoms or aryloxycarbonylalkyl having 8 to 20 carbon atoms; $R^{13}$ to $R^{16}$ may be bonded to each other to form a ring structure; $X^3$ is selected from —O—, —S—, —$NR^{17}$—, —$PR^{18}$— and —$CR^{17}R^{18}$—, $R^{17}$ and $R^{18}$ each independently represent hydrogen or alkyl having 1 to 20 carbon atoms, and may be identical with or different from each other; and n represents 0 or 1.

* * * * *